(12) United States Patent
Hu et al.

(10) Patent No.: US 11,482,711 B2
(45) Date of Patent: Oct. 25, 2022

(54) TABLESS CELL UTILIZING METALLIZED FILM CURRENT COLLECTORS

(71) Applicant: Soteria Battery Innovation Group, Inc., Greenville, SC (US)

(72) Inventors: Carl C. Hu, Taylors, SC (US); Brian G. Morin, Greenville, SC (US)

(73) Assignee: Soteria Battery Innovation Group, Inc., Greenville, SC (US)

( * ) Notice: Subject to any disclaimer, the term of this patent is extended or adjusted under 35 U.S.C. 154(b) by 0 days.

(21) Appl. No.: 17/168,126

(22) Filed: Feb. 4, 2021

(65) Prior Publication Data

US 2021/0167399 A1 Jun. 3, 2021

Related U.S. Application Data

(63) Continuation-in-part of application No. 15/927,072, filed on Mar. 20, 2018, now Pat. No. 10,957,956, which is a continuation-in-part of application No. 15/700,077, filed on Sep. 9, 2017, now Pat. No. 10,854,868.

(51) Int. Cl.
| | |
|---|---|
| *H01M 10/44* | (2006.01) |
| *H01M 4/66* | (2006.01) |
| *H01M 10/0525* | (2010.01) |
| *H01M 4/70* | (2006.01) |
| *H01M 50/583* | (2021.01) |

(52) U.S. Cl.
CPC .......... *H01M 4/668* (2013.01); *H01M 4/661* (2013.01); *H01M 4/667* (2013.01); *H01M 4/70* (2013.01); *H01M 10/0525* (2013.01); *H01M 50/583* (2021.01); *H01M 2200/103* (2013.01)

(58) Field of Classification Search
CPC ...... H01M 4/668; H01M 4/667; H01M 4/665; H01M 4/661; H01M 4/70; H01M 10/0525; H01M 10/052; H01M 50/583; H01M 50/586; H01M 50/588; H01M 2200/103
See application file for complete search history.

(56) References Cited

U.S. PATENT DOCUMENTS

| | | | | |
|---|---|---|---|---|
| 6,326,105 B1 * | 12/2001 | Kejha | ................ | H01M 50/414 429/300 |
| 6,413,676 B1 * | 7/2002 | Munshi | ................ | H01M 4/667 429/316 |

(Continued)

FOREIGN PATENT DOCUMENTS

| | | |
|---|---|---|
| JP | 09283149 A | 10/1997 |
| JP | 1167221 A | 3/1999 |

*Primary Examiner* — Raymond Alejandro
(74) *Attorney, Agent, or Firm* — William S. Parks

(57) ABSTRACT

A lithium battery cell with an internal fuse component without any welded tabs present for conductance from the internal portion thereof externally to power a subject device is provided. Disclosed herein are lithium ion (liquid electrolyte) battery configurations utilizing thin metallized film current collectors as conducting tabs that provide full electrical conductivity from one pole to another throughout the internal portions of the battery with sufficient space for liquid electrolyte flow as well. Such thin metallized film current collectors thus provide both safety features with low electrical charge runaway potential, low internal resistance, and high thermal conductivity with a simplified manner of providing external electrical conductivity simultaneously.

13 Claims, 29 Drawing Sheets

Randomized Crush Pattern on Stacked Cell

(56) References Cited

U.S. PATENT DOCUMENTS

| | | | |
|---|---|---|---|
| 6,617,074 B1 * | 9/2003 | Watarai | H01M 10/0525 429/300 |
| 2017/0025658 A1 * | 1/2017 | Shi | H01M 50/454 |
| 2018/0198132 A1 | 7/2018 | Liang et al. | |

* cited by examiner

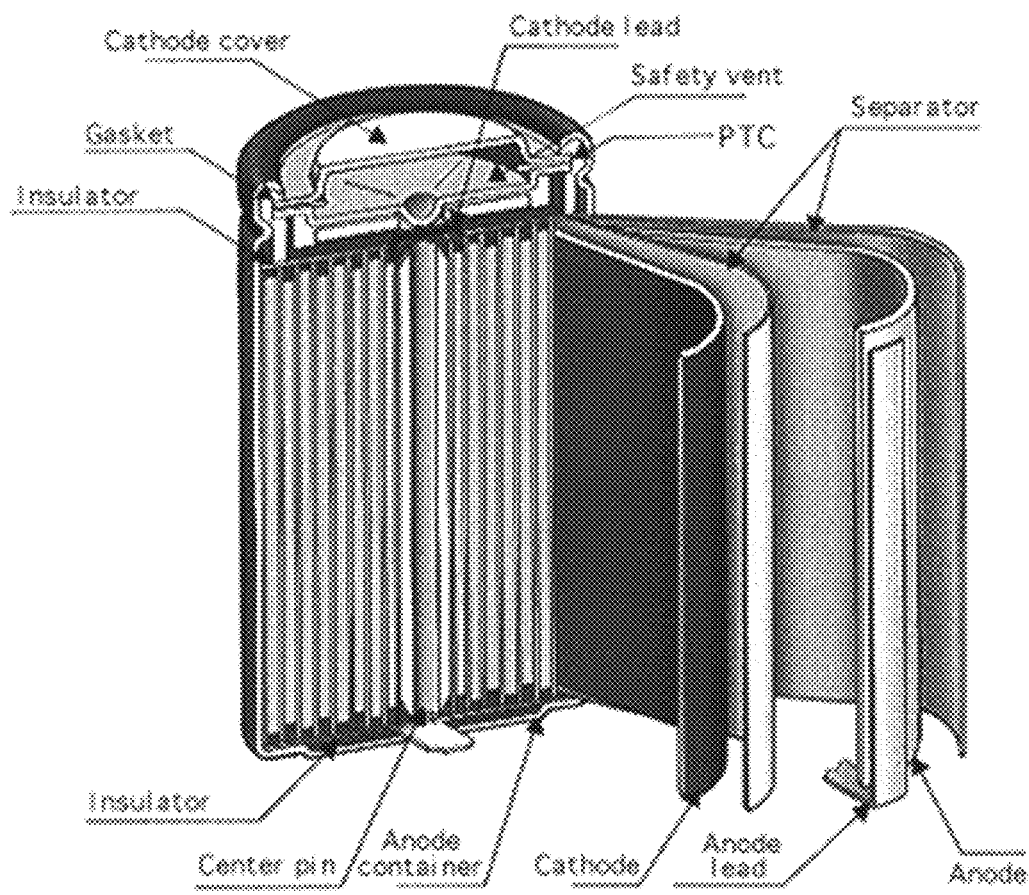
Fig. 1 - Wound cell
Prior Art

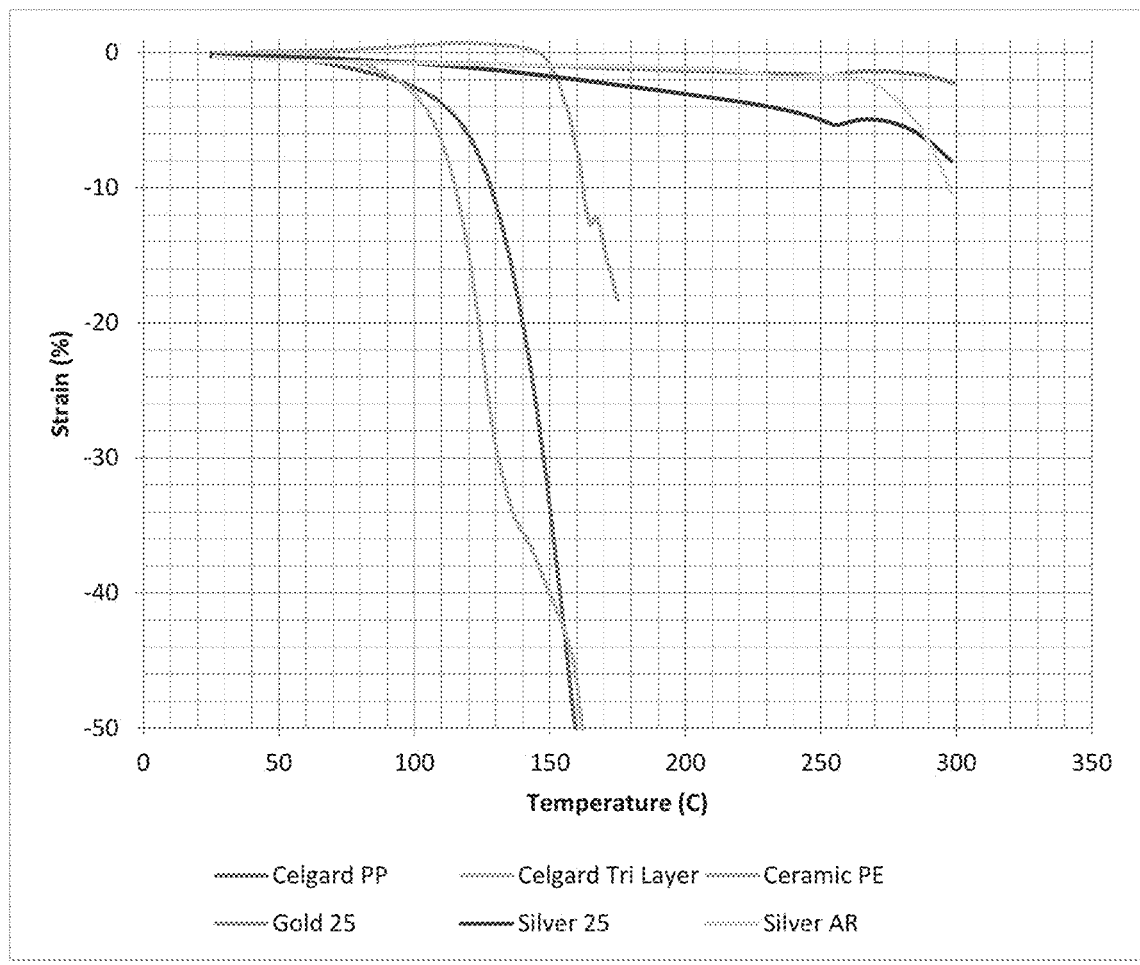
Fig. 2 - Separator Shrinkage
Prior Art

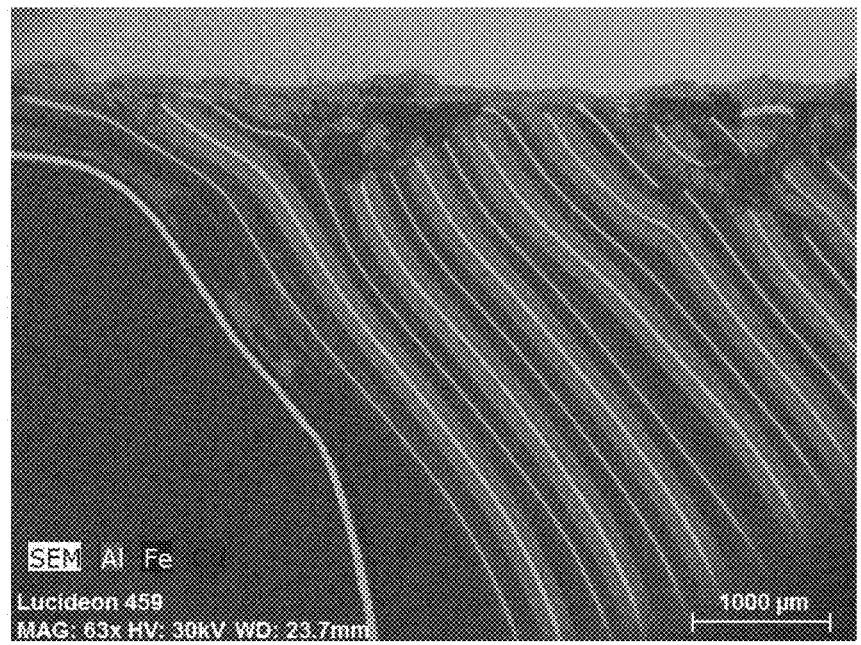
Fig. 3a - SEM of cross section of nail-penetrated cell
Prior Art
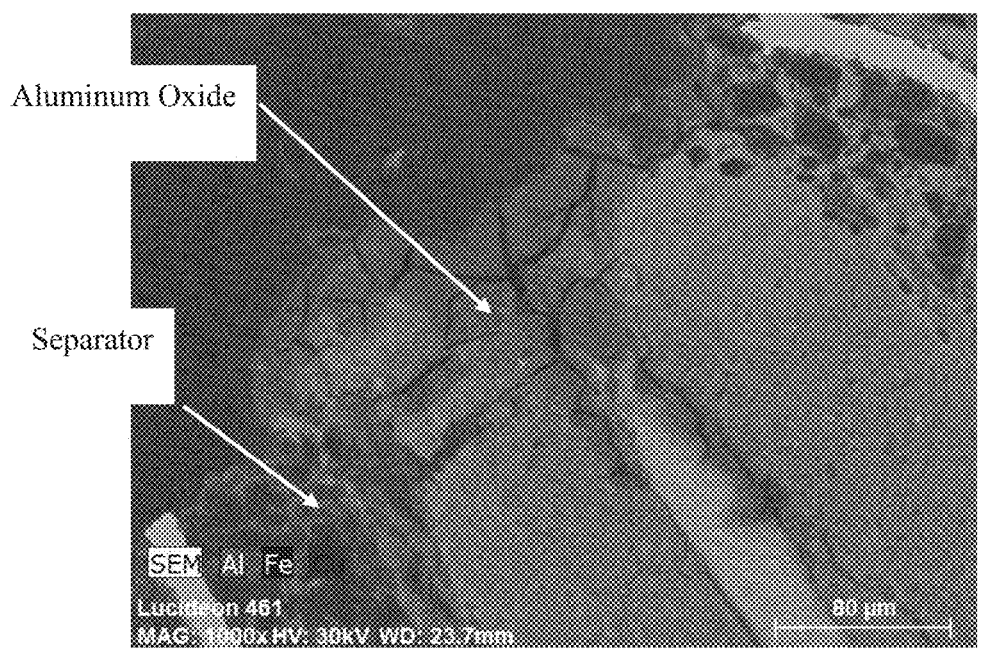
Fig. 3b – Zoom in of SEM of cross section of nail-penetrated cell aluminum current collector
Prior Art An oxidizing metal at very low total metal thickness Traditional Current Collector ← Thick conductive, oxidative layer Inventive Current Collector Thin conductive, oxidative layer ←Non-conductive, layer Thin conductive, oxidative layer Images of Comparative Examples 1-2
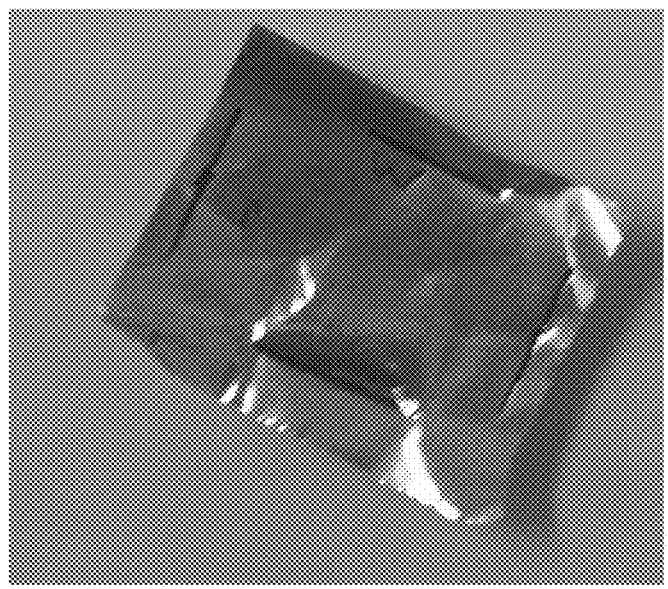
Fig. 6a – Comparative example 1 after touching with hot soldering iron
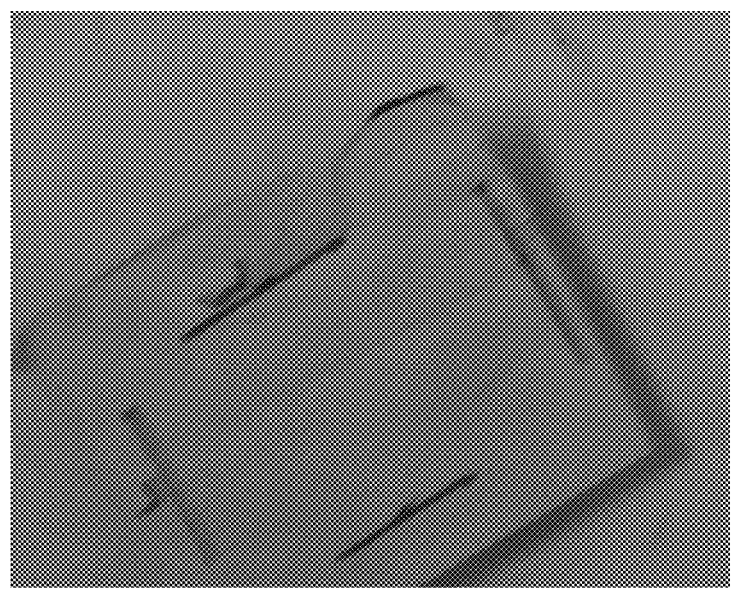
Fig. 6b – Comparative Example 2 after touching with hot soldering iron Images of Examples 1-3
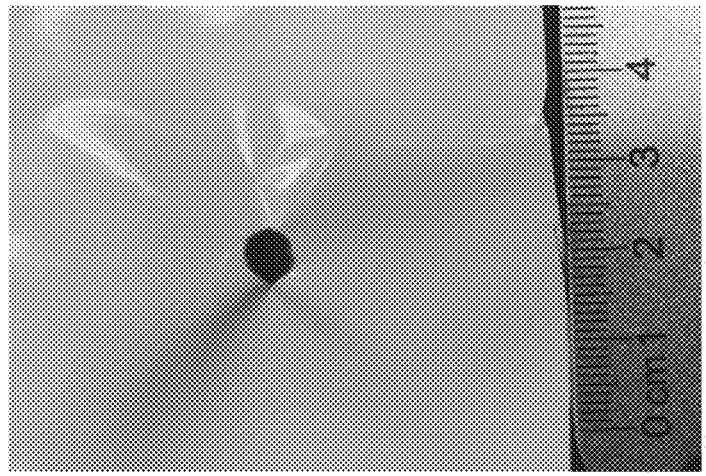
Fig. 7A - Example 1 after touching with hot solder iron
Fig. 7B - Example 2 after touching with hot solder iron
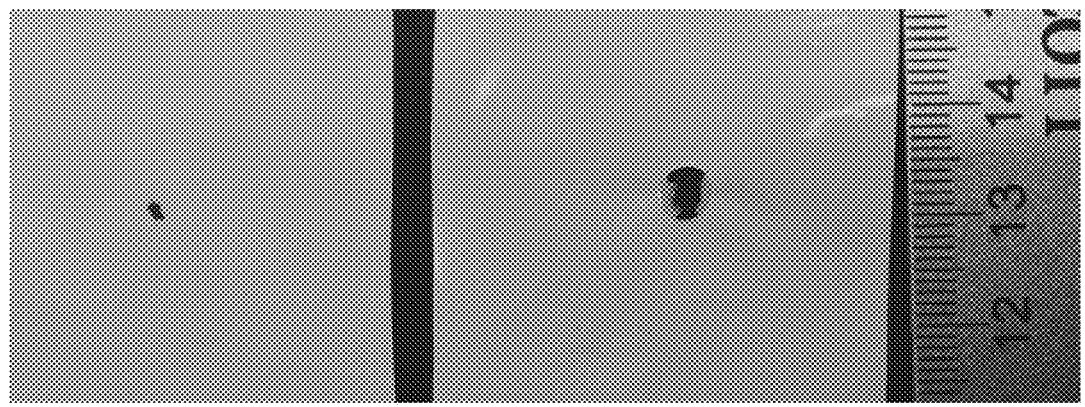
Fig. 7C - Example 3 after touching with hot solder iron Images of Examples 4 – 6
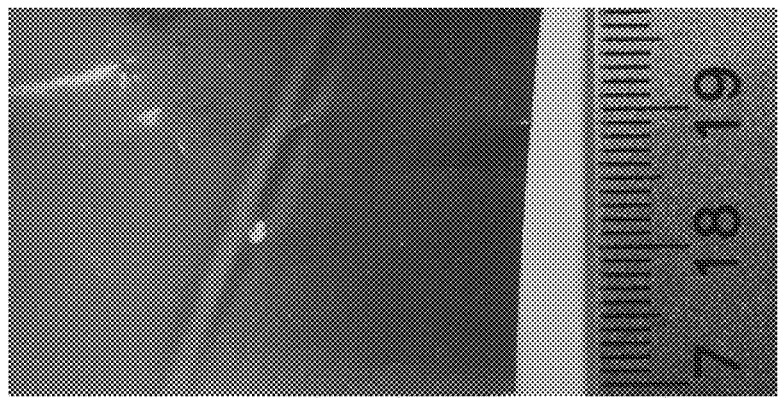
Fig. 8A - Example 4 after touching with hot solder iron
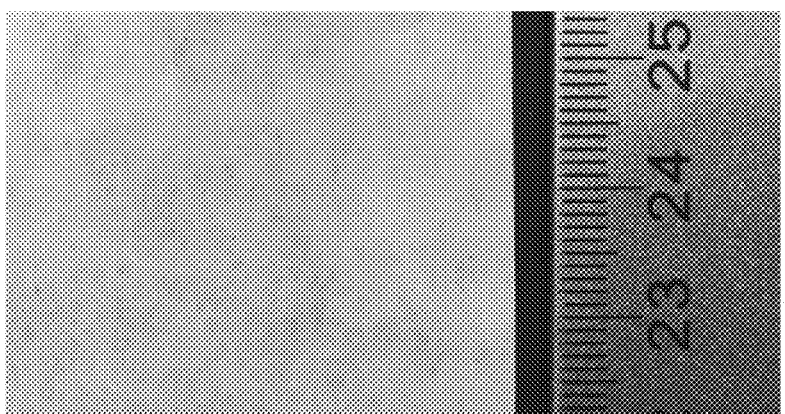
Fig. 8B - Example 5 after touching with hot solder iron
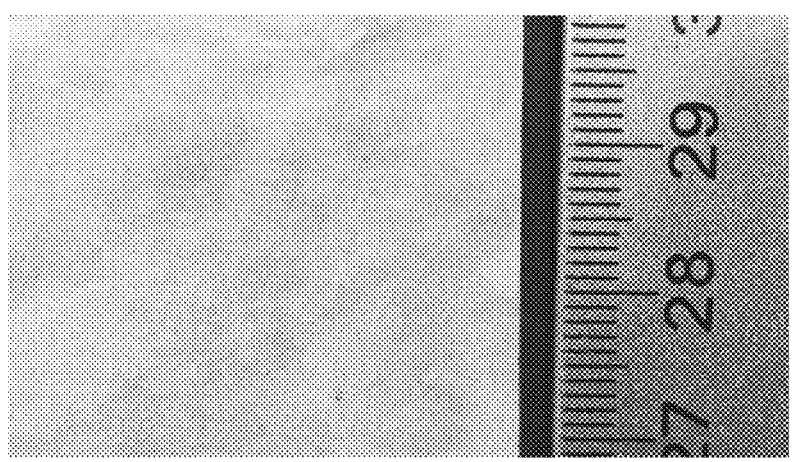
Fig. 8C - Example 6 after touching with hot solder iron Comparative Example 3 after shorting at 4.0V
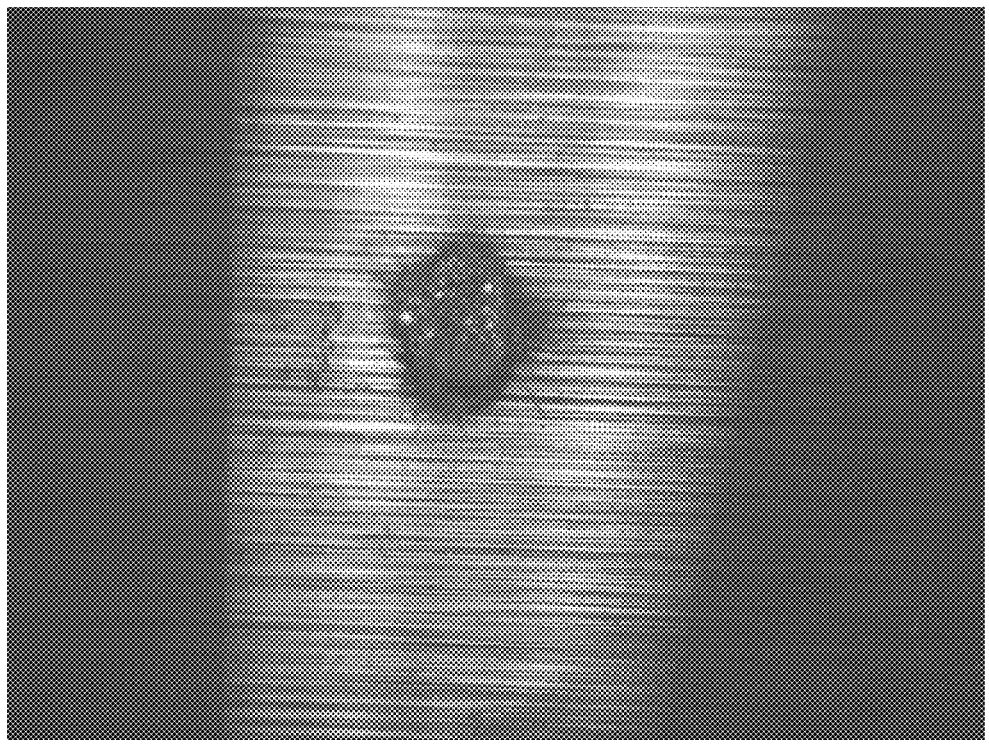
Fig. 10A - Comparative Example 3 after shorting at 4.0 V
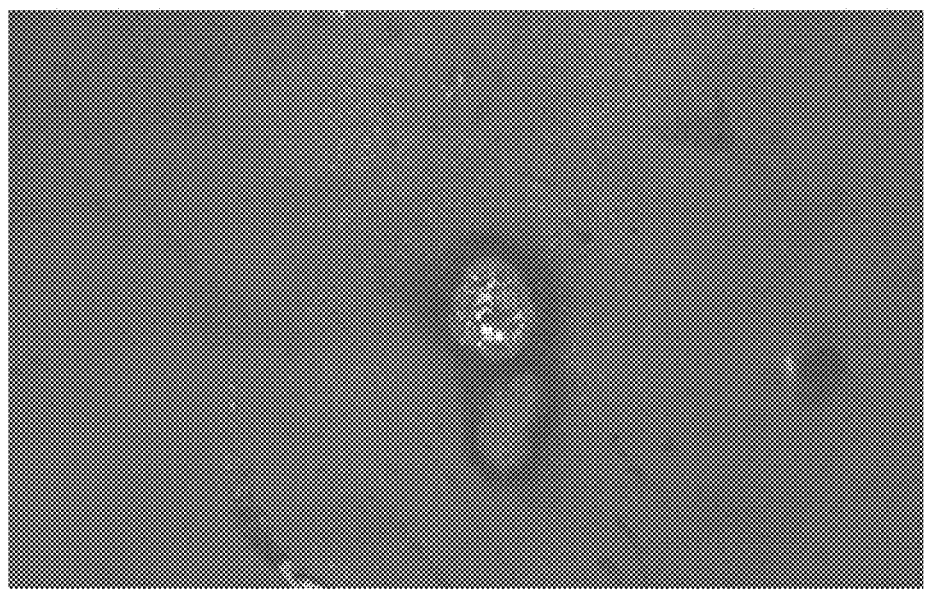
Fig. 10B - Comparative Example 4 after shorting at 4.0 V

Fig. 11A - Example 14 after shorting at 4.0 V
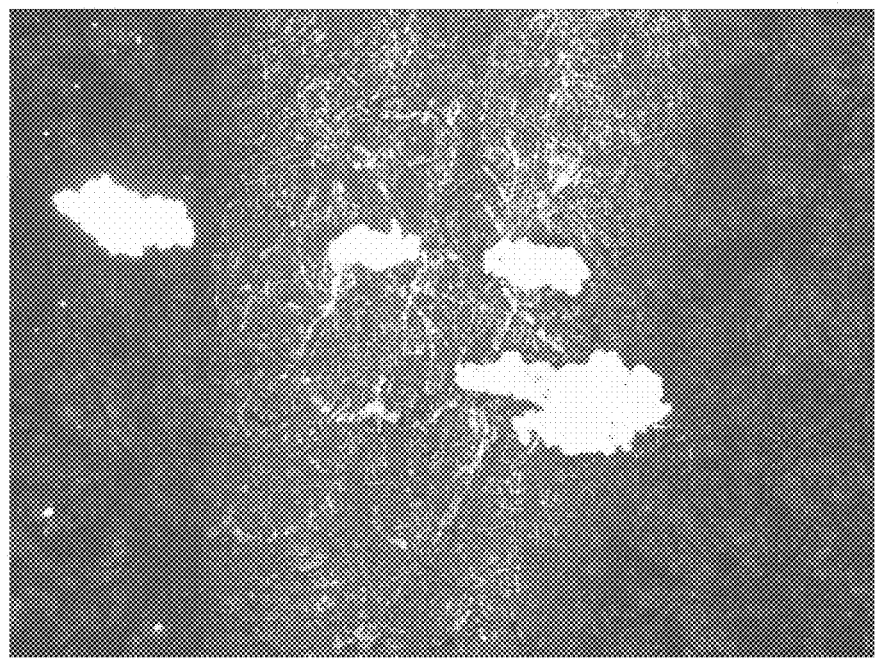
Fig. 11B – Example 14 after shorting at 4.0V

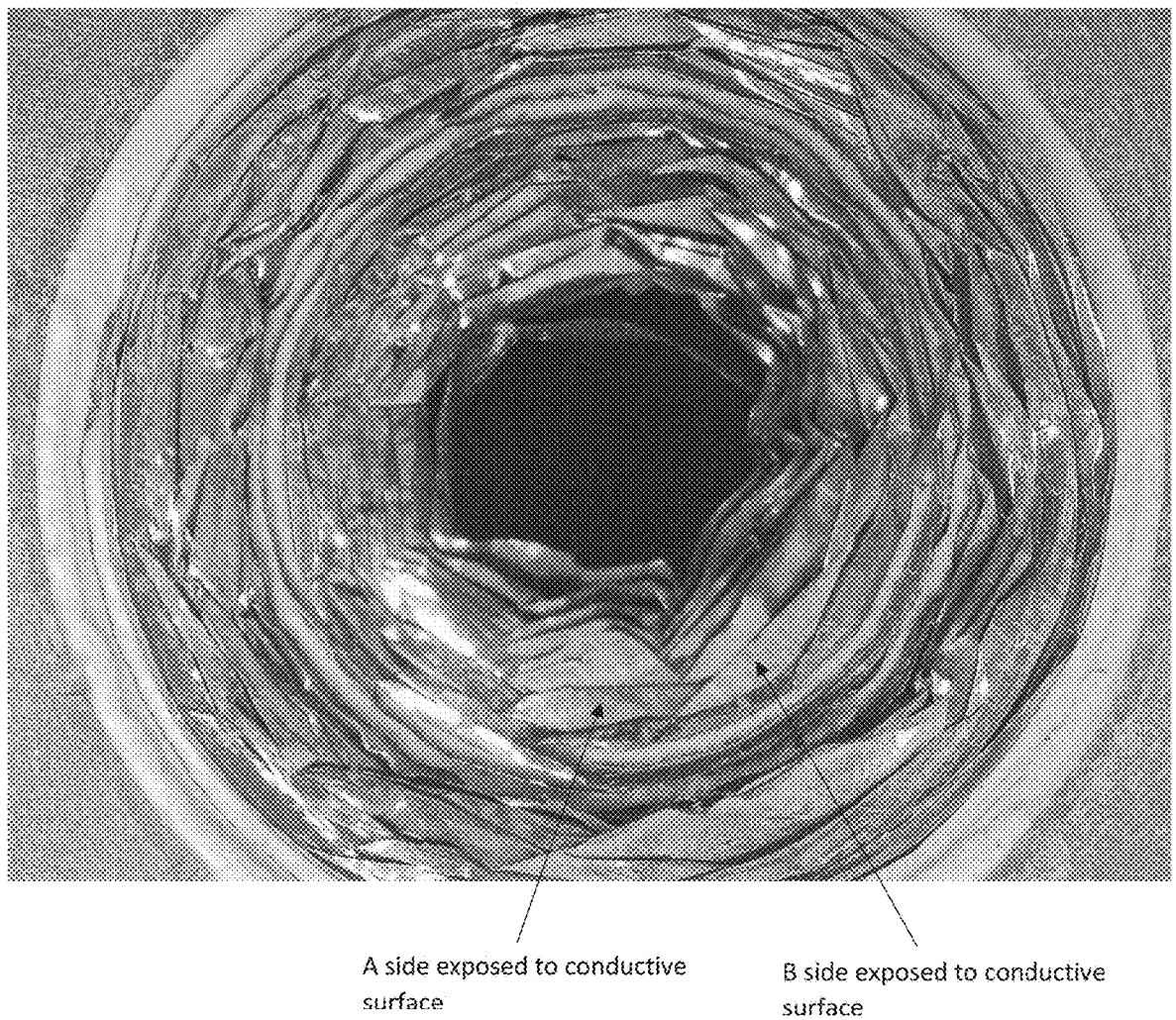
Fig. 12 – Randomized crushing of conductive film surfaces A and B contact through crush surface

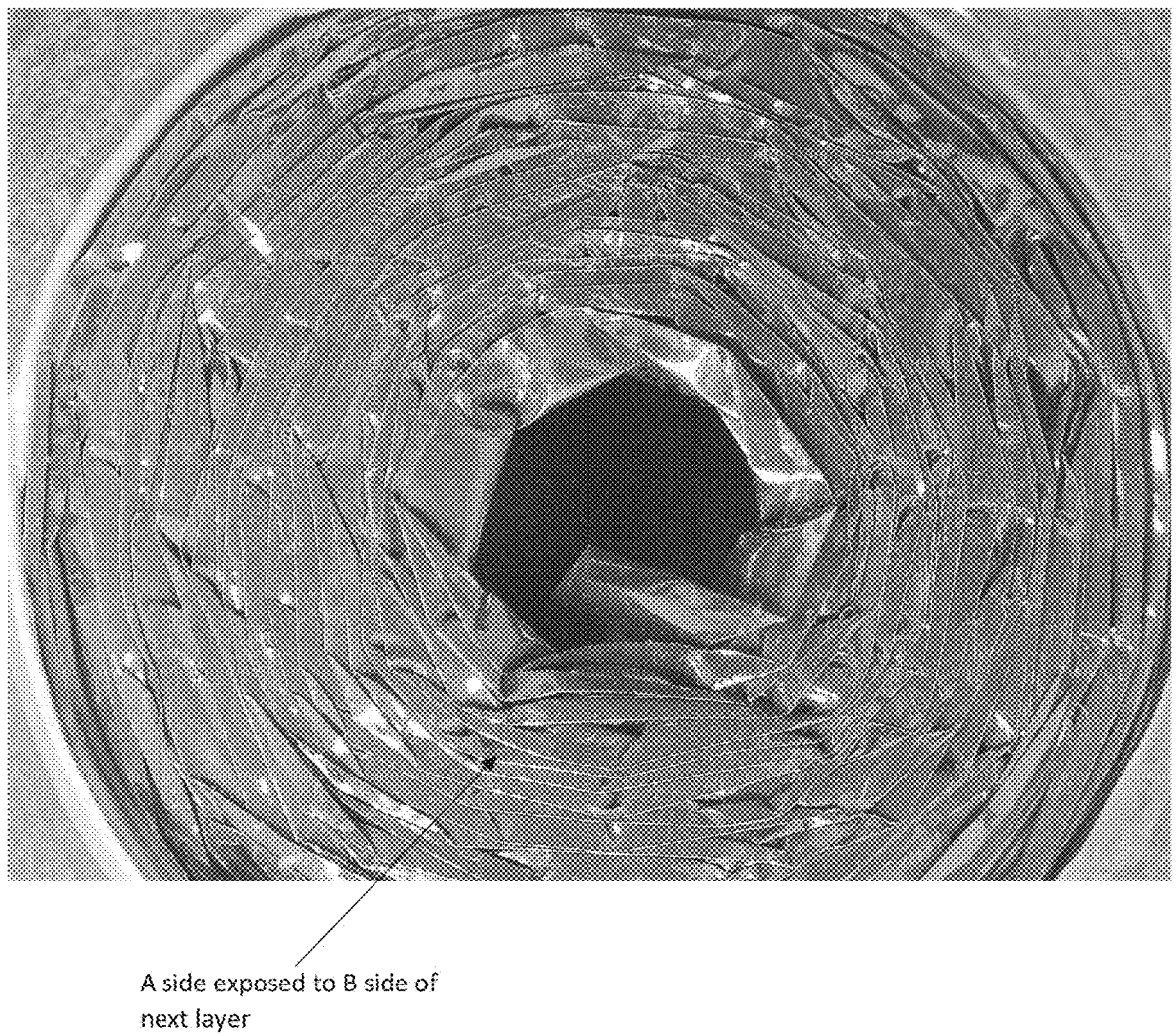
A side exposed to B side of next layer
Fig. 13 – A to B side conductivity directly from film surface to adjacent film surface

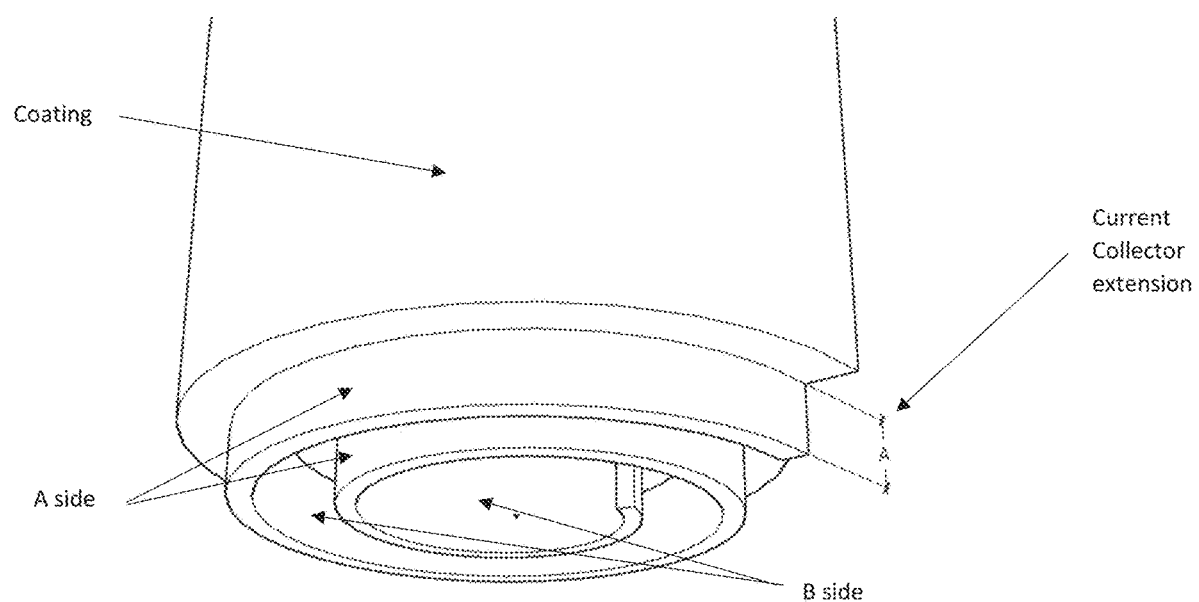
Fig. 14 – Current collector extension on jelly roll style cell

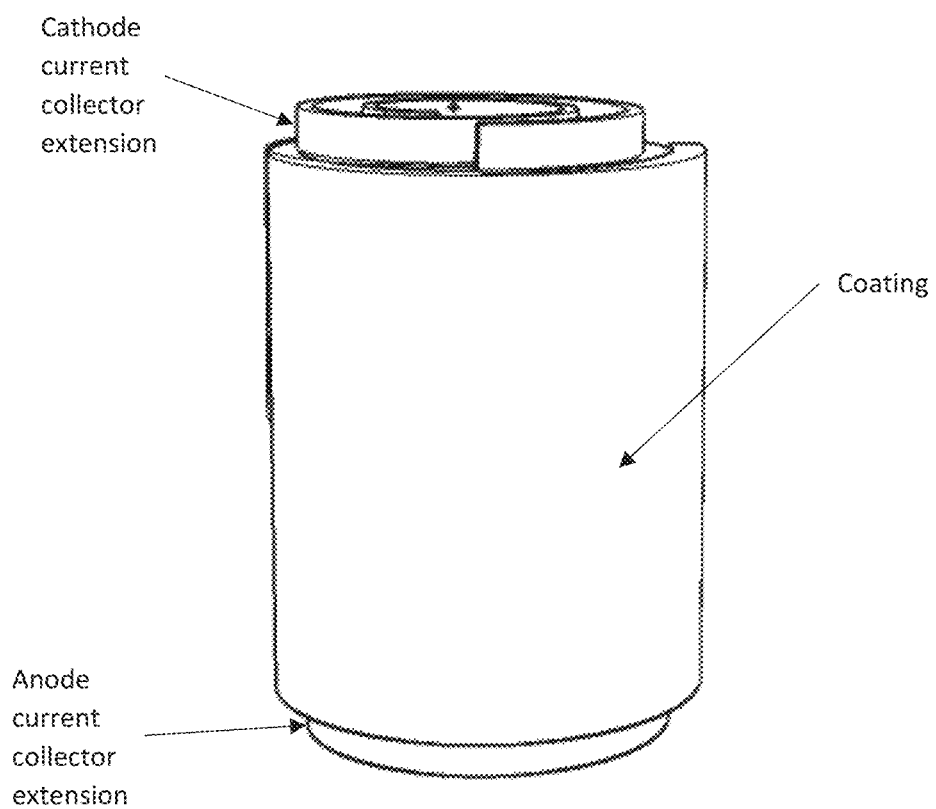
Fig. 15 – Anode and Cathode Jelly roll construction

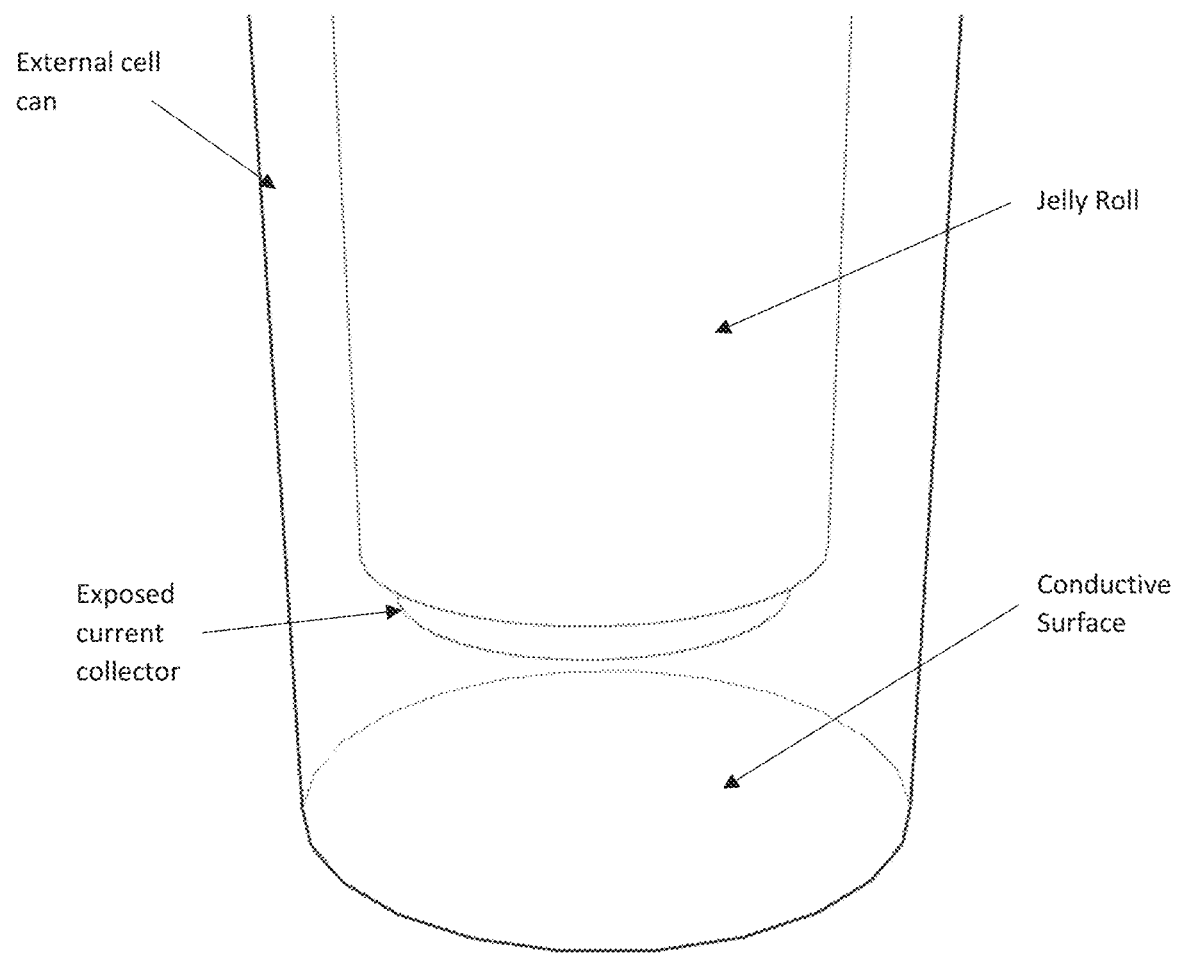
Fig. 16 – Jelly roll with exposed current collector in cell container

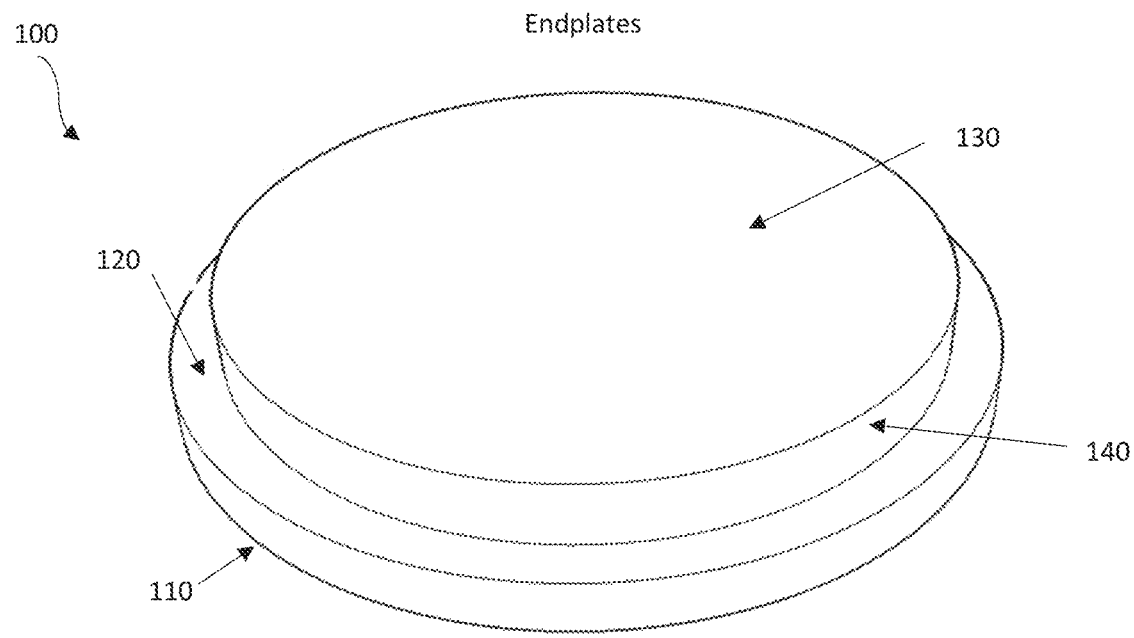
Fig. 19 - Smooth Endplate
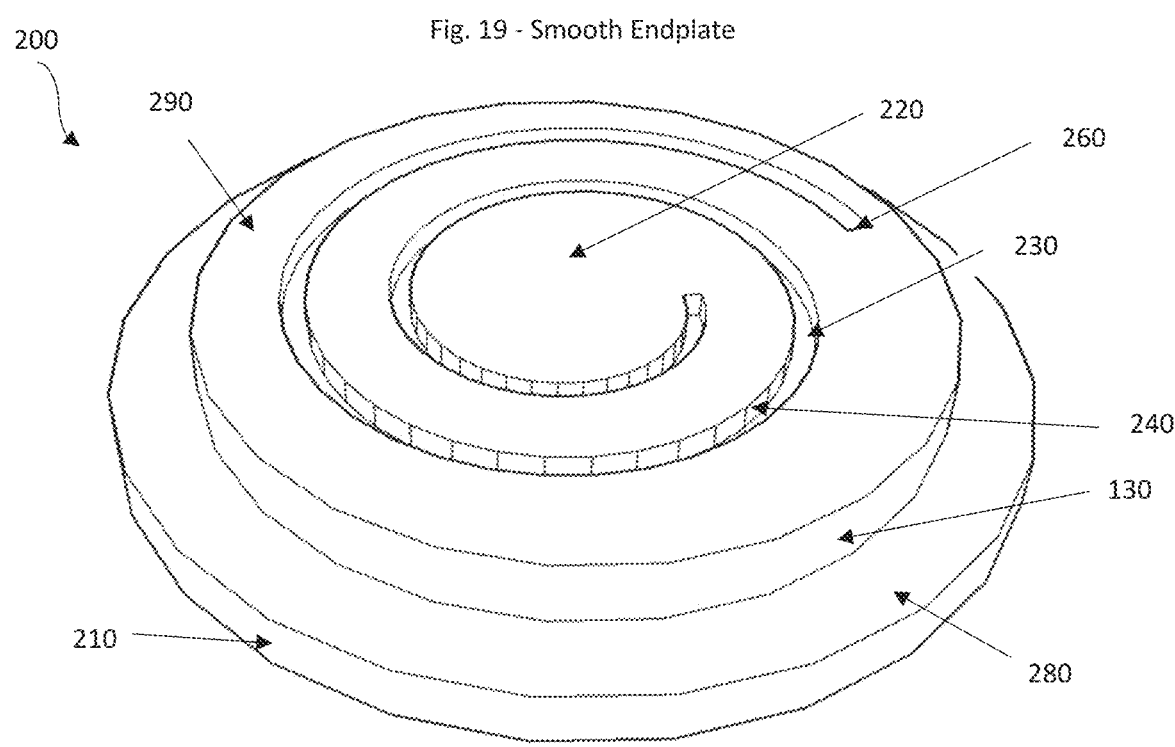
Fig. 20 - Grooved Endplate

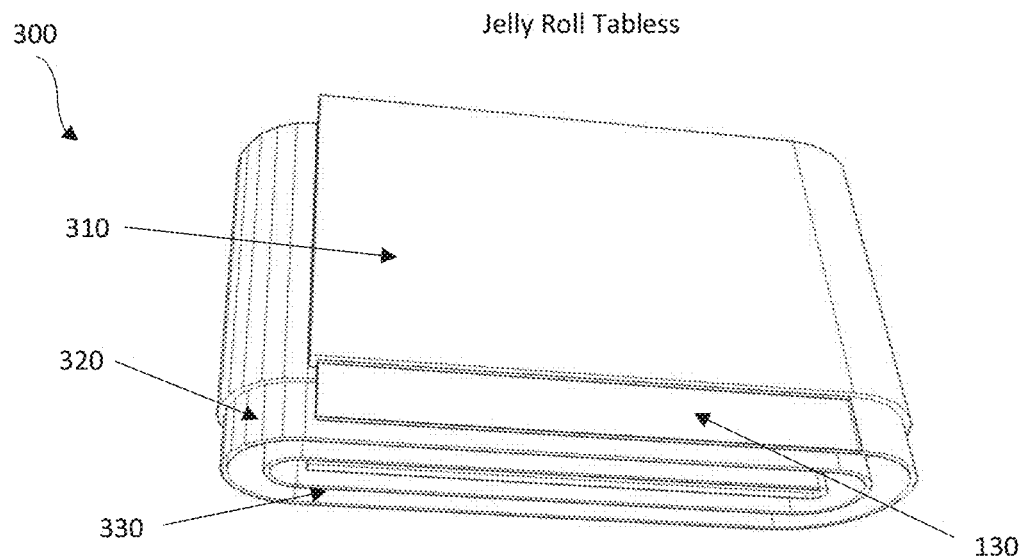
Fig. 21 - Jelly Roll Electrode Structure
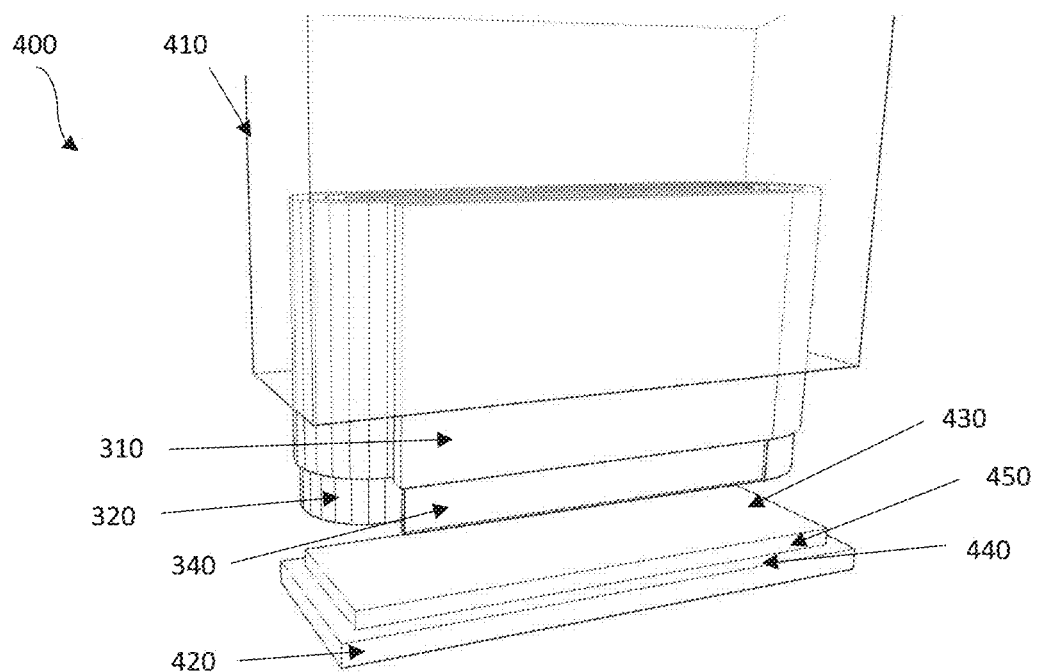
Fig. 22 - Jelly Roll Cell Assembly with Smooth Endplate

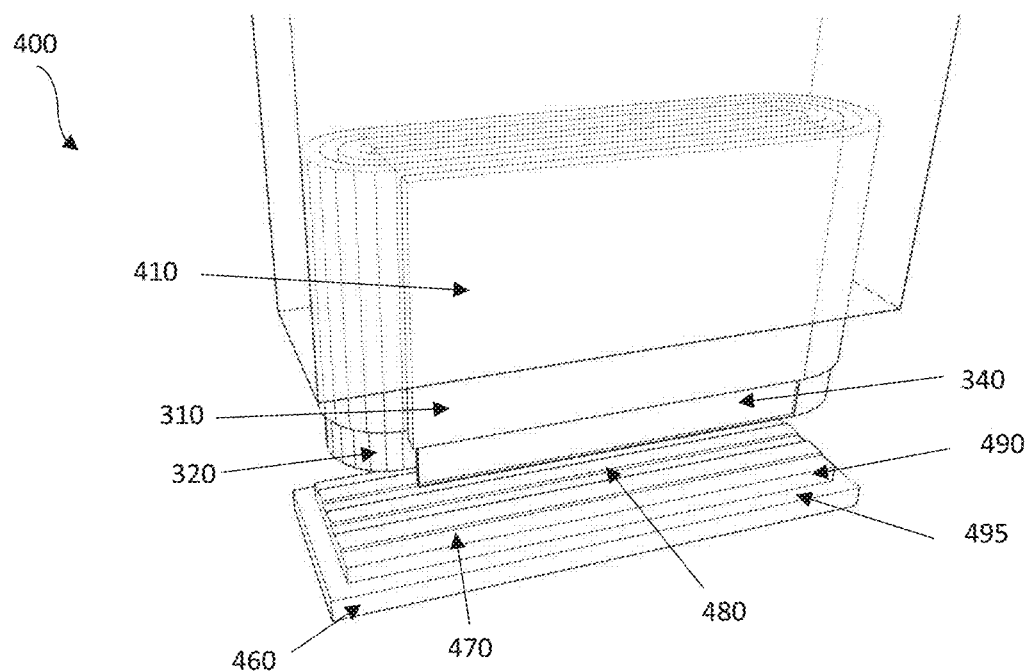
Fig. 23 - Jelly Roll cell Assembly with Grooved Endplate

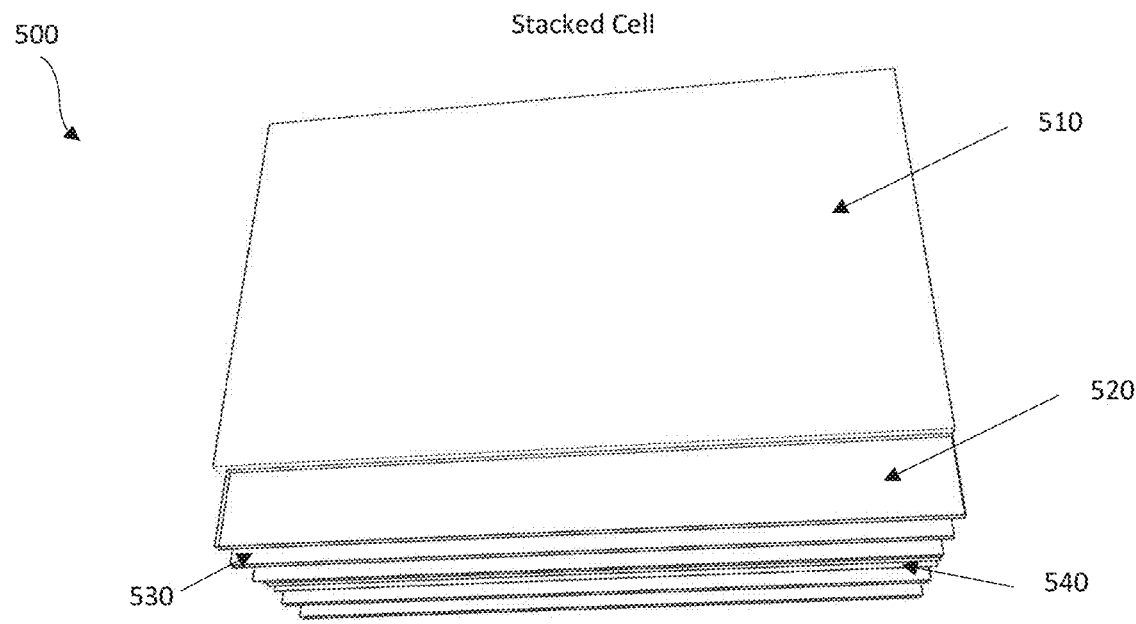
Fig. 24 - Stacked Cell Electrodes
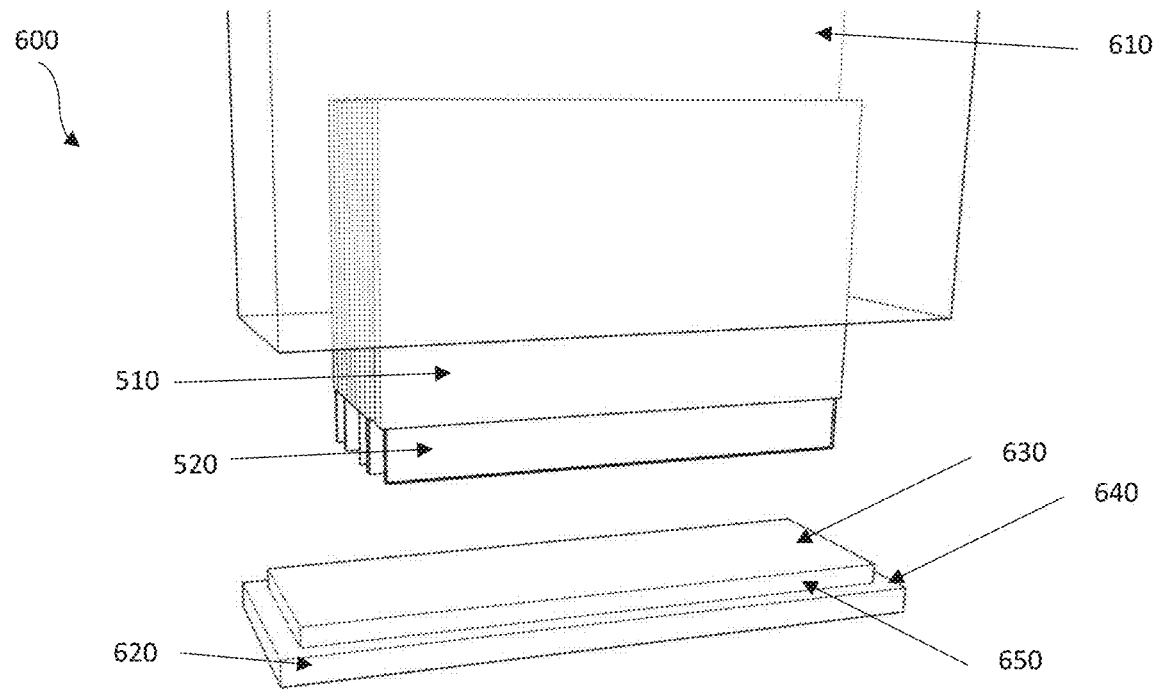
Fig. 25 - Stacked Cell Smooth Endplate Assembly

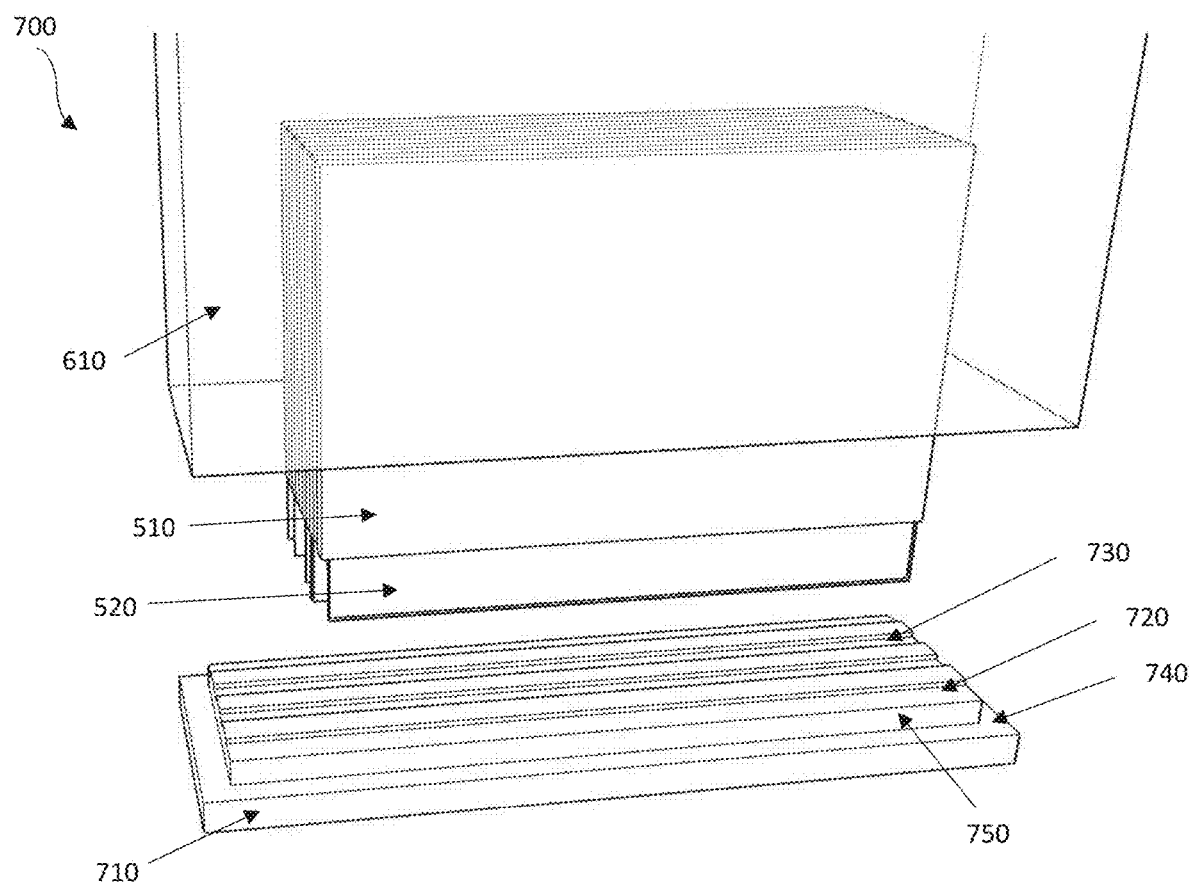
Fig. 26 - Stacked Cell Grooved Endplate Assembly

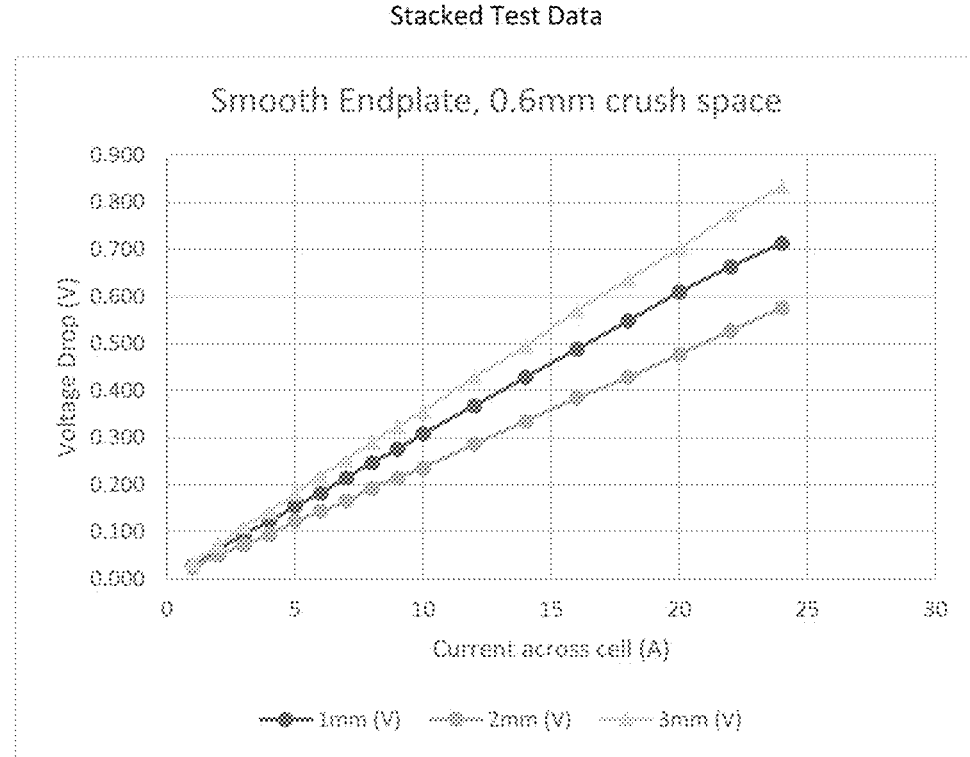
Fig. 27 - Stacked Cell Smooth Endplate with 0.6mm Crush space
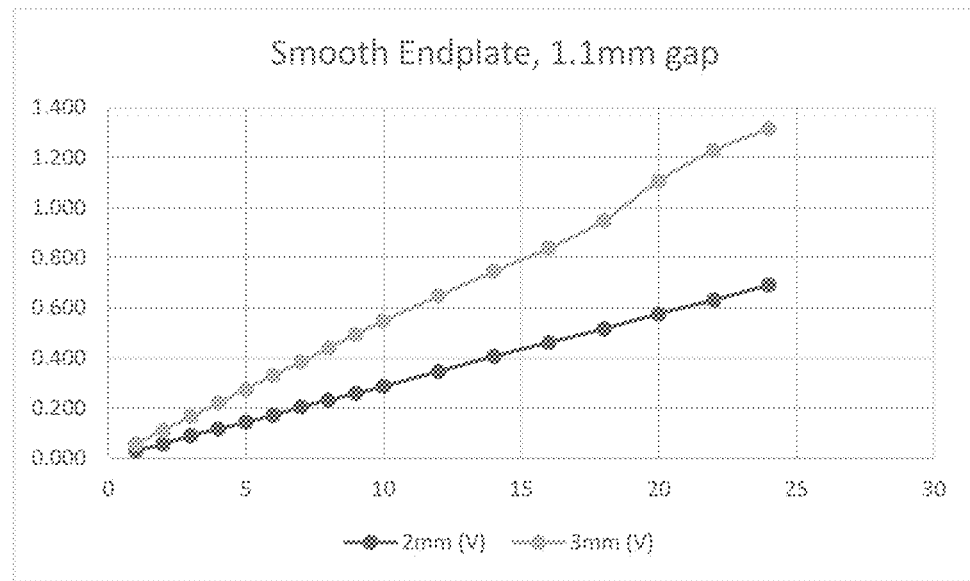
Fig. 28 - Stacked Cell Smooth Endplate with 1.1mm Crush space

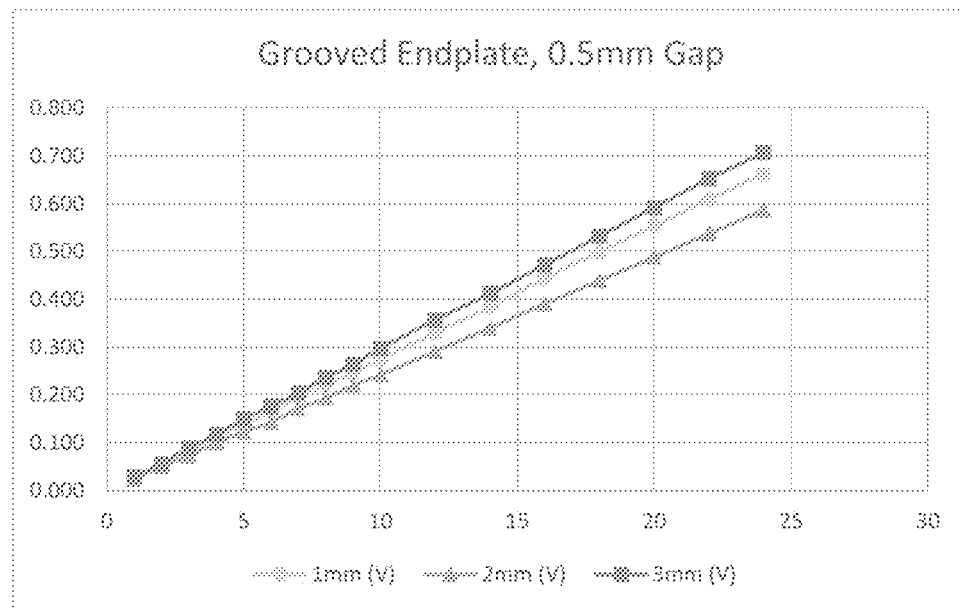
Fig. 29 - Grooved Endplate with 0.5mm Crush space
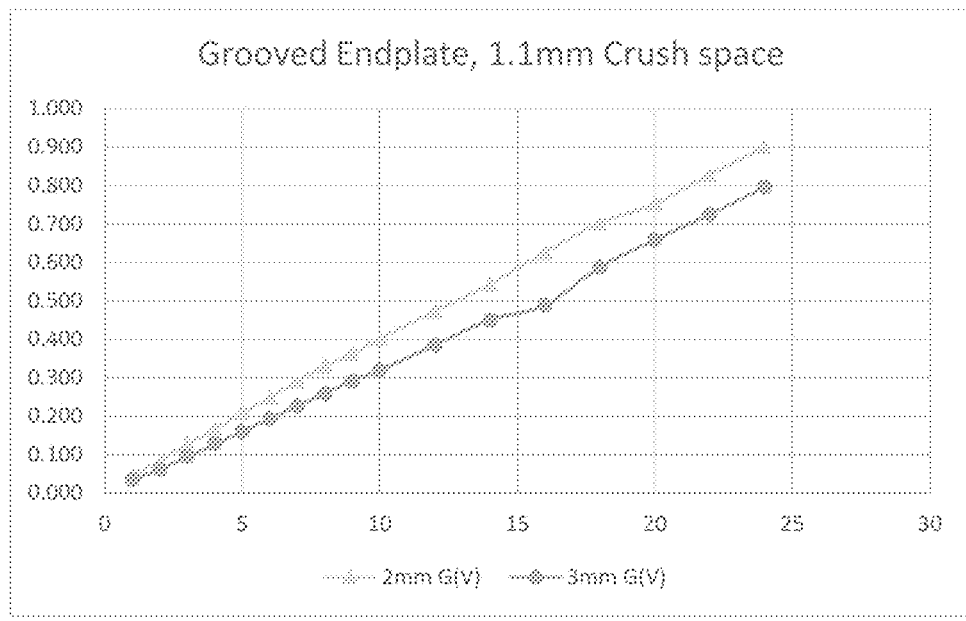
Fig. 30 - Grooved Endplate, 1.1mm Crush Space

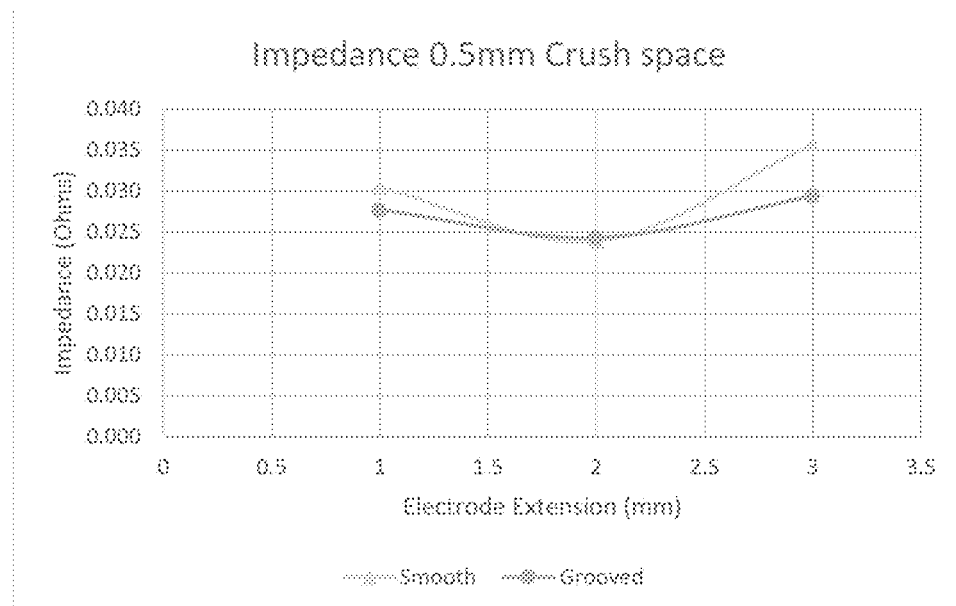
Fig. 31 - Electrode Extension vs. Impedance with 0.5mm of Crush Space
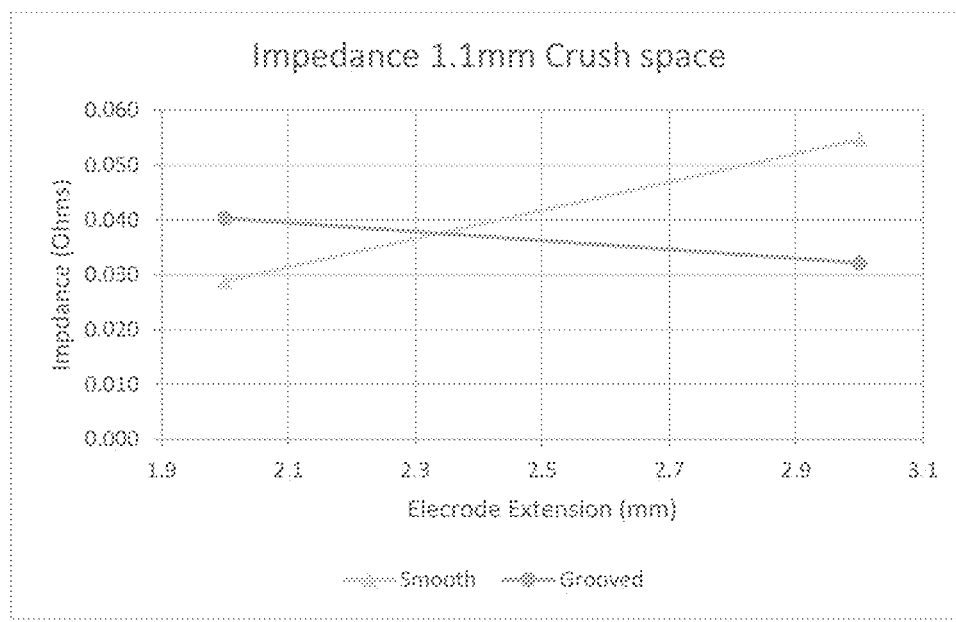
Fig. 32 - Electrode Extension vs. Impedance with 1.1mm of Crush space

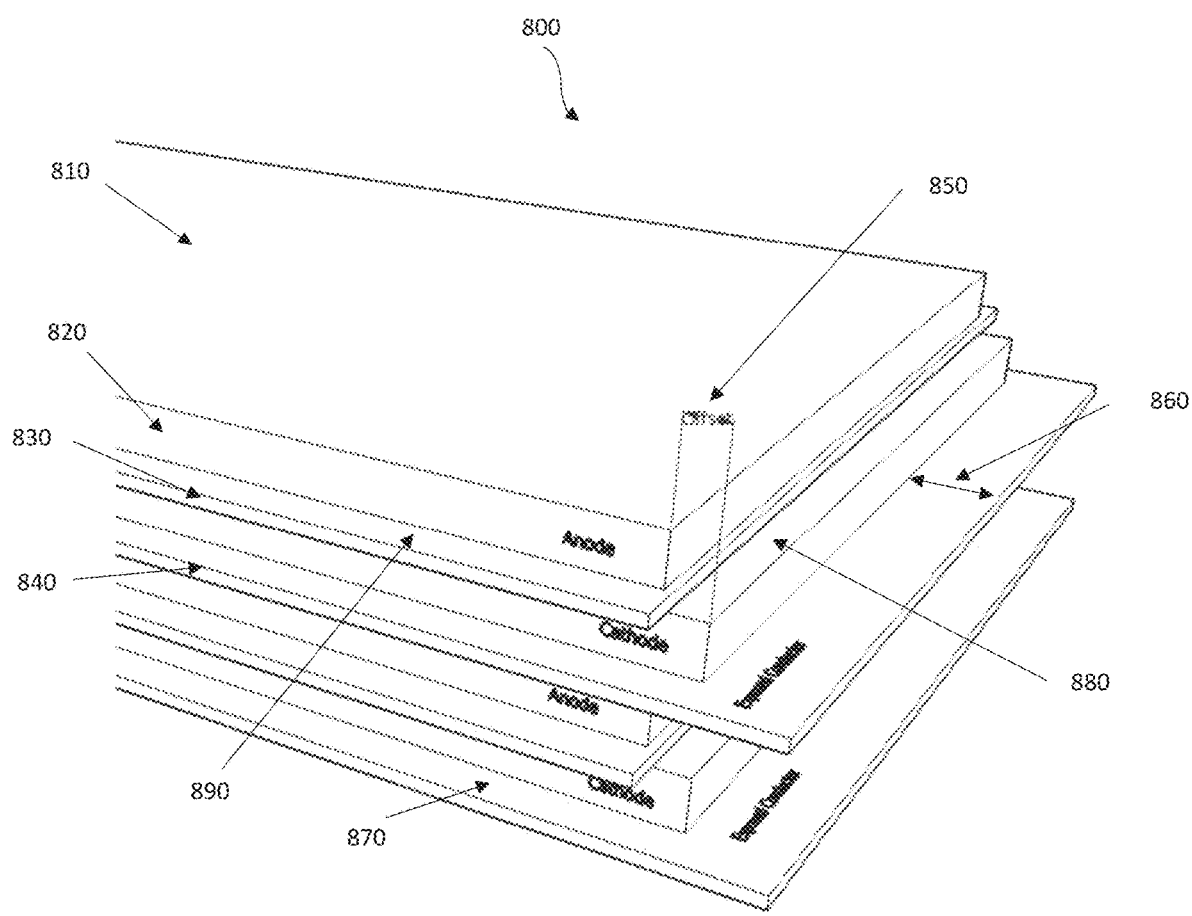
Fig. 33 – Electrode Offset

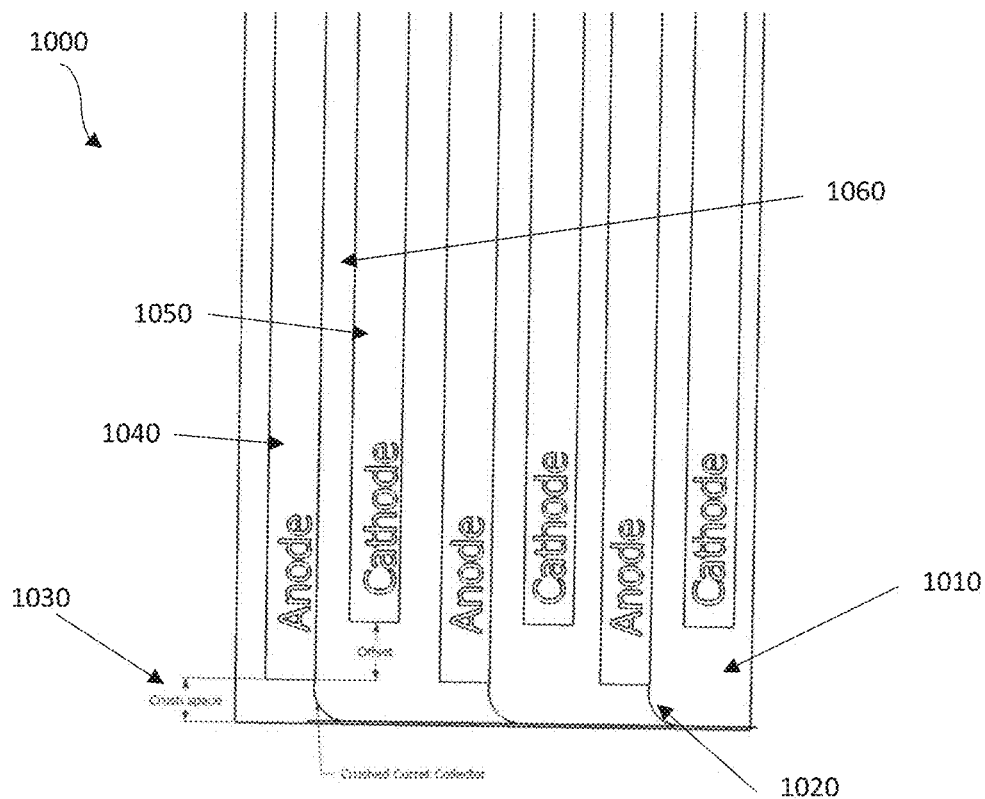
Fig. 34 – Crush space in Cell Package
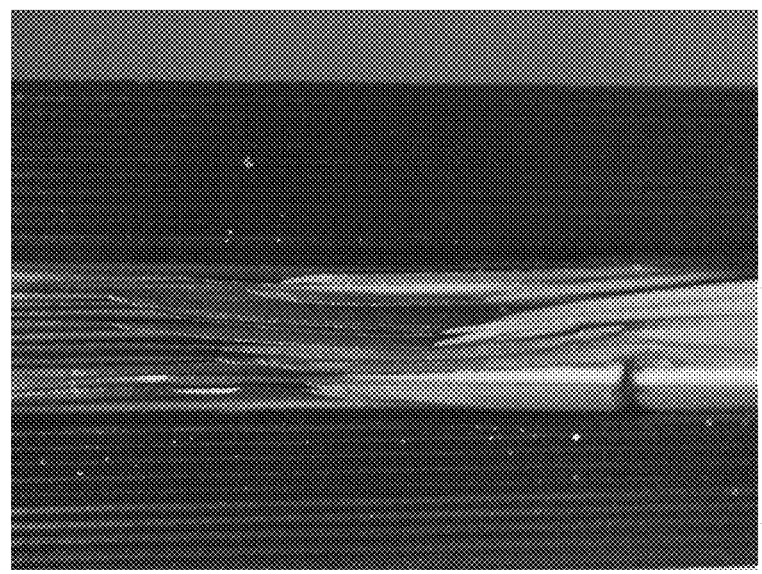
Fig. 35 – Randomized Crush Pattern on Stacked Cell

Fig. 36 – Non-randomized Crush Pattern on Stacked Cell

TABLESS CELL UTILIZING METALLIZED FILM CURRENT COLLECTORS

CROSS-REFERENCE TO RELATED APPLICATIONS

This application is a continuation-in-part of pending U.S. patent application Ser. No. 15/927,072, filed on Mar. 28, 2018, which is a continuation-in-part of U.S. patent application Ser. No. 15/700,077, filed on Sep. 9, 2017, now U.S. Pat. No. 10,854,868, issued on Dec. 1, 2020, the entirety of both applications herein being incorporated by reference.

FIELD OF THE DISCLOSURE

A lithium battery cell with an internal fuse component without any welded tabs present for conductance from the internal portion thereof externally to power a subject device is provided. Disclosed herein are lithium ion battery configurations utilizing thin metallized film current collectors as conducting tabs that provide full electrical conductivity from one pole to another throughout the internal portions of the battery with sufficient space for liquid electrolyte flow as well. Such thin metallized film current collectors thus provide both safety features with low thermal runaway potential, low internal resistance, and high thermal conductivity with a simplified manner of providing external electrical conductivity simultaneously.

Additionally, the present disclosure relates to improvements in the structural components and physical characteristics of lithium battery articles. Standard lithium-ion batteries, for example, are prone to certain phenomena related to short circuiting and have experienced high temperature occurrences and ultimate firing as a result. Structural concerns with battery components have been found to contribute to such problems. Improvements provided herein include the utilization of thin metallized surface composite current collectors (aluminum and/or copper, as examples), high shrinkage rate materials, materials that become nonconductive upon exposure to high temperatures, and combinations thereof. Such improvements accord the ability to withstand certain imperfections (dendrites, unexpected electrical surges, etc.) within the target lithium battery through provision of ostensibly an internal fuse within the subject lithium batteries themselves that prevents undesirable high temperature results from short circuits. Battery articles and methods of use thereof including such improvements are also encompassed within this disclosure.

Of particular interest and importance is the provision of a lithium battery cell that Does not require tab leads for conductance from the internal portion thereof externally to power a subject device, which may be a non-trivial provision because of the thin nature of the electrodes, and potentially that the two sides of the electrode material may not be conductive with each other. In this disclosure, provided are tabless structures that exhibit sufficient safety levels in combination with the internal fuse characteristics noted above while simultaneously displaying increased electrical conductivity capabilities during utilization. Such tabless batteries are further provided with sufficiently sized and configured electrodes and thin current collectors to permit top and bottom contacts with increased surface areas to permit thorough conductance throughout the entirety of the battery, not just through, for instance, a pathway from a top endpoint to a bottom endpoint, and further with higher contact levels between top and bottom capped ends to allow for external electrical access. Combined with the thin film current conductor(s), such structural lithium ion (liquid electrolyte) batteries exhibit levels of amperage and temperature resistance sufficient to achieve the basic internal fuse result with the aforementioned sufficient conductance to an external device, as well. With such a tabless thin current collector battery, the resultant power cell exhibits high conductivity, low internal resistance, and high thermal conductivity, significant improvements within the lithium battery art.

Additionally, the internal fuse developments disclosed herein, exhibiting extremely thin current collector structures, further allow for the potential for repetitive folds thereof within a single cell. Such a fold possibility provides the capability of connecting two sides of a current collector which might otherwise be electrically insulated by a polymer layer situated between the two conducting layers, without the need for excessive internal weight and/or battery volume requirements. Ostensibly, the folded current collector retains the internal fuse characteristics while simultaneously permitting for such high current capability, potentially allowing for very high power within any number of sized batteries without the need for the aforementioned excessive weight and volume requirements, creating new battery articles for different purposes with targeted high-power levels and as high safety benefits as possible.

BACKGROUND OF THE PRIOR ART

Lithium batteries remain prevalent around the world as an electricity source within a myriad of products. From rechargeable power tools, to electronic cars, to the ubiquitous cellular telephone (and like tablets, hand-held computers, etc.), lithium batteries (of different ion types) are utilized as the primary power source due to reliability, above noted rechargeability, and longevity of usage. With such widely utilized power sources, however, comes certain problems, some of which have proven increasingly serious. Notably, safety issues have come to light wherein certain imperfections within such lithium batteries, whether due to initial manufacturing issues or time-related degradation problems, cause susceptibility to firing potentials during short circuit events. Basically, internal defects with conductive materials have been found to create undesirable high heat and, ultimately, fire, within such battery structures. As a result, certain products utilizing lithium batteries, from hand-held computerized devices (the Samsung Galaxy Note 7, as one infamous situation) to entire airplanes (the Boeing 787) have been banned from sales and/or usage until solutions to compromised lithium batteries used therein and therewith have been provided (and even to the extent that the Samsung Galaxy Note 7 has been banned from any airplanes in certain regions). Even the Tesla line of electric cars have exhibited notable problems with lithium battery components, leading to headline-grabbing stories of such expensive vehicles exploding as fireballs due to battery issues. Widespread recalls or outright bans thus remain today in relation to such lithium battery issues, leading to a significant need to overcome such problems.

These problems primarily exist due to manufacturing issues, whether in terms of individual battery components as made or as such components are constructed as individual batteries themselves. Looked at more closely, lithium batteries are currently made from six primary components, a cathode material, a cathode current collector (such as aluminum foil) on which the cathode material is coated, an anode material, an anode current collector (such as copper foil) on which the anode material is coated, a separator situated between each anode and cathode layer and typically made from a plastic material, and an electrolyte as a conductive organic solvent that saturates the other materials thereby providing a mechanism for the ions to conduct between the anode and cathode. These materials are typically wound together into a can, as shown in Prior Art FIG. 1, or stacked. There are many other configurations that are and may be utilized for such battery production purposes, including pouch cells, prismatic cells, coin cells, cylindrical cells, wound prismatic cells, wound pouch cells, and the list goes on. These battery cells, when made correctly and handled gently, can provide energy for various applications for thousands of charge-discharge cycles without any appreciable safety incident. However, as alluded to above, certain events and, in particular, certain defects can cause internal shorting between the internal conductive materials which can lead to heat generation and internal thermal runaway, known to be the ultimate cause of fire hazards within such lithium batteries. Such events may further be caused by, as noted above, internal defects including the presence of metallic particles within the battery, burrs on the current collector materials, thin spots or holes in the separator (whether included or caused during subsequent processing), misalignments of battery layers (leaving "openings" for unwanted conductivity to occur), external debris penetrating the battery (such as road debris impacting a moving vehicle), crushing and/or destabilizing of the cell itself (due to accidents, for instance), charging the cell in a confined space, and the like. Generally speaking, these types of defects are known to cause generation of a small electronic conductive pathway between the anode and cathode. When such an event occurs, a conductive pathway may then cause a discharge of the cell through which ultimately generates excessive heat, thereby compromising the battery structure and jeopardizing the underlying device being powered thereby. Combined with the presence of flammable organic solvent materials as battery electrolytes (which are generally of necessity for battery operability), such excessive heat has been shown to cause ignition thereto, ultimately creating a very dangerous situation. Such problems are difficult to control once started, at the very least, and have led to significant injuries to consumers. Such a potential disastrous situation is certainly to be avoided through the provision of a battery that delivers electrical energy while not compromising the flammable organic electrolyte in such a manner.

The generation of excessive heat internally may further create shrinkage of the plastic separator, causing it to move away from, detach, or otherwise increase the area of a short within the battery. In such a situation, the greater exposed short area within the battery may lead to continued current and increased heating therein, leading to the high temperature event which causes significant damage to the cell, including bursting, venting, and even flames and fire. Such damage is particularly problematic as the potential for firing and worse comes quickly and may cause the battery and potentially the underlying device to suffer an explosion as a result, putting a user in significant danger as well.

Lithium batteries (of many varied types) are particularly susceptible to problems in relation to short circuiting. Typical batteries have a propensity to exhibit increased discharge rates with high temperature exposures, leading to uncontrolled (runaway) flaring and firing on occasion, as noted above. Because of these possibilities, certain regulations have been put into effect to govern the actual utilization, storage, even transport of such battery articles. The ability to effectuate a proper protocol to prevent such runaway events related to short circuiting is of enormous importance, certainly. The problem has remained, however, as to how to actually corral such issues, particularly when component production is provided from myriad suppliers and from many different locations around the world.

Some have honed in on trying to provide proper and/or improved separators as a means to help alleviate potential for such lithium battery fires. Low melting point and/or shrinkage rate plastic membranes appear to create higher potentials for such battery firing occurrences. The general thought has then been to include certain coatings on such separator materials without reducing the electrolyte separation capabilities thereof during actual utilization. Thus, ceramic particles, for instance, have been utilized as polypropylene and/or polyethylene film coatings as a means to increase the dimensional stability of such films (increase melting point, for example). Binder polymers have been included, as well, as a constituent to improve cohesion between ceramic particles and adhesion to the plastic membrane (film). In actuality, though, the thermal increase imparted to the overall film structure with ceramic particle coatings has been found to be relatively low, thus rendering the dominant factor for such a separator issue to be the actual separator material(s) itself.

As a result, there have been designed and implemented, at least to a certain degree, separator materials that are far more thermally stable than the polyethylene and polypropylene porous films that make up the base layer of such typical ceramic-coated separators. These low shrinkage, dimensionally stable separators exhibit shrinkage less than 5% when exposed to temperatures of at least 200° C. (up to temperatures of 250, 300, and even higher), far better than the high shrinkage rates exhibited by bare polymer films (roughly 40% shrinkage at 150° C.), and of ceramic-coated films (more than 20% at 180° C.) (such shrinkage measurement comparisons are provided in Prior Art FIG. 2). Such low shrinkage rate materials may change the mechanism of thermal degradation inside a target cell when a short occurs. Generally speaking, upon the occurrence of a short within such a battery cell, heat will always be generated. If the separator does not shrink in relation to such a short circuit event, heat will continue to be generated and "build up" until another material within the battery degrades. This phenomenon has been simulated with an industry standard nail penetration test. For instance, even with a separator including para-aramid fiber and exhibiting a shrinkage stability up to 550° C., the subject test battery showed a propensity to short circuit with unique internal results. Such a cell was investigated more closely subsequent to such treatment wherein the cell was opened, the excess electrolyte was evaporated, the cell filled with epoxy and then sectioned perpendicular to the nail, which was left in the cell. Scanning electron microscope images were then undertaken using backscattered electron imaging (BEI), which enabled mapping of the different battery elements to show the effect of such a nail penetration activity. These are shown in Prior Art FIGS. 3A and 3B.

In Prior Art FIG. 3A, it is noted that the copper layers consistently come closer to the nail than the aluminum layers. It is also noted that the high stability separator is still intact between the electrodes. Prior Art FIG. 3B shows a higher magnification of the end of one aluminum layer, showing that it ends in a layer of cracked grey matter. This was investigated with BEI, which showed the resultant matter to actually be aluminum oxide, an insulating ceramic. Such evidence led to the proposed conclusion that when the separator itself is thermally stable, the aluminum current collector will oxidize, effectively breaking the circuit (and stopping, as a result, any short circuit once the insulating aluminum oxide is formed). Once the circuit is broken, the current stops flowing and the heat is no longer generated, reversing the process that, with less stable separators, leads to thermal runaway.

This possible solution, however, is limited to simply replacing the separator alone with lower shrinkage rate characteristics. Although such a simple resolution would appear to be of great value, there still remains other manufacturing procedures and specified components (such as ceramic-coated separator types) that are widely utilized and may be difficult to supplant from accepted battery products. Thus, despite the obvious benefits of the utilization and inclusion of thermally stable separators, undesirable battery fires may still occur, particularly when ceramic coated separator products are considered safe for such purposes. Thus, it has been determined that there is at least another, solely internal battery cell structural mechanism that may remedy or at least reduce the chance for heat generation due to an internal short in addition to the utilization of such highly thermal stable separator materials. In such a situation, the occurrence of a short within such a battery cell would not result in deleterious high temperature damage due to the cessation of a completed internal circuit through a de facto internal fuse creation. Until now, however, nothing has been presented within the lithium battery art that easily resolves these problems. The present disclosure provides such a highly desirable cure making lithium battery cells extremely safe and reliable within multiple markets.

Of further and particular interest is the consideration of properly allowing for conduction of electrical charge from the subject lithium ion battery to an external source. This is generally accomplished through the utilization of a tab that is contacted and affixed to a current collector or, potentially, in some way to both anode and cathode current collectors to provide the needed conductance property with an external source. The tab ostensibly functions as a contact with such internal battery components and extends outside of the battery cell casing with contact points for such conductivity purposes. The tab must thus remain in place and not disengage from the current collector(s) and allow for unabated access to the external source without, again, dislodgement internally or disengagement therewith externally. As there have been no disclosures within the lithium ion battery art regarding such thin film current collectors, there is likewise nothing that has attempted to improve upon or optimize such tab connection issues, either. Certainly, standard types of tabs are well known and connect with large current collectors of standard battery cells; however, such do not provide any considerations as to protecting the effects of thin film current collectors (internal fuse, for instance) while still providing a dimensionally stable result overall to protect from battery failure due to structural compromises. Of especial importance is the ability to weld to a tab that consists of thin layers of metal attached to a thicker layer of electrically insulating material such as plastic. Welding solid metal tabs to solid metal foils requires only surface connections, which then allow electrical connections to the entirety of the opposing foil or tab. However, when the two faces of the current collector are electrically isolated by a supporting insulating layers, making a surface connection to a single side is ineffective, leaving the other side electrically isolated. As such, nothing has been discussed or disclosed within the current lithium ion battery art or industry to such an effect. The present disclosure, however, overcomes such paradigms and provides a result heretofore unexplored and/or understood within the pertinent industry.

Lithium battery cells typically come in two basic configurations overall, namely a rolled or stacked format. Rolled structures are commonly known and provided either a cylindrical or Jelly-roll (prismatic) format (and in either a hard or soft case structure). Stacked structures are known as described with the different components (anode, collector, separator, cathode) in a stacked series within the confines of the battery housing. As noted above, such typical battery configurations utilize standard monolithic, or at least relatively thick, current collectors which add weight to the overall battery, of course, but which also contribute to the drawbacks described above (high internal resistance, runaway charge potentials with shorts, etc.). Such standard configurations further utilize tabs to provide conductivity from the internal portions externally for power transfer purposes. Rolled cells generally have a tab welded directly to the current collector, which is welded to an electrode that is accessible from outside the cell. Stacked cells generally have a tab welded to a stack of current collectors, and the tab either is welded to an electrode that is accessible from outside the cell, or the tab itself is sealed into the case in a way that it is accessible from outside the cell. In both cases, there are direct welding connections that reach from the current collector to the outside of the cell.

Both tabbing schemes, however, and unfortunately, exhibit significant difficulties and drawbacks. Rolled structures, for examples, require a long path length from some electrode material to the subject tab at the battery cap (since, for example, the roll requires the conductivity to flow through each roll within the battery until reaching the tab for external power transfer). This long-distance transfer creates a high internal resistance that may compromise the level of electrical conductivity and severely limit the effectiveness of the battery itself. With stacked battery configurations, the inclusion of multiple levels of components requires greater amounts/levels of welding to secure a subject tab in place for effective power transfer externally. Such increased complexity increases the overall costs of manufacture, at least, and can result in compromised electrical conductivity, if not total loss, if the weld is weakened over time. In any event, with two standard lithium ion battery structures, it is imperative that such configurations provide effective and reliable long-term (rechargeable) power generation and transfer. To date, such issues have found little in the way of improvements.

Certain attempts have been made to provide some means to alleviate such difficulties, albeit with little to show in terms of actual market usefulness. For instance, Tesla has shown, in United States Published Patent Application US2020/0144676, a mechanism to make electrical connections directly from the current collector to a pole, which may or may not be the case of the cell. This direct connection allows very good conductivity, delivering low internal resistance and also good internal thermal conductivity. However, such high internal conductivity and short direct electric pathways from a potential short circuit to the rest of the cell can lead to increased safety hazards as the cell can discharge very quickly into any potential short circuit. Thus, there is a clear need to avoid such hazards if possible.

As shown herein and in the parent applications cited above, metallized films for current collector utilization has been shown to increase safety in lithium battery cells. Other types of metallized films have been proposed (by CATL, for instance), but such disclosures have deemed that high internal resistance levels are required with such metallized film components, thereby providing a safety feature, but with a sacrifice of battery effectiveness and efficiency.

Thus, it would be highly desirable to have a mechanism to reduce the internal resistance in the high safety metallized film current collector cells. However, Tesla fails to meet such safety levels and CATL teaches against low internal resistance cells using metallized film current collectors.

Additionally, it should be noted that Tesla discloses certain tabless battery designs (albeit without increased safety levels). However, such Tesla tabless designs rely on very orderly folding and bending of the (thick, solid metal) current collector at the edges. In the case of using a metallized film (thin) current collector, as now disclosed, it is not obvious that a tabless design can reliably make contact with both metallized sides of the metallized film current collector or allow enough space between the subject current collectors to permit sufficient passthrough of liquid electrolyte. As such, there is nothing within the prior art that provides the necessary level of safety and combined low resistance for a tabless lithium ion battery. The present disclosure overcomes these deficiencies.

ADVANTAGEOUS AND SUMMARY OF THE DISCLOSURE

A distinct advantage of this disclosure is the ability through structural components to provide a mechanism to break the conductive pathway when an internal short occurs, stopping or greatly reducing the flow of current that may generate heat within the target battery cell. Another advantage is the ability to provide such a protective structural format within a lithium battery cell that also provides beneficial weight and cost improvements for the overall cell manufacture, transport and utilization. Thus, another advantage is the generation and retention of an internal fuse structure within a target battery cell until the need for activation thereof is necessitated. Another advantage is the provision of a lower weight battery through the utilization of a thin film base current collector that prevents thermal runaway during a short circuit or like event. Still another advantage is the ability to utilize flammable organic electrolytes materials within a battery without any appreciable propensity for ignition thereof during a short circuit or like event. Another advantage is the ability to use a flammable electrode material, such as lithium metal, without the propensity for ignition thereof during a short circuit or like event. Another distinct advantage is the ability to provide a tabless structure to avoid welding necessities for transfer of power generated within the battery externally therefrom. Yet another advantage is the ability to provide a low internal resistance battery with electrical conductance from one pole to another throughout the entirety thereof (and not solely through a circular or rolled structure). Still another advantage is the ability to effectively extend a thin film current collector (particularly, though not necessarily) within a rolled battery structure in order for such an extended component is crushed at the pole or one pole of the battery for improved contact internally between collector regions (again, for more effective and complete electrical conductance throughout).

Accordingly, this inventive disclosure encompasses an energy storage device comprising an anode, a cathode, at least one polymeric or fabric separator present between said anode and said cathode, an electrolyte, and at least one current collector in contact with at least one of said anode and said cathode; wherein either of said anode or said cathode are interposed between at least a portion of said current collector and said separator, wherein said current collector comprises a conductive material coated on a polymeric material substrate, and wherein said current collector stops conducting at the point of contact of an exposed short circuit at the operating voltage of said energy storage device, wherein said voltage is at least 2.0 volts. One example would be a current density at the point of contact of 0.1 amperes/mm2 with a tip size of 1 mm2 or less. Of course, for larger cells, the required threshold current density may be higher, and the cell may only stop conducting at a current density of at least 0.3 amperes/mm2, such as at least 0.6 amperes/mm2, or even at least 1.0 amperes/mm2. Such a coated polymeric material substrate should also exhibit an overall thickness of at most 25 microns, as described in greater detail below. Methods of utilizing such a beneficial current collector component within an energy storage device (whether a battery, such as a lithium ion battery, a capacitor, and the like) are also encompassed within this disclosure.

Additionally, herein disclosed is a lithium-ion cell comprising a housing having a positive pole and a negative pole, said housing further including therein:
i) an anode current collector,
ii) an anode,
iii) a cathode current collector,
iv) a cathode,
v) a separator, and
vi) liquid electrolytes:
wherein said anode is present as a coating on said anode current collector,
wherein said cathode is present as a coating on said cathode current collector,
wherein said separator is interposed between and contacts with both of said anode and said cathode,
wherein said anode current collector is electrically connected to said negative pole of said housing,
wherein said cathode current collector is electrically connected to said positive pole of said housing,
wherein at least one of said anode and cathode current collectors exhibits a length larger than the length of said anode or cathode coating such that at least a portion of said at least one of said anode and cathode current collectors is exposed for contact with one of said negative and positive poles of said housing,
wherein said anode, said anode current collector, said cathode, said cathode current collector, said separator, and said liquid electrolytes are sealed in said housing case, with said positive pole and said negative pole each connecting electrically to the outside of said housing,
wherein at least one of the said anode current collector or said cathode current collector comprises a metallized film comprising a polymer layer that is coated on both sides by a conductive layer,
wherein said metallized film connects to either or both of said positive or negative poles through at least one fold present therein due to crushing of said exposed metallized film current collectors, and
wherein said metallized film is not connected to either negative or positive poles through a welded connection.

Furthermore, such a unique battery (lithium ion liquid electrolyte, for instance) may include a configuration wherein each side of the metallized film of either anode or cathode (or both) current collectors makes direct contact with either of the poles of the housing. As well, such metallized films may exhibit metallization on both sides of the subject current collector(s). Such metallized films may additionally be exposed in a manner that allows for folds, or crushed portions (in association with contact with the housing or a pole thereof) to create connections in such a manner in a randomized fashion with sufficient spaces/voids for liquid electrolyte movement throughout the battery housing as well. Such exposures of metallized films are thus considered extensions or protrusions from the internal composite of anode, cathode, separator, and current collectors within the battery housing such that anywhere from 1 to 3 millimeters of exposed metallized film is present to contact with (and thus be folded/crushed by) the housing or pole (negative and/or positive) upon contact and sealing. Functionally, the length of exposed current collector must be large enough to allow folding and crushing such that both sides of the metallized film current collector have direct contact with the housing or pose, and thus lengths lower than 1 mm may only be appropriate in very small cells. Thus, lengths of exposed current collector of greater than 0.2 mm, or 0.5 mm may also function, especially in cells of small capacity, such as those with less than 1 Amp-hour capacity, or less than 0.5 Amp-hour capacity. Additionally, the length must be short enough such that the current collector does not contact the current collector from the other electrode, bypassing the separator. Lengths longer than 3 mm may be acceptable in certain cell geometries and with certain separator positions, so long as this condition is met. Thus, for cells of large size, such as those with a capacity greater than 5 Amp-hour capacity, or greater than 10 Amp-hour capacity, or greater than 25 Amp-hour capacity, exposed lengths of less than 5 mm, or 7 mm, or even 10 mm may provide sufficient performance. In such a manner, the space available for such folding/crushing between the housing or pole would be from 0.5 to 2.5 millimeters, as long as the protruding metallized film exceeds the space amount (in order to permit such folding/crushing). Depending on the geometry and size of the cell, other dimensions of space may be used, so long as they provide direct contact from each side of the folded or crushed metallized film current collector to the housing or pole, and also do not allow for the folded or crushed metallized film to have direct contact with the current collector from the opposing electrode. As such, then, the housing or pole that contacts such a protruding metallized film may be of any type of texture to allow for any number of random contacts to be created with such a crushing/folding operation. Thus, a smooth, spiral, or other type of pattern (lattice, grid, etc.) may be utilized for such a purpose.

Additionally, there may be encompassed herein the same base battery structure as described above with the current collector(s) within repetitive electrode assemblies (composites) having first and second opposing sides that of the extensions or protrusions thereof, wherein the contact with a pole or housing portion creates at least one fold with a first side thereof said current collector(s) in contact with said pole or housing portion and simultaneously in contact with at least one fold with a second side thereof said current collector(s) in contact with the same said pole or housing portion. Furthermore, the crush surface (pole or housing portion) must comprise a portion which is conductive in nature, having a minimum conductivity of 100,000 siemens/meter, or even greater than 1 million siemens/meter. As well, such folds of the current collector(s) may be folded in a randomized fashion against the crush surface (housing portion or pole) and separate layers of the current collector(s) may be crushed in such a manner that at least a plurality of layers thereof are in contact with one another and wherein at least one fold is in contact with the housing portion or pole. Additionally, as well, the same base battery device may encompass the same structural considerations wherein the crushed current collector(s) includes a plurality of pathways or voids therein for liquid electrolyte flow through for electrode contact purposes.

Additionally, as it concerns metallized film current collectors noted above, much larger current densities may be supported for a very short period of time, or in a very small-tipped probe. In such a situation, a larger current, such as 5 amperes, or 10 amperes, or even 15 amperes, may be connected for a very short time period [for example, less than a second, alternatively less than 0.1 seconds, or even less than 1 millisecond (0.001 seconds)]. Within the present disclosure, while it may be possible to measure a larger current, the delivery time for such a current is sufficiently short such that the total energy delivered is very small and not enough to generate enough heat to cause a thermal runaway event within the target battery cell. For example, a short within a conventional architecture cell has been known to generate 10 amperes for 30 seconds across 4.2 volts, a result that has delivered 1200 joules of energy to a small local region within such a battery. This resultant measurement can increase the temperature of a 1-gram section of the subject battery by about 300° C., a temperature high enough to not only melt the conventional separator material present therein, but also drive the entire cell into a runaway thermal situation which, as noted above, may cause the aforementioned compromise of the electrolyte materials present therein and potential destruction of not only the subject battery but the device/implement within which it is present and the surrounding environment as well. Thus, it is certainly a possibility that the ability to reduce the time for short circuit duration, as well as the resulting delivered energy levels associated within such a short to a low joules measurement, thermal runaway (and the potential disaster associated therewith) may be avoided, if not completely prevented. For instance, the reduction of short circuit residence time within a current collector to 1 millisecond or less can then subsequently reduce the amount of delivered energy to as low as 0.04 joules (as opposed to 1200 joules, as noted above, leading to excessive, 300° Celsius or greater, for example, within a 1-gram local region of the subject battery). Such a low level would thus only generate a temperature increase of 0.01° C. within such a 1-gram local region of battery, thus preventing thermal runaway within the target cell and thus overall battery.

Therefore, it is another significant advantage of the present disclosure to provide the battery a current collector that drastically limits the delivery time of a current level applied to the target current collector surface through a probe tip (in order to controllably emulate the effect of an internal manufacturing defect, a dendrite, or an external event which causes an internal short within the subject battery) to less than 1 second, preferably less than 0.01 seconds, more preferably less than 1 millisecond, and most preferably, perhaps, even less than 100 microseconds, particularly for much larger currents. Of course, such a current would be limited to the internal voltage of the cell, which might be 5.0 V, or 4.5 V, or 4.2 V or even less, such as 4.0 V or 3.8 V, but with a minimum of 2.0 V.

Such a novel current collector component is actually counterintuitive to those typically utilized and found within lithium (and other types) of batteries and energy storage devices today. Standard current collectors are provided are conductive metal structures, such as aluminum and/or copper panels of thicknesses that are thought to provide the necessary strength to survive the manufacturing process. The strength of these metals necessitates a thickness that is far in excess of the electrical needs of the cell. For example, the electrical needs of the cell dictate a metal thickness on the order of 500 nm of Aluminum, while the thinnest solid foil aluminum that can survive the manufacturing process is around 10 μm. It appears, however, that such a belief has actually been misunderstood, particularly since the thick panels prevalent in today's energy storage devices will actually support any current the typically low impedance cell can deliver when a short occurs and thus contribute greatly to runaway temperatures if and when such a situation occurs. Such a short may be caused, for example, by a dendritic formation between the anode and cathode. Such a malformation (whether caused at or during manufacture or as a result of long-term usage and thus potential degradation) may allow for voltage to pass unexpectedly from the anode to the cathode, thereby creating an increase in current and consequently in temperature at the location such occurs. Indeed, one potential source of short circuit causing defect are burrs that form on the edges of these thick typical current collectors when they are slit or cut with worn blades during repetitive manufacturing processes of multiple products (as is common nowadays). It has been repeatedly analyzed and understood, however, that the standard current collector materials merely exhibit a propensity to create a durable short circuit and allow for temperature increase, and further permitting the current present during such an occurrence to continue through the device, thus allowing for unfettered generation and movement, leaving no means to curtail the current and thus temperature level from increasing. This problem leads directly to runaway high temperature results; without any internal means to stop such a situation, the potential for fire generation and ultimately device immolation and destruction is typically imminent. Additionally, the current pathway (charge direction) of a standard current collector remains fairly static both before and during a short circuit event, basically exhibiting the same potential movement of electric charge as expected with movement from cathode to anode and then horizontally along the current collector in a specific direction. With a short circuit, however, this current pathway fails to prevent or at least curtail or delay such charge movement, allowing, in other words, for rapid discharge in runaway fashion throughout the battery itself. Coupled with the high temperature associated with such rapid discharge leads to the catastrophic issues (fires, explosions, etc.) noted above.

To the contrary, and, again, highly unexpected and counterintuitive to the typical structures and configurations of lithium batteries, at least, the utilization of a current collector of the instant disclosure results in an extremely high current density measurement (due to the reduced thickness of the conductive element) and prevention of charge movement (e.g., no charge direction) in the event of a short circuit. In other words, with the particular structural limitations accorded the disclosed current collector component herein, the current density increases to such a degree that the material is unable to remain intact and fails by vaporizing. The total amount of energy necessary to cause this failure of the conductor is low as discussed above and results in very low temperatures generated from the event. Combined with the other structural considerations of such a current collector component, namely the actual lack of a dimensionally stable polymeric material in contact with such a conductive material layer, the conductive material oxidizes instantly at the charge point thereon, leaving, for example, aluminum or cupric oxide, both nonconductive materials. With such instantaneous nonconductive material generation, the short circuit charge appears to dissipate as there is no direction available for movement thereof. Thus, with the current collector as now described, an internal short circuit occurrence results in an immediate cessation of current, effectively utilizing the immediate high temperature result from such a short to generate a barrier to further charge movement. As such, the lack of further current throughout the body of the energy storage device (in relation to the short circuit, of course) mutes such an undesirable event to such a degree that the short is completely contained, no runaway current or high temperature result occurs thereafter, and, perhaps most importantly, the current collector remains viable for its initial and protective purposes as the localized nonconductive material then present does not cause any appreciable reduction in current flow when the energy storage device (battery, etc.) operates as intended. Furthermore, the relatively small area of nonconductive material generation leaves significant surface area, etc., on the current collector, for further utilization without any need for repair, replacement, or other remedial action. The need to ensure such a situation, which, of course, does not always occur, but without certain precautions and corrections, as now disclosed, the potential for such a high temperature compromise and destruction event actually remains far higher than is generally acceptable. Thus, the entire current collector, due to its instability under the conditions of a short circuit, becomes a two-dimensional electrical fuse, preventing the potentially disastrous high currents associated with short circuits by using the instantaneous effect of that high current to destroy the ability of the current collector to conduct current at the point of the short circuit.

Such advantages are permitted in relation to such a novel resultant current collector that may be provided, with similar end results, through a number of different alternatives. In any of these alternative configurations, such a current collector as described herein functions ostensibly as an internal fuse within a target energy storage device (e.g., lithium battery, capacitor, etc.). In each instance (alternative), however, there is a current collector including a polymeric layer that is metallized on one or both sides thereof with at least one metallized side in contact with the anode or cathode of the target energy storage device. One alternative then is where the total thickness of the entire metallized (coated) polymeric substrate of the current collector is less than 20 microns, potentially preferably less than 15 microns, and potentially more preferably less than 10 microns, all with a resistance measurement of less than 1 ohm/square potentially preferably less than 0.1 ohms/square, and potentially more preferably less than 50 milli-ohms/square. Typical current collectors may exhibit these features but do so at far higher weight than those made with reinforcing polymeric substrates and without the inherent safety advantages of this presently disclosed variation. For example, a copper foil at 10 microns thick may weight 90 grams/m$^2$. However, a copperized film may weigh as little as 50 grams/m$^2$, or even as little as 30 gram/m$^2$, or even less than 20 grams/m$^2$, all while delivering adequate electrical performance required for the cell to function. In this alternative structure, however, the very thin component also allows for a short to react with the metal coat and in relation to the overall resistance levels to generate, with an excessively high temperature due to a current spike during such a short, a localized region of metal oxide that immediately prevents any further current movement therefrom.

Another possible alternative for such a novel current collector is the provision of a temperature dependent metal (or metallized) material that either shrinks from a heat source during a short or easily degrades at the specific material location into a nonconductive material (such as aluminum oxide from the aluminum current collector, as one example and as alluded to above in a different manner). In this way, the current collector becomes thermally weak, in stark contrast to the aluminum and copper current collectors that are used today, which are quite thermally stable to high temperatures. As a result, an alloy of a metal with a lower inherent melting temperature may degrade under lower shorting current densities, improving the safety advantages of the lithium-based energy device disclosed herein. Another alternative is to manufacture the current collector by coating a layer of conductive material, for example copper or aluminum, on fibers or films that exhibit relatively high shrinkage rates at relatively low temperatures. Examples of these include thermoplastic films with melt temperatures below 250° C., or even 200° C., and can include as non-limiting examples polyethylene terephthalate, nylon, polyethylene or polypropylene. Another possible manner of accomplishing such a result is to manufacture a current collector by coating a layer of conductive material, for example copper or aluminum, as above, on fibers or films that can swell or dissolve in electrolyte when the materials are heated to relatively high temperatures compared to the operating temperatures of the cells, but low compared to the temperatures that might cause thermal runaway. Examples of such polymers that can swell in lithium ion electrolytes include polyvinylidene fluoride and poly acrylonitrile, but there are others known to those with knowledge of the art. Yet another way to accomplish such an alternative internal electrical fuse generating process is to coat onto a substrate a metal, for example aluminum, that can oxidize under heat, at a total metal thickness that is much lower than usually used for lithium batteries. For example, a very thin aluminum current collector as used today may be 20 microns thick. A coating thickness of a total of less than 5 microns would break the circuit faster, and one less than 2 microns, or even less than 1 micron would break the circuit even faster. Even still, another way to accomplish the break in conductive pathway is to provide a current collector with limited conductivity that will degrade in the high current densities that surround a short, similar to the degradation found today in commercial fuses. This could be accomplished by providing a current collector with a resistivity of greater than 5 mOhm/square, or 10 mOhm/square, or potentially preferably greater than 20 mOhm/square, or, a potentially more preferred level of greater than 50 mOhm/square. These measurements could be on one side, or on both sides of a material coated on both sides. The use of current collectors of different resistivities may further be selected differently for batteries that are designed for high power, which might use a relatively low resistance compared to cells designed for lower power and higher energy, and/or which might use a relatively high resistance. Still another way to accomplish the break in conductive pathway is to provide a current collector that will oxidize into a non-conductive material at temperatures that are far lower than aluminum, thus allowing the current collector to become inert in the area of the short before the separator degrades. Certain alloys of aluminum will oxidize faster than aluminum itself, and these alloys would cause the conductive pathway to deteriorate faster or at a lower temperature. As possible alternatives, there may be employed any type of metal in such a thin layer capacity and that exhibits electrical conductivity, including, without limitation, gold, silver, vanadium, rubidium, iridium, indium, platinum, and others (basically, with a very thin layer, the costs associated with such metal usage may be reduced drastically without sacrificing conductivity and yet still allowing for the protections from thermal runaway potentials during a short circuit or like event). As well, layers of different metals may be employed or even discrete regions of metal deposited within or as separate layer components may be utilized. Certainly, too, one side of such a coated current collector substrate may include different metal species from the opposing side, and may also have different layer thicknesses in comparison, as well.

One way to improve the electrical properties of the cell would be to ensure that a coated current collector includes two conductive coated sides, ostensibly allowing for conductivity from the coating on one side to the coating on the other side. Such a result is not possible for a non coated polymer film, for instance. However, it has been realized that such a two-sided conductivity throughput can be achieved by, as one non-limiting example, a nonwoven including a certain percentage of conducting fibers, or a nonwoven loaded with conductive materials, or a nonwoven made from a conductive material (such as carbon fibers or metal fibers), or, as noted above, a nonwoven containing fibers coated with a conductive material (such as fibers with a metal coating on the surface). Another type of novel thin current collector material exhibiting top to bottom conductivity may be a film that has been made conductive, such as through the utilization of an inherently conductive material (such as, for example, conductive polymers such as polyacetylene, polyaniline, or polyvinylpyrrolidone), or via loading with a conductive material (such as graphite or graphene or metal particles or fibers) during or after film manufacture. Additionally, another possible two-sided thin current collector material is a polymer substrate having small perforated holes with sides coated with metal (aluminum or copper) during the metallization process. Such a conductivity result from one side to the other side would not need to be as conductive as the conductive coatings.

Thus, such alternative configurations garnering ostensibly the same current collector results and physical properties include a) wherein the total thickness of the coated polymeric substrate is less than 20 microns with resistance less than 1 ohm/square, b) the collector comprising a conductive material coated on a substrate comprising polymeric material, wherein the polymeric material exhibits heat shrinkage at 225° C. of at least 5%, c) wherein the collector metallized polymeric material swells in the electrolyte of the battery, such swelling increasing as the polymeric material is heated, d) wherein the collector conductive material total thickness is less than 5 microns when applied to a polymeric substrate, e) wherein the conductivity of the current collector is between 10 mOhm/square and 1 ohm/square, and f) wherein the metallized polymeric substrate of the collector exhibits at most 60% porosity. The utilization of any of these alternative configurations within an energy storage device with a separator exhibiting a heat shrinkage of less than 5% after 1 hour at 225° C. would also be within the purview of this disclosure. The overall utilization (method of use) of this type of energy storage device (battery, capacitor, etc.) is also encompassed herein.

While the primary advantage of this invention is enhanced safety for the cell, there are other advantages, as alluded to above, including reduced weight of the overall energy storage device through a reduced amount of metal weight in relation to such current collector components. Again, it is completely counterintuitive to utilize thin metallized coated polymeric layers, particularly of low dimensionally stable characteristics, for current collectors within such battery articles. The present mindset within this industry remains the thought that greater amounts of actual metal and/or insulator components are needed to effectuate the desired protective results (particularly from potential short circuit events). It has now been unexpectedly realized that not only is such a paradigm incorrect, but the effective remedy to short circuiting problems within lithium batteries, etc., is to reduce the amount of metal rather than increase and couple the same with thermally unstable base layers. Thus, it has been not only realized, again, highly unexpectedly, that thin metal layers with such unstable base layers provide the ability to combat and effectively stop discharge events during short circuits, the overall effect is not only this far safer and more reliable result, but a significantly lower overall weight and volume of such component parts. Thus, the unexpected benefits of improved properties with lowered weight and volume requirements within energy storage products (batteries, etc.), accords far more to the industry than initially understood.

As a further explanation, aluminum, at a density of 2.7 g/cm$^3$, at 20 microns thick would weigh 54 g/m$^2$. However, the same metal coated at 1 micron on a 10-micron thick polypropylene film (density 0.9 g/cm3) would weigh 11.7 g/m$^2$. This current collector reduction in weight can reduce the weight of the entire target energy storage device (e.g., battery), increasing mobility, increasing fuel mileage or electric range, and in general enhance the value of mobile electric applications.

Additionally, because of the high strength of films, the above example can also be made thinner, a total thickness of 11 microns compared to 20 microns, for example, again reducing the volume of the cell, thereby effectively increasing the energy density. In this way, a current collector of less than 15 microns, preferably less than 12, more preferably less than 10, and most preferably less than 8 microns total thickness, can be made and utilized for such a purpose and function.

With the bulk resistivity of aluminum at $2.7 \times 10^{-8}$ ohm-m and of copper at $1.68 \times 10^{-8}$ ohm-m, a thin coating can be made with less than 1 ohm/square, or less than 0.5 ohms/square, or even less than 0.1 ohms/square, or less than 0.05 ohms/square. The thickness of these conductive coatings could be less than 5 microns, preferably than 3 microns, more preferably less than 2 microns, potentially most preferably even less than 1 micron. It is extremely counterintuitive, when standard materials of general use in the market contain 10 microns or more of metal, that suitable performance could be obtained using much less metal. Indeed, most of the metal present in typical storage devices is included to give suitable mechanical properties for high speed and automated processing. It is one of the advantages of this invention to use a much lower density polymer material to provide the mechanical properties, allowing the metal thickness to be reduced to a level at which the safety of the cell is improved because of the inability of the current collector to support dangerously high current densities that result from internal electrical shorts and result in thermal runaway, smoke and fire.

Additionally, these conductive layers can be made by multiple layers. For example, a layer of aluminum may be a base layer, coated by a thin layer of copper. In this way, the bulk conductivity can be provided by the aluminum, which is light, in expensive and can easily be deposited by vapor phase deposition techniques. The copper can provide additional conductivity and passivation to the anode, while not adding significant additional cost and weight. This example is given merely to illustrate and experts in the art could provide many other multilayer conductive structures, any of which are excellent examples of this invention.

These thin metal coatings will in general result in higher resistance than an aluminum or copper current collector of normal practice, providing a distinguishing feature of this invention in comparison. Such novel suitable current collectors can be made at greater than 10 mOhm/square, preferably greater than 20 mOhm/square, more preferably greater than 50 mOhm/square, and potentially most preferably even greater than 100 mOhm/square. Additionally, cells made with the thermally weak current collectors described above could be made even more safe if the separator has a high thermal stability, such as potentially exhibiting low shrinkage at high temperatures, including less than 5% shrinkage after exposure to a temperature of 200° C. for 1 hour, preferably after an exposure of 250° C. for one hour, and potentially more preferably after an exposure to a temperature of 300° C. for one hour. Existing separators are made from polyethylene with a melt temperature of 138° C. and from polypropylene with a melt temperature of 164° C. These materials show shrinkage of >50% at 150° C., as shown in FIG. 2; such a result is far too high for utilization with a thin current collector as now described herein. To remedy such a problem, it has been realized that the utilization of certain separators that shrink less than 50% at 150° C., or even less than 30%, or less than 10%, as measured under NASA TM —2010-216099 section 3.5 are necessary. Even ceramic coated separators show significant shrinkage at relatively modest temperatures, either breaking entirely or shrinking to more than 20% at 180° C. It is thus desirable to utilize a separator that does not break during the test, nor shrink to more than 20% at an exposure of 180° C. (at least), more preferably more than 10%, when measured under the same test standard. The most preferred embodiment would be to utilize a separator that shrinks less than 10% when exposed to a temperature of 200° C., or 250° C., or even 300° C.

For any of these metallized substrates, it is desirable to have a low thickness to facilitate increase the energy density of the cell. Any means can be used to obtain such thickness, including calendering, compressing, hot pressing, or even ablating material from the surface in a way that reduces total thickness. These thickness-reducing processes could be done before or after metallization. Thus, it is desirable to have a total thickness of the metallized substrate of less than 25 microns, preferably less than 20 microns, more preferably less than 16 microns, and potentially most preferably less than 14 microns. Commercial polyester films have been realized with thicknesses of at most 3 microns, and even lower at 1.2 microns. These types could serve as suitable substrates and allow the total thickness of the current collector to be less than 10 microns, preferably less than 6 microns, and more preferably less than 4 microns. Such ultra-thin current collectors (with proper conductivity as described above and throughout) may allow much higher energy density with improved safety performance, a result that has heretofore gone unexplored.

It is also desirable to have low weight for these metallized substrates. This could be achieved through the utilization of low-density polymer materials such as polyolefins or other low-density polymers including polyethylene, polypropylene, and polymethylpentene, as merely examples. It could also be achieved by having an open pore structure in the substrate or even through utilization of low basis weight substrates. Thus, the density of the polymer used in the substrate material could be less than 1.4 g/cm$^3$, preferably less than 1.2 g/cm$^3$, and potentially more preferably less than 1.0 g/cm$^3$. Also, the areal density of the substrate material could be less than 20 g/m$^2$, preferably less than 16 g/m$^2$, and potentially most preferably less than 14 g/m$^2$. Additionally, the areal density of the metal coated polymer substrate material could be less than 40 g/m$^2$, preferably less than 30 g/m², more preferably less than 25 g/m², and potentially most preferably less than 20 g/m².

Low weight can also be achieved with a porous polymer substrate. However, the porosity must not be too high for these materials, as such would result in low strength and high thickness, effectively defeating the purpose of the goals involved. Thus, such base materials would exhibit a porosity lower than about 60%, preferably lower than 50%, and potentially more preferably lower than 40%. Since solid materials can be used for this type of metal coated current collector, there is no lower limit to the porosity.

High strength is required to enable the materials to be processed at high speeds into batteries. This can be achieved by the use of elongated polymers, either from drawn fibers or from uniaxially or biaxially drawn films.

As presented below in the accompanying drawings the descriptions thereof, an energy storage device, whether a battery, a capacitor, a supercapacitor and the like, is manufactured and thus provided in accordance with the disclosure wherein at least one current collector that exhibits the properties associated with no appreciable current movement after a short is contacting a cathode, an anode, or two separate current collectors contacting both, and a separator and electrolytes, are all present and sealed within a standard (suitable) energy storage device container, is provided. The cathode, anode, container, electrolytes, and in some situations, the separator, components are all standard, for the most part. The current collector utilized herewith and herein, however, is, as disclosed, not only new and unexplored within this art, but counterintuitive as an actual energy storage device component. The further utilization of such a current collector (thin metallized film, in particular) as a connecting tab (in replacement, in other words, of a welded tab structure) has heretofore been nonexistent within the battery art, as well. Such issues, are, again, described in greater detail below.

As noted above, in order to reduce the chances, if not totally prevent, thermal runaway within a battery cell (particularly a lithium ion rechargeable type, but others are possible as well, of course), there is needed a means to specifically cause any short circuit therein to basically exist within a short period of time, with reduced residence time within or on the subject current collector, and ultimately exhibit a resultant energy level of de minimis joule levels (i.e., less than 10, preferably less than 1, and most preferably less than 0.01). In such a situation, then, and as alluded to earlier, the electrical pathway from anode to cathode, and through the separator, with the thin conductive current collector in place, and organic flammable electrolyte present, it has been observed that the low-weight, thin current collector allows for such a desirable result, particularly in terms of dissipation of rogue charges at the collector surface and no appreciable temperature increase such that ignition of the electrolyte component would be imminent. Surprisingly, and without being bound to any specific scientific explanation or theory, it is believed that the conductive nature of the thin current collector material allows for short circuit electrical charges to merely reach the thin conductive current collector and immediately create a short duration high-energy event that reacts between the metal at the current collector surface with the electrical charge itself, thereby creating a metal oxide to form at that specific point on the current collector surface. The metal oxide provides insulation to further electrical activity and current applied dissipates instantaneously, leaving a potential deformation within the collector itself, but with the aforementioned metal oxide present to protect from any further electrical charge activity at that specific location. Thus, the remaining current collector is intact and can provide the same capability as before, thus further providing such protections to any more potential short circuits or like phenomena. In the case of thermal runaway in prior art battery products, the anode, cathode, current collectors and separator comprise the electrical pathway which generate heat and provide the spark to ignite the cell in reaction to a short circuit, as an example. The further presence of ion transporting flammable electrolytes thus allows for the effective dangers with high temperature results associated with such unexpected electrical charges. In essence, the heat generated at the prior art current collector causes the initial electrochemical reactions within the electrolyte materials, leading, ultimately to the uncontrolled ignition of the electrolyte materials themselves. Thus, the disclosed inventive current collector herein particularly valuable when utilized within battery cells including such flammable electrolytes. As examples, then, such electrolytes generally include organic solvents, such as carbonates, including propylene carbonate, ethylene carbonate, ethyl methyl carbonate, di ethyl carbonate, and di methyl carbonate, and others. These electrolytes are usually present as mixtures of the above materials, and perhaps with other solvent materials including additives of various types. These electrolytes also have a lithium salt component, an example of which is lithium hexafluorophosphate, $LiPF_6$. Such electrolytes are preferred within the battery industry, but, as noted, do potentially contribute to dangerous situations. Again, the disclosed current collector in association with other battery components remedies these concerns significantly and surprisingly.

One way that this current collector will exhibit its usefulness is in the following test. A current source with both voltage and current limits can be set to a voltage limit similar to the operating voltage of the energy storage device in question. The current can then be adjusted, and the current collector tested under two configurations. In the first, a short strip of the current collector of known width is contacted through two metal connectors that contact the entire width of the sample. The current limit of the current source can be raised to see if there is a limit to the ability of the material to carry current, which can be measured as the total current divided by the width, achieving a result in A/cm, herein designated as the horizontal current density. The second configuration would be to contact the ground of the current source to one of the full width metal contacts, and then touch the tip of the probe, approximately 0.25 mm², to a place along the strip of the current collector. If the current is too high, it will burn out the local area, and no current will flow. If the current is not too high for the current collector, then the full current up to the limit of the current source will flow. The result is a limit of current in A/mm2, herein designated as the vertical current density. In this way, a current collector which can reach a high current under both configurations would be similar to the prior art, and a current collector which could support the horizontal current when contacted under full width, but would not support a similar vertical current under point contact would be an example of the invention herein described.

For example, it may be desirable for a current collector to be able to support horizontal current density 0.1 A/cm, or 0.5 A/cm, or 1 A/cm or 2 A/cm or even 5 A/cm. And for a current collector that could support a horizontal current density as above, it would be desirable not to support a vertical current density of 0.1 A/mm², or 0.5 A/mm², or 1 A/mm² or 2 A/mm² or even 5 A/mm².

As alluded to above, there is also generally present within lithium ion battery cells a tab weld to join the internal components, particularly the current collectors, together to connect to a tab lead for transfer of charge to an external source. However, again, as alluded to previously, such tab leads and external connections have distinct deficiencies within rolled and/or stacked configurations, particularly in terms of limits on the electrical charge capability from one pole to another. As such, there is a need to develop improvements that allow for safety measures (reduce runaway charge potentials), allow for low resistance (for electrical charge optimization), and possibility of increasing actual charge transfer through the entirety of a cell, rather than through a series of rolled components/stacked structures as limited pathways. The present disclosure allows for such beneficial improvements heretofore lacking within the state of the lithium ion battery industry.

In this situation, then, it was realized, without any definitive reliance upon any specific scientific basis or rationale, that the replacement of welded tabs (whether through ultrasonic, mechanical, electrical, or other type of connection with a tab within a battery housing and leading outwardly to a poles/housing ends/case thereof) with exposed and extended thin film (metallized film) current collectors portions alone provides sufficient capability of electrical charge conductance for battery operation to occur. Additionally, however, through the utilization of crushed exposed extension (or protrusions) thereof such current collectors, it was further realized that not only was there sufficient conductance in such a manner, but an unexpectedly beneficial optimization of such levels achieved through the ability of the current collector component(s) to conduct through the entirety thereof from one contacted pole to the other of the subject battery case (housing) instead of requiring a tab to provide an initial charge capability at one pole with the conductance following through the full length of the overall current collector(s) (whether in a rolled or stacked formation) before finally reaching the opposing tab. To the contrary, then, and surprisingly, it was realized that the presence and manipulation of extended, protruding, and/or exposed current collector portions in this manner, particularly for the thin metallized films described at length herein, allows for the resultant de facto creation of tab substitutes that provide much greater levels of conductance and thus more reliable and effective results overall for such lithium ion batteries, including those with liquid electrolytes and potentially gelled, polymeric or solid electrolytes. The extended portions of such current collectors basically include, then, without limitation, the ability to provide a composite of a rolled or stacked internal battery (electrodes, current collector or collector, and separator, at least) that may be introduced within a battery case (housing) and forced onto one pole (or housing end) within the confines thereof to manipulate or crush, as it were, the exposed current collector end for contact with both the pole as well as other regions of the current collector itself. Such crushing thus generates folds of the malleable film in random patterns, although actual patterns may be created as well with certain crush surfaces of the battery case (housing), of course. These current collector folds thus result in contact, again, with the pole at the initial introduction and pressing against the internal surface of the housing such that conductive contact with the case or at least a material present in relation to the housing surface (since the crushing surface must comprise a portion which is conductive itself, as desired by the manufacturer and/or user). These folds then also bend toward the internal battery composite such that the current collector(s) at issue exhibits contact with itself (or another possible collector present therein) in relation to the folds generated due to such a crushing/manipulating procedure. In any event, as there are two opposite sides present on a flat, thin, metallized film current collector, whether rolled or stacked, the presence of exposed extensions or protrusions thereof within the battery housing in this manner allows for such differing, opposite sides to come into contact randomly with one another upon undertaking such a manipulation/crushing step. Such a capability is believed to contribute to the above-noted increase in electrical charge conductivity throughout the battery itself during utilization, as well as a low resistance characteristic, thereby allowing for unexpectedly good maximization of battery power transfer. Coupled with the benefits of the thin film current collector(s) present therein, there is provided such previously unattainable levels of electrical conductivity and low resistance, as well as high thermal conductivity, as well, with safety results that are extremely high as well. Such a battery (for example with flammable liquid electrolytes in such a lithium-ion configuration) is thus one that meets levels of safety and effectiveness heretofore unmet within this lithium ion battery industry.

In previous examples of tabless battery designs, such as those performed by Tesla, great care must be taken in order to have an orderly folding of the exposed current collector, such that during the folding it does not contact the opposing current collector, which is protected only by a very thin separator. Surprisingly and to the benefit of metallized film current collectors, a more random folding and crushing is allowed because, in the rare instance where contact is made between the folded or crushed metallized film current collector and the opposing electrode or current collector, such a short circuit will burn out and stop conductivity (thus no longer sustaining a short circuit) due to the inability of the metallized film current collector to maintain a high current density around the short circuit.

An additional benefit, of course, is the elimination of the metal tab, which increases weight, volume, cost, and the potential for internal shorts in a cell.

The current collectors noted herein may include coatings to form an anode or cathode thereon (as discussed above). In order to allow for the extensions/protrusions of exposed metallized film ends for such a crush procedure to occur, such a coating would be provided that does not cover the entirety of the subject current collector(s). In such a manner, that anode or cathode component coating would be dipped, extruded, plated, etc., in a manner that provides such a coating in a manner that leaves unexposed a strip, at least, of edging for this purpose. Such exposure (non-coating) may be permitted for a uniform (at least substantially uniform) distance along such a current collector edge of anywhere from 1 to 3 millimeters or other dimensions as previously noted, thus allowing for potentially crushed extensions within the target battery of the same distance. If the battery is a rolled type, basically providing a cylindrical battery case/housing, the typical structural form of such a coated current collector would be an elongated rectangle that rolls within the battery composite to provide multiple concentric shapes. Thus, with the coated portion limited to such a non-edge region, it should be evident that a separator would be likewise provided in the same basic shape as the coated current collector, extending beyond to the points aligned with the coated portions thereof, but not to the full extent of the metallized film current collector. In such a manner, the uncoated extensions/protrusions of the subject current collector(s) is provided for, again, the desired crushing procedure (and thus the total replacement of any welded or like tab components). With a rolled formation, it should be evident that the internal battery composite, again, electrodes/collector(s)/separator(s) with electrolytes (for example, liquid, gelled, polymeric or solid) added, would be of any individual geometric shape, but circular most likely (and thus potentially preferred). The current collector would, again, include an extension beyond the edges/boundaries of the coated portions of the collector(s) as well as the separator(s) present therein, such that from 1 to 3 millimeters (as for rolled structures) of uncoated metallized film current collector(s) component extend from such a composite for manipulation with the housing/case of the battery (to, again, avoid any need for welded or like tab structures).

Thus, in viewing from the center of the electrode, the separator must extend beyond the both the opposing electrode coating and the opposed electrode current collector, and such extension length must be sufficient to prevent significant shorting from the metallized film current collector after it is crushed or folded. Such a length would most reasonably be more than 0.25 mm, or 0.5 mm, or more than 1 mm. In addition, the metallized film current collector must extend past the end of the separator, so as to be allowed to contact the pole or housing. This extension may also be more than 0.25 mm for small cells of less than 1 Amp-hour, but would be optimized for longer lengths for larger cells, in general longer than 0.5 mm, or 1 mm. Of course, too long a length would in general take up much space and create additional weight, and so should be less than 20 mm, or optimally less than 10 mm, or even less than 5 mm.

It is possible, and sometimes beneficial within a battery design, to have one electrode tabless, and the other with a tab. One such beneficial design might have a metallized aluminum or copper film with tabless connection for one electrode, and the other electrode may be a metal foil with either tabless or tabbed connection means. In such a way, the metallized film current collector would provide additional safety protection from damage or internal short circuits, while the metal foil provided thermal conductivity to carry any heat inside the battery to the external cooling means. Using this as a non-limiting example, other beneficial combinations of current collectors, tabs and tabless connection means can be envisioned.

The crushing/manipulating process in relation to the extensions of the current collector(s) of the internal battery composite thus provides the ability to generate surface area as well as random side exposure of the collector(s) in contact with the crushing surface (potential pole/housing). The internal dimensions of the case/housing require, in relation to the extension of the current collector(s) a limited space (at both the top and bottom thereof) in order to ensure complete manipulation/crushing of the current collector extension(s) and complete contact with either a conductive crushing surface or, at least, a conductive component for electrical charge transfer when the battery is sealed (and thus ready for utilization as a power source). Thus, as long as the spaces are less than the edge length of the current collector extension(s) on at least one end (preferably both the top and bottom, however, in relation to the direction and the collector extension). With a range of 1 to 3 millimeters for the extensions (although, of course, longer extensions may be implemented, with the understanding that too great a length could impact resistance and conductivity overall), the spaces within the battery housing/case should allow for at least 0.5 millimeters for crushing capability (and thus fold generations within the extension of the current collector), when measured from the edge of the electrode coating. Thus, spaces with dimensions of about 0.5 to 2.5 millimeters may be employed. Certainly, of course, the remaining perpendicular sides of the battery housing/case should be of nearly same dimensions as the rolled or stacked formations of the internal battery composites to provide a snug fit therein as well. The placement of the internal battery composite(s) within the target battery housing/case may require a certain amount of force to ensure the entirety thereof fits therein and provides the necessary degree of crushing to ensure proper conductivity is achieved as well as structural stability of the current collector extension(s) remains (no tears or harm, in other words, that could affect such results). The sealing step thus allows for the potential for a top edge of the current collector extension(s) to occur, if needed, as well. Such sealing is undertaken as typically followed within lithium battery manufacturing processes, albeit with the potential for increased pressure applications for the introduction of the overall internal battery composite, as noted above. It may also be beneficial to have continuous force applied to one or both sides of the jelly roll, and so the battery design could include rubber or foam gaskets to provide the force, a spring or metal clamp to provide the force, or other means to provide force to keep the jelly roll in contact with the pole or housing.

In such a manner, then, the sealed battery allows for conduction of electrical charge from within through the electrolytes (liquid, gelled, polymeric or solid, for example) present throughout in relation to the electrodes, thereby receiving electrical charge through the crushed/manipulated current collector(s) (again, thin metallized films, uncoated at the crushed edges thereof). The poles may be attached to an electricity-needing device as typically undertaken with the internal charges generated and conducted through the current collector(s) and transferred directly to the battery housing/pole as needed. With the ability to conduct charge through the entirety of the current collector(s) through the electrodes, rather than through a limited pathway with welded (and the like) tabs at either end, a more effective and efficient battery is provided.

Additionally, then, as alluded to herein, the ability of the crushing/manipulating procedure to randomly (or, at times, in patterns) create folds in the malleable metallized film edges of the current collector(s) further provides beneficial results through the ability of different sides of the same current collector(s) to contact one another at the pole/housing interface (or potentially prior to such an interface but external the electrode or electrodes). With flat, thin, metallized films of rectangular or circular shapes, such different sides, as noted above, would typically be limited to lacking any definitive conductive contact when present in a rolled or stacked lithium ion battery. This extension capability, and thus fold or folds generation through a crushing/manipulation procedure, allows for the beneficial controlled or random contact between different current collector sides within the presently disclosed platform. Thus, as noted previously, there is an unexpectedly good benefit potentially provided wherein the electrical transfer (conductance) moves through the entirety of the current collector(s) rather than just the pathway from the initial roll or stacked portion to the end. In other words, as a rolled battery has the rectangular current collector(s) in place with one end in an outward location and wrapped to form the overall roll structure internally within the case/housing, there is no access for the current collector(s) to provide any other conductance other than along the entirety of the rolled structure. Contrary to that, then, the crushed edges of the current collector(s) described herein permit exposure of the leads from the current collector(s) to different parts and sides of the same component within the disclosed battery. Again, this structural result accords a conductivity (whether electrical or thermal) of extremely high levels, extremely low resistance, and extremely high safety (with the thin film collectors to begin with) heretofore unknown within the lithium ion battery industry. This A-B (in terms of current collector sides, with one side considered A and the other B) is not followed within the industry as a tab replacement with such results.

As further noted above, the crush surface(s) that may be employed may be of any type that allows for the safe and reliable manipulation of the current collector extension(s) as well as, in some fashion, the ability for such crushed extension(s) to conduct generated electricity externally through the case/housing. Typical battery poles/housing/case materials may be utilized for thus purpose, certainly. The crushing surfaces may be, as well, in any structure and/or pattern for this purpose, including, within limitation, a completely smooth surface, a spiral surface, a lattice structure surface (with indentations and/or etchings, for instance, in a lattice formation), a grid configuration, and any like geometric or random structure and/or pattern. Such surfaces may generate certain directional manipulations of the current collector extension(s) such that potentially effective and/or preferred fold patterns within the extension(s) is formed. Such patterns, etc., may thus accord further benefits for the manufacturer/user. Such as fixing the loose end of the conductor and thus promoting the randomized crushing necessary to achieve good conduction.

Additionally, as it concerns the liquid electrolyte (particularly lithium based in certain carbon-based flammable solvents, for instance), such a crushed extension configuration may itself provide pathways and/or voids for liquid movement throughout the battery. Alternatively, the crushing surface may also provide a pattern that may generate voids, holes, depressions, and the like, within the current collector extension(s) that provide a semblance, at least, of increased spaces/areas therein for liquid electrolyte flow. In other words, such a crushing procedure will not cause any impediments to liquid electrolyte flowthrough on its own.

As it concerns the thin film current collectors themselves, such lithium ion battery thin films may require certain unique processing steps due to their unique qualities. However, many processing steps that are well known in the art may also be employed. In general, the process to produce a lithium ion battery with the inventive films comprises the steps of:

a. Providing an electrode having at least one metallized substrate capable of holding a coating of an ion storage material;

b. Providing a counterelectrode;

c. Layering said electrode and counterelectrode opposite each other with a separator component interposed between said electrode and said counterelectrode, and extending past said any coating of an ion storage material on said electrode and counter electrode, and the metallized film current collector extending past said separator;

d. Providing a package material including an electrical contact component, wherein said contact includes a portion present internally within said package material and a portion present external to said package material;

e. Electrically connecting said electrical contact with said metallized substrate;

f. Introducing at least one liquid electrolyte with ions internally within said package material; and g. Sealing said package material.

Additionally, then, with the provision of a current collector component including uncoated edges thereof, this process may be modified to include the crushing/manipulating step between f. and g., above, as described throughout and herein. With the generation of folded current collector extension(s) in this manner, upon sealing (step g.), the final battery article exhibits improved characteristics (electrical and thermal conductivity, low resistance, and high safety levels) unforeseen in this art. The term battery is intended to include any type of power generating or electrical energy storage device in this manner, whether a super capacitor, battery, etc., and thus such a term is intended to include any such article and/or device.

The metallized substrate can be any substrate as described within this disclosure.

The ion storage material can for example be a cathode or anode material for lithium ion batteries, as are well known in the art. Cathode materials may include lithium cobalt oxide $LiCoO_2$, lithium iron phosphate $LiFePO_4$, lithium manganese oxide $LiMn_2O_4$, lithium nickel manganese cobalt oxide $LiNi_xMn_yCo_zO_2$, lithium nickel cobalt aluminum oxide $LiNi_xCo_yAl_zO_2$, or mixtures of the above or others as are known in the art. Anode materials may include graphite, lithium titanate $Li_4Ti_5O_{12}$, hard carbon, tin, silicon or mixtures thereof or others as are known in the art, including lithium metal. Additionally, for the anode, also included is the concept of an "anode-less" battery, in which the anode is formed by charging the battery, creating a layer of lithium metal on the anode current collector which serves as the anode. In addition, the ion storage material could include those used in other energy storage devices, such as supercapacitors. In such supercapacitors, the ion storage materials will include activated carbon, activated carbon fibers, carbide-derived carbon, carbon aerogel, graphite, graphene, graphene, and carbon nanotubes. The coating process can be any coating process that is generally known in the art. Knife over-roll and slot die are commonly used coating processes for lithium ion batteries, but others may be used as well, including electroless plating. In the coating process, the ion storage material is in general mixed with other materials, including binders such as polyvinylidene fluoride or carboxymethyl cellulose, or other film-forming polymers. Other additives to the mixture include carbon black and other conducting additives.

Counterelectrodes include other electrode materials that have different electrochemical potentials from the ion storage materials. In general, if the ion storage material is a lithium ion anode material, then the counterelectrode would be made form a lithium ion cathode material. In the case where the ion storage material is a lithium ion cathode material, then the counterelectrode might be a lithium ion anode material. In the case where the ion storage material is a supercapacitor material, the counterelectrode can be made from either a supercapacitor material, or in some cases from a lithium ion anode or lithium ion cathode material. In each case, the counterelectrode would include an ion storage material coated on a current collector material, which could be a metal foil, or a metallized film such as in this invention.

In the layering process, the inventive electrode is layered with the counterelectrode with the electrode materials facing each other and a porous separator between them. As is commonly known in the art, the electrodes may be coated on both sides, and a stack of electrodes formed with the inventive electrode and counterelectrodes alternating with a separator between each layer. Alternatively, as is also known in the art, strips of electrode materials may be stacked as above, and then wound into a cylinder.

Packaging materials may include hard packages such as cans for cylindrical cells, flattened hard cases or polymer pouches. In each case, there must be two means of making electrical contact through the case that can be held at different voltages and can conduct current. In some instances, a portion of the case itself forms one means, while another is a different portion of the case that is electrically isolated from the first portion. In other instances, the case may be nonconducting, but allow two metal conductors to protrude through the case, often referred to as tabs.

The liquid electrolyte is typically a combination/mixture of a polar solvent and a lithium salt. Commonly used polar solvents include, as noted above, propylene carbonate, ethylene carbonate, dimethyl carbonate, diethyl carbonate, but other polar solvents, including ionic liquids or even water may be used. Lithium salts commonly utilized within this industry include, without limitation, $LiPF_6$, $LiPF_4$, $LiBF_4$, $LiClO_4$ and others. The electrolyte may also contain additives as are known in the art. In many cases, the electrolytes can be flammable, in which the safety features of the inventive metallized substrate current collectors can be advantageous preventing dangerous thermal runaway events which result in fire and damage both to the cell and external to the cell.

BRIEF DESCRIPTION OF THE DRAWINGS

FIG. 1 is a Prior Art depiction of the architecture of a wound cell, such as an 18650 cell.

FIG. 2 is a Prior Art depiction of the shrinkage as a function of temperature as measured by Dynamic Mechanical Analysis of several lithium ion battery separators, as measured according to NASA/TM—2010-216099 "Battery Separator Characterization and Evaluation Procedures for NASA's Advanced Lithium Ion Batteries," which is incorporated herein by reference, section 3.5. Included are first generation separators (Celgard PP, Celgard tri-layer), 2nd generation separators (ceramic PE) and 3rd generation separators (Silver, Gold, Silver AR).

FIG. 3A is a Prior Art depiction of a scanning electron micrograph (SEM) of the cross section of a pouch cell that has undergone a nail penetration test. The layers are aluminum and copper as mapped by BEI (backscattered electron imaging). The nail is vertical on the left side. In each case, the aluminum layer has retreated from the nail, leaving behind a "skin" of aluminum oxide, an insulator.

FIG. 3B is a Prior Art depiction of a zoom in on one of the layers from the image shown in FIG. 3A. It shows a close up of the aluminum oxide layer, and also reveals that the separator had not shrunk at all and was still separating the electrodes to the very edge.

FIGS. 6A and 6B show images of comparative examples 1-2, each after having been touched by the tip of a hot soldering iron. The comparative examples do not change after touching with a hot soldering iron.

FIGS. 7A, 7B, and 7C show images of examples 1-3, each after having been touched by the tip of a hot soldering iron. The examples 1-3 all exhibit shrinkage as described in this disclosure for substrates to be metalized.

FIGS. 8A, 8B, and 8C show images of examples 4-6, each after having been touched by the tip of a hot soldering iron. The example 4 exhibits shrinkage as described in this disclosure for substrates to be metalized. Example 5 has a fiber that will dissolve under heat in lithium ion electrolytes. Example 6 is an example of a thermally stable substrate that would require a thin conductive layer to function as the current invention.

FIGS. 10A and 10B are optical micrographs of a Comparative Examples 3 and 4 after shorting, showing ablation of the area around the short but no hole.

FIGS. 11A and 11B are optical micrographs of two areas of Example 14 after shorting, showing clear holes in the material caused by the high current density of the short.

FIG. 12 is a photograph showing random crushed current collector surfaces prior to introduction within a rolled battery.

FIG. 13 is a different photograph showing another directional pattern of crushed current collector surfaces prior to introduction within a rolled battery.

FIG. 14 is a side perspective view of an internal battery composite with bottom end current collector extension prior to a crushing step and introduction within a rolled battery.

FIG. 15 is a side perspective view of an internal battery composite with top and bottom extensions of a current collector prior to a crushing step and introduction within a rolled battery.

FIG. 16 is a side perspective transparent view of the introduction of an internal battery composite as in FIG. 14 within a battery case/housing prior to a crushing step and sealing.

FIG. 19 is an isometric view of a possible embodiment of a smooth-edged battery endplate.

FIG. 20 is an isometric view of a possible embodiment of a spiral-edged battery endplate.

FIG. 21 is an isometric view of the internal components of a possible embodiment of a jelly roll electrode structure of a tabless battery.

FIG. 22 is an isometric view of an exploded view of a possible embodiment of a tabless jelly roll battery with a smooth-edged endplate.

FIG. 23 is an isometric view of an exploded view of a possible embodiment of a tabless jelly roll battery with a grooved endplate.

FIG. 24 is an isometric view of the internal components of a possible embodiment of a stacked cell electrodes structure of a tabless battery.

FIG. 25 is an isometric view of an exploded view of a possible embodiment of a tabless stacked cell electrodes structure battery with a smooth-edged endplate.

FIG. 26 is an isometric view of an exploded view of a possible embodiment of a tabless stacked cell electrodes structure battery with a grooved endplate.

FIG. 27 is a graphical representation of the electrical conductance capability of a series of tabless stacked cell batteries with different current collector configurations, smooth endplates for crushing purposes, and 0.6 mm crushing space within the battery confines.

FIG. 28 is a graphical representation of the electrical conductance capability of a series of tabless stacked cell batteries with different current collector configurations, smooth endplates for crushing purposes, and 1.1 mm crushing space within the battery confines.

FIG. 29 is a graphical representation of the electrical conductance capability of a series of tabless stacked cell batteries with different current collector configurations, grooved endplates for crushing purposes, and 0.5 mm crushing space within the battery confines.

FIG. 30 is a graphical representation of the electrical conductance capability of a series of tabless stacked cell batteries with different current collector configurations, grooved endplates for crushing purposes, and 1.1 mm crushing space within the battery confines.

FIG. 31 is a graphical representation of the comparison of impedance measurements for tabless stacked cell batteries with different electrode extensions for both smooth and grooved endplates, and 0.5 mm crushing space within the different battery confines.

FIG. 32 is a graphical representation of the comparison of impedance measurements for tabless stacked cell batteries with different electrode extensions for both smooth and grooved endplates, and 1.1 mm crushing space within the different battery confines.

FIG. 33 is a partial side perspective view of the internal components of a tabless stacked cell electrodes structure with offset configurations for the different anodes, cathodes, separators, and thin film current collectors prior to battery formation and crushing for conductivity formation.

FIG. 34 is a side representation of crushed current collectors within a cell package with offset anodes and cathodes present.

FIG. 35 is a photograph showing random crushed current collector surfaces prior to introduction within a stacked cell battery.

FIG. 36 is a photograph showing non-random crushed current collector surfaces prior to introduction within a stacked cell battery.

DETAILED DESCRIPTION OF THE PREFERRED EMBODIMENTS AND EXAMPLES

The following descriptions and examples are merely representations of potential embodiments of the present disclosure. The scope of such a disclosure and the breadth thereof in terms of claims following below would be well understood by the ordinarily skilled artisan within this area.

As noted above, the present disclosure is a major shift and is counterintuitive from all prior understandings and remedies undertaken within the lithium battery (and other energy storage device) industry. To the contrary, the novel devices described herein provide a number of beneficial results and properties that have heretofore been unexplored, not to mention unexpected, within this area. Initially, though, as comparisons, it is important to note the stark differences involved between prior devices and those currently disclosed and broadly covered herein.

Short Circuit Event Examples

Comparative Example 1

Figure 5A:
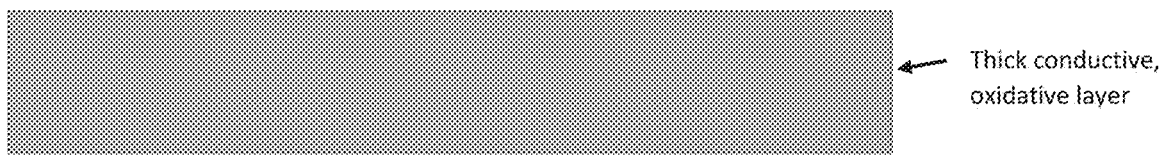
FIG. 5A is a Prior Art depiction of a thick aluminum current collector, generally between 12-20 microns thick.

A cathode for a lithium iron phosphate battery was obtained from GB Systems in China. The aluminum tab was removed as an example of a commercial current collector, and the thickness, areal density and resistance were measured, which are shown in Table 1, below. The aluminum foil was then touched with a hot soldering iron for 5 seconds, which was measured using an infrared thermometer to have a temperature of between 500 and 525° F. There was no effect of touching the soldering iron to the current collector. The thickness, areal density and resistance were measured. The material was placed in an oven at 175° C. for 30 minutes and the shrinkage measured. A photograph was taken and included in FIG. 6. FIG. 5 provides a representation of the traditional current collector within such a comparative battery.

Comparative Example 2

An anode for a lithium iron phosphate battery was obtained from GB Systems in China. The copper tab was removed as an example of a commercial current collector, and the thickness, areal density and resistance were measured, which are shown in Table 1, below. The copper foil was then touched with a hot soldering iron in the same way as Example 1. There was no effect of touching the soldering iron to the current collector. The thickness, areal density and resistance were measured. The material was placed in an oven at 175° C. for 30 minutes and the shrinkage measured. A photograph was taken and included in FIG. 6. As in Comparative Example 1, FIG. 5 provides a representation of the internal structure of such a battery. The thickness of the current collector is significant as it is a monolithic metal structure, not a thin type as now disclosed.

Example 1

Polypropylene lithium battery separator material was obtained from MTI Corporation. The material was manufactured by Celgard with the product number 2500. The thickness, areal density and resistance were measured, which are shown in Table 1, below. The separator was then touched with a hot soldering iron in the same way as Example 1. Touching the thermometer to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7.

Example 2

Ceramic coated polyethylene lithium battery separator material was obtained from MTI Corporation. The thickness, areal density and resistance were measured, which are shown in Table 1, below. The separator was then touched with a hot soldering iron in the same way as Example 1.

Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7a.

Example 3

Ceramic coated polypropylene lithium battery separator material was obtained from MTI Corporation. The thickness, areal density and resistance were measured, which are shown in Table 1, below. The separator was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 7b.

Example 4

Aluminized biaxially oriented polyester film was obtained from All Foils Inc., which is designed to be used for helium filled party balloons. The aluminum coating holds the helium longer, giving longer lasting loft for the party balloons. The thickness, areal density and resistance were measured, which are shown in Table 1, below. The film was then touched with a hot soldering iron in the same way as Example 1. Touching the soldering iron to the current collector created a small hole. The diameter was measured and included in Table 1. The thickness, areal density and resistance were measured. The material was placed in an oven at 175° C. for 30 minutes and the shrinkage measured. A photograph was taken and included in FIG. 8. Compared to the commercially available aluminum current collector of Comparative Example 1, this material is 65% thinner and 85% lighter, and also retreats away from heat, which in a lithium ion cell with an internal short would have the effect of breaking the internal short.

Example 5

Dreamweaver Silver 25, a commercial lithium ion battery separator was obtained. It is made from a blend of cellulose and polyacrylonitrile nanofibers and polyester microfibers in a papermaking process, and calendered to low thickness. The separator was then touched with a hot soldering iron in the same way as Example 1. Touching the soldering iron to the current collector did not create a hole. The thickness, areal density and resistance were measured. The material was placed in an oven at 175° C. for 30 minutes and the shrinkage measured. Compared to the prior art, comparative examples #3-5, these materials have the advantage that they do not melt or shrink in the presence of heat, and so in a lithium ion battery with an internal short, will not retreat to create an even bigger internal short. Such is seen in FIG. 8a.

Example 6

Dreamweaver Gold 20, a commercially available prototype lithium ion battery separator was obtained. It is made from a blend of cellulose and para-aramid nanofibers and polyester microfibers in a papermaking process, and calendered to low thickness. The separator was then touched with a hot soldering iron in the same way as Example 1. Touching the soldering iron to the current collector did not create a hole, as shown in FIG. 8b. The thickness, areal density and resistance were measured. The material was placed in an oven at 175° C. for 30 minutes and the shrinkage measured. The advantages of this separator compared to the prior art separators are the same as for Example 2.

TABLE 1

| Example | Material | Thickness | Areal Density | Resistance | Shrinkage (175 C.) | Solder Tip Hole Size |
| --- | --- | --- | --- | --- | --- | --- |
| Comp Example 1 | Aluminum | 30 μm | 80 g/m$^2$ | <0.1 mOhm/square | 0% | No hole |
| Comp Example 2 | Copper | 14 μm | 125 g/m$^2$ | <0.1 mOhm/square | 0% | No hole |
| Example 1 | PP | 24 μm | 14 g/m$^2$ | Infinite | Melted | 7.5 μm |
| Example 2 | PP ceramic | 27 μm | 20 g/m$^2$ | Infinite | Melted | 2 μm/1 μm |
| Example 3 | PE ceramic | 27 μm | 20 g/m$^2$ | Infinite | Melted | 5 μm/2 μm |
| Example 4 | Aluminized PET | 13 μm | 12 g/m$^2$ | 6.3 Ohm/square | 33% | 2 μm |
| Example 5 | Fiber blend | 27 μm | 16 g/m$^2$ | Infinite | 2% | No hole |
| Example 6 | Fiber blend | 23 μm | 16 g/m$^2$ | Infinite | 0% | No hole |

Comparative Examples 1-2 are existing current collector materials, showing very low resistance, high areal density and no response at exposure to either a hot solder tip or any shrinkage at 175° C.

Examples 1-3 are materials that have infinite resistance, have low areal density and melt on exposure to either 175° C. or a hot solder tip. They are excellent substrates for metallization according to this invention.

Example 4 is an example of an aluminized polymer film which shows moderate resistance, low areal density and shrinks when exposed to 175° C. or a hot solder tip. It is an example of a potential cathode current collector composite film according to this invention. In practice, and as shown in further examples, it may be desirable to impart a higher level of metal coating for higher power batteries.

Examples 5-6 are materials that have infinite resistance, have low areal density, but have very low shrinkage when exposed to 175° C. or a hot solder tip. They are examples of the polymer substrate under this invention when the thickness of the metallized coating is thin enough such that the metallized coating will deteriorate under the high current conditions associated with a short. Additionally, the cellulose nanofibers and polyester microfibers will oxidize, shrink and ablate at temperatures far lower than the melting temperatures of the metal current collectors currently in practice.

Example 5 additionally is made from a fiber, polyacrylonitrile, that swells on exposure to traditional lithium ion carbonate electrolytes, which is also an example of a polymer substrate under this invention such that the swelling will increase under heat and create cracks in the metalized coating which will break the conductive path, improving the safety of the cell by eliminating or greatly reducing the uniform conductive path of the current collector on the exposure to heat within the battery.

Example 7

The material utilized in Example 5 was placed in the deposition position of a MBraun Vacuum Deposition System, using an intermetallic crucible and aluminum pellets. The chamber was evacuated to $3 \times 10^{-5}$ mbar. The power was increased until the aluminum was melted, and then the power set so the deposition rate was 3 Angstroms/s. The deposition was run for 1 hour, with four samples rotating on the deposition plate. The process was repeated three times, so the total deposition time was 4 hours. The samples were measured for weight, thickness and resistance (DC and 1 kHz, 1 inch strip measured between electrodes 1 inch apart), which are shown in Table 2 below. Point resistance was also measured using a Hioki 3555 Battery HiTester at 1 kHz with the probe tips 1" apart. The weight of added aluminum was calculated by the weight added during the process divided by the sample area. This is divided by the density of the material to give the average thickness of the coating.

Example 8

A nonwoven polymer substrate was made by taking a polyethylene terephthalate microfiber with a flat cross section and making hand sheets at 20 g/m² using the process of Tappi T206. These hand sheets were then calendered at 10 m/min, 2000 lbs/inch pressure using hardened steel rolls at 250° F. This material was metalized according to the process of Example 7, and the same measurements taken and reported in Table 8.

Example 9

Figure 9A:
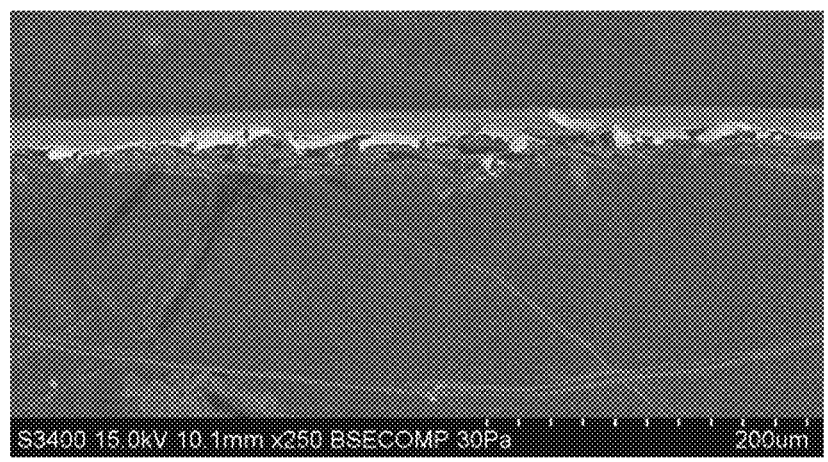
FIGS. 9A, 9B, and 9C are SEMs at different magnifications in cross section and one showing the metalized surface of one possible embodiment of one current collector as now disclosed as described in Example 9. The metal is clearly far thinner than the original substrate, which was 20 microns thick.
Figure 9B:
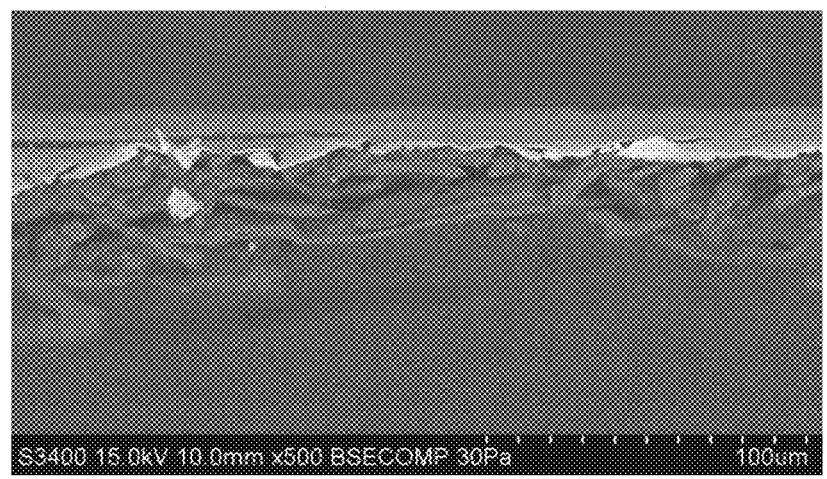
Figure 9C:
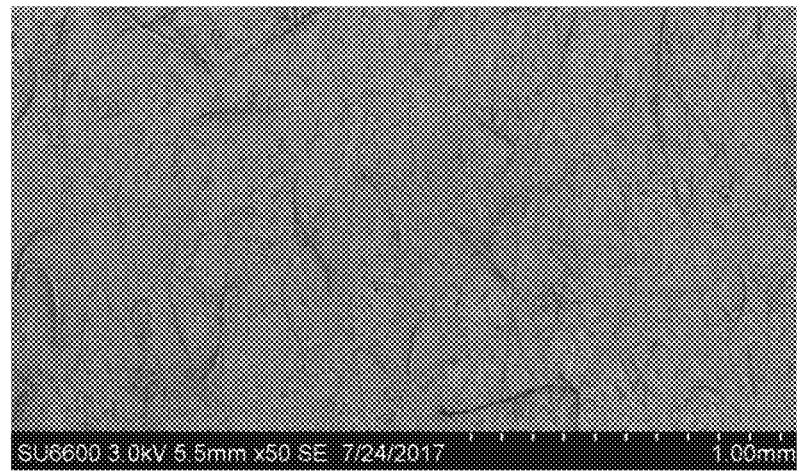

Material according to Example 5 was deposited according to the process of Example 7, except that the coating was done at a setting of 5 Angstroms/second for 60 minutes. The samples were turned over and coated on the back side under the same procedure. These materials were imaged under a scanning electron microscope (SEM), both on the surface and in cross section, and the images are presented in FIGS. 9A, 9B, and 9C.

Example 10

Materials were prepared according to the procedure of Example 9, except the deposition on each side was for only 20 minutes.

Example 11

The polymer substrate of Example 8 was prepared, except that the sheets were not calendered. The deposition of aluminum is at 5 Angstroms/second for 20 minutes on each side. Because the materials were not calendered, the porosity is very high, giving very high resistance values with a thin coat weight. Comparing Example 11 to Example 8 shows the benefits of calendering, which are unexpectedly high.

TABLE 2

| | Sample | | | | |
|---|---|---|---|---|---|
| | Added weight | DC Resistance | 1 kHz Resistance Units | 1 kHz point resistance | Average coating thickness |
| | g/m² | Ohms/square | Ohms/square | Ohms | microns |
| Example 7 | 3.5 | 0.7 | 0.5 | 0.1 | 1.3 |
| Example 8 | 2.0 | 7 | 7 | 0.4 | 0.7 |
| Example 9 | 2.2 | | | 0.2 | 0.8 |
| Example 10 | 0.8 | | | 1.7 | 0.3 |
| Example 11 | 0.8 | | | 100 | 0.3 |

Example 12

The aluminum coated polymer substrate from Example 9 was coated with a mixture of 97% NCM cathode material (NCM523, obtained from BASF), 1% carbon black and 2% PVDF binder in a solution of N-Methyl-2-pyrrolidone. The coat weight was 12.7 mg/cm2, at a thickness of 71 microns. This material was cut to fit a 2032 coin cell, and paired with graphite anode coated on copper foil current collector (6 mg/cm², 96.75% graphite (BTR), 0.75% carbon black, 1.5% SBR and 1% CMC). A single layer coin cell was made by placing the anode, separator (Celgard 2320) and the NCM coated material into the cell, flooding with electrolyte (60 µL, 1.0M LiPF$_6$ in EC:DEC:DMC=4:4:2 vol+2 w. % VC) and sealing the cell by crimping the shell. To obtain adequate conductivity, a portion of the aluminum coated polymer substrate from Example 9 was left uncoated with cathode material and folded over to contact the shell of the coin cell, completing the conductive pathway. The cell was formed by charging at a constant current of 0.18 mA to 4.2 V, then at constant voltage (4.2 V) until the current dropped to 0.04 mA. The cell was cycled three times between 4.2 V and 3.0 V at 0.37 mA, and gave an average discharge capacity of 1.2 mAh.

Example 13

A cell was made according to the procedure and using the materials from Example 12, except the separator used was Dreamweaver Silver 20. The cell was formed by charging at a constant current of 0.18 mA to 4.2 V, then at constant voltage (4.2 V) until the current dropped to 0.04 mA. The cell was cycled three times between 4.2 V and 3.0 V at 0.37 mA, and gave an average discharge capacity of 0.8 mAh.

Thus in this and the previous example, working rechargeable lithium ion cells were made with an aluminum thickness of less than 1 micron.

Comparative Example 3

The aluminum tab of Comparative Example 1, approximately 2 cm×4 cm was connected to the ground of a current source through a metal connector contacting the entire width of the sample. The voltage limit was set to 4.0 V, and the current limit to 1.0 A. A probe connected to the high voltage of the current source was touched first to a metal connector contacting the entire width of the sample, and then multiple times to the aluminum tab, generating a short circuit at 1.0 A. The tip of the probe was approximately 0.25 mm$^2$ area. When contacted across the entire width, the current flowed normally. On initial touch with the probe to the tab, sparks were generated, indicating very high initial current density. The resultant defects in the current collector only sometimes resulted in holes, and in other times there was ablation but the current collector remained intact. In all cases the circuit remained shorted with 1.0 A flowing. A micrograph was taken of an ablated defect, with no hole, and is shown in FIG. 10. The experiment was repeated with the current source limit set to 5.0, 3.0, 0.6 A, 0.3 A and 0.1 A, and in all cases the result was a continuous current at the test current limit, both when contacted across the entire width of the current collector and using the point probe of approximately 0.25 mm$^2$ tip size.

Comparative Example 4

The copper tab of Comparative Example 2 of similar dimensions was tested in the same way as Comparative Example 3. When contacted across the entire width, the current flowed normally. On initial touch with the probe to the tab, sparks were generated, indicating very high initial current density. The resultant defects in the current collector only sometimes resulted in holes, and in other times there was ablation but the current collector remained intact. In all cases the circuit remained shorted with 0.8 A flowing. A micrograph was taken of an ablated defect, with no hole, and is shown in FIG. 10a. The experiment was repeated with the current source limit set to 5.0, 3.0, 0.6 A, 0.3 A and 0.1 A, and in all cases the result was a continuous current at the test current limit, both when contacted across the entire width of the current collector and using the point probe of approximately 0.25 mm2 tip size.

Example 14

The inventive aluminum coated polymer substrate material of Example 7 of similar dimensions was tested using the same method as Comparative Examples 3-4. When contacted across the entire width, the current flowed normally. In each case of the touch of the probe to the inventive current collector directly, the sparks generated were far less, and the current ceased to flow after the initial sparks, leaving an open circuit. In all cases, the resultant defect was a hole. Micrographs of several examples of the holes are shown in FIGS. 11A and 11B. The experiment was repeated with the current source limit set to 5.0, 3.0, 0.6 A, 0.3 A and 0.1 A, and in all cases the result a continuous flow of current when contacted through the full width connectors, and no current flowing through the inventive example when contacted directly from the probe to the inventive current collector example.

The key invention shown is that, when exposed to a short circuit as in Comparative Examples 3-4 and in Example 14, with the prior art the result is an ongoing short circuit, while with the inventive material the result is an open circuit, with no ongoing current flowing (i.e., no appreciable current movement). Thus, the prior art short circuit can and does generate heat which can melt the separator, dissolve the SEI layer, and result in thermal runaway of the cell, thereby igniting the electrolyte. The open circuit of the inventive current collector will not generate heat and thus provides for a cell which can support internal short circuits without allowing thermal runaway and the resultant smoke, heat and flames.

Examples 15 and 16 and Comparative Examples 5 and 6

Figure 4:
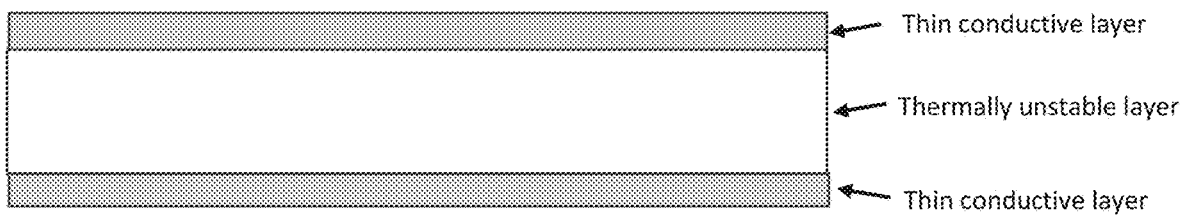
FIG. 4 is a depiction of the metallized film used in the current invention, where the thin layer of conductive material is on the outside, and the center substrate is a layer that is thermally unstable under the temperatures required for thermal runaway. This substrate can be a melting layer, a shrinking layer, a dissolving layer, an oxidizing layer, or other layer that will undergo a thermal instability at a temperature between 100° C. and 500° C.
Figure 5B:
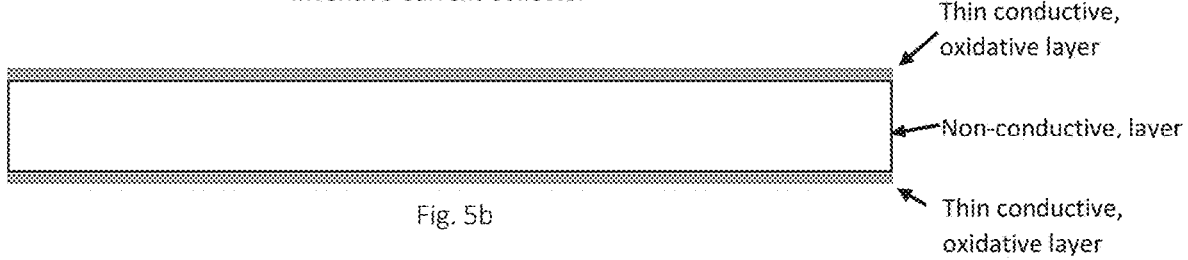
FIG. 5B is a depiction of the metallized film used in the current invention, showing a micron thick substrate with 1 micron of aluminum on each side. In the case of the inventive current collector, it is not capable of carrying the high currents associated with a short circuit, while the thick current art is and does.

Two metallized films were produced on 10 micron polyethylene terephthalate film in a roll to roll process. In this process, a roll of the film was placed in a vacuum metallization production machine (an example of which is TopMet 4450, available from Applied Materials), and the chamber evacuated to a low pressure. The roll was passed over heated boats that contain molten aluminum at a high rate of speed, example 50 m/min. Above the heated boats containing molten aluminum is a plume of aluminum gas which deposits on the film, with the deposition rate controlled by speed and aluminum temperature. A roll approximately 500 m long and 70 cm wide was produced through multiple passes until the aluminum coating was ~300 nm. The coating process was repeated to coat the other side of the film, with the resultant product utilized herein as Example 15 (with the inventive current collector of FIG. 4 a depiction of that utilized in this Example). Example 16 was thus produced in the same way, except the metal in the boat was copper (and with the depiction of FIG. 5B representing the current collector utilized within this inventive structure). The basis weight, thickness and conductivity of each film were measured, and are reported below in Table 3. The coating weight was calculated by subtracting 13.8 g/m$^2$, the basis weight of the 10 micron polyethylene terephthalate film. The "calculated coating thickness" was calculated by dividing the coating weight by the density of the materials (2.7 g/cm$^3$ for aluminum, 8.96 g/cm$^3$ for copper), and assuming equal coating on each side.

Comparative Example 5 is a commercially obtained aluminum foil 17 microns thick. Comparative Example 6 is a commercially obtained copper foil 50 microns thick. Comparative Example 7 is a commercially obtained copper foil 9 microns thick.

TABLE 3

| | Sample | | | | |
|---|---|---|---|---|---|
| | Basis Weight | Coating Weight | Thickness | DC Resistance | Calculated coating thickness |
| Units | g/m$^2$ | g/m$^2$ | Microns | Ohms | microns |
| Example 15 | 17 | 3 | 11 | 0.081 | 0.5 |
| Example 16 | 24 | 10 | 11 | 0.041 | 0.5 |
| Comparative Example 5 | 46 | | 17 | | |
| Comparative Example 6 | 448 | | 50 | | |

TABLE 3-continued

| | | Sample | | |
|---|---|---|---|---|
| Basis Weight | Coating Weight | Thickness | DC Resistance | Calculated coating thickness |
| | | Units | | |
| g/m² | g/m² | Microns | Ohms | microns |
| Comparative Example 7 | 81 | | 9 | |

Example 15, Example 16, Comparative Example 5 and Comparative Example 6 were subjected to a further test of their ability to carry very high current densities. A test apparatus was made which would hold a polished copper wire with radius 0.51 mm (24 AWG gauge) in contact with a current collector film or foil. The film or foil under test was grounded with an aluminum contact held in contact with the film or foil under test, with contact area >1 square centimeter. The probe was connected in series with a high power 400 W resistor of value 0.335 ohms, and connected to a Volteq HY3050EX power supply, set to control current. The current collector to be measured was placed in the setup, with the polished wire in contact with the surface of the current collector at zero input current. The current was increased in 0.2 ampere increments and held at 30 seconds for each increment, while the voltage across the resistor was measured. When the voltage dropped to zero, indicating that current was no longer flowing, the sample was shown to fail. Each of Example 15, Example 16, Comparative Example 5 and Comparative Example 6 were tested. Example 15 failed at a 7 A (average of two measurements). Example 16 failed at 10.2 A (average of two measurements). Neither of Comparative Example 5 nor Comparative Example 6 failed below 20 A. Both Example 15 and Example 16 showed holes in the current collector of radius >1 mm, while neither of the Comparative Examples 5 or 6 showed any damage to the foil. In this example test, it would be advantageous to have a current collector that is unable to carry a current of greater than 20 A, or preferably greater than 15 A or more preferably greater than 12 A.

In another test, meant to simulate using these inventive current collectors as a tab connecting the electrode stack of a cell to the electrical devices in use (either inside or outside the cell), Examples 15 and 16 and Comparative Examples 5 and 6 were subjected to a current capacity test along the strip. To prepare the samples for the test, the current collectors were cut into the shape shown in FIG. 12, which consists of a strip of material that is four centimeters by on centimeter (4 cm×1 cm), with the ends of the strip ending in truncated right isosceles triangles of side 4 cm. Each of the triangles of the test piece was contacted through a piece of aluminum with contact surface area >1 cm. One side was connected through a 400 W, 0.335 ohm resistor, and this circuit was connected to a Volteq HY3050EX power supply. The voltage was measured across the resistors to measure the current, and the piece was shown to fail when this voltage dropped to zero. For each test, the piece was connected with the power supply set to zero current, and then increased in 0.2 A increments and allowed to sit for 30 seconds at each new voltage, until the sample failed and the current flowing dropped to zero. The test was configured so that the metallized current collectors could be measured with contact either on one side, or on both sides of the metallized current collector. The currents at failure are shown below in Table 4. For materials tested in a 4 cm×1 cm strip, it would be advantageous to provide an internal fuse by limited the amount of current that can flow to be below 20 A, or preferably below 15 A, or more preferably below 10 A, each with either single or double-sided contact.

TABLE 4

| | Sample | |
|---|---|---|
| | Single Sided Failure Voltage | Double Sided Failure Voltage |
| | Units | |
| | V | V |
| Example 15 | 2.7 | 4.5 |
| Example 16 | 24 | 10 |
| Comparative Example 5 | No failure below 20 A | No failure below 20 A |
| Comparative Example 6 | No failure below 20 A | No failure below 20 A |

Examples 17-19 and Comparative Example 8

Cells were made by coating standard foil current collectors and the metallized PET film current collectors from Examples 15 and 16 with electrode materials. NMC 523 cathode materials were prepared using BASF NMC523 (97%), carbon black (2%) and PVDF (1%) in NMP solvent, and coated on the aluminum current collector (15 micron aluminum current collector) and Example 15 were at a basis weight of 220 g/m², corresponding to a cathode loading density of 3.3 mAh/cm². Anode materials were prepared by using graphite BTR-918S (94%), carbon black (5%) and PVDF (1%) in NMP solvent, and coating on the copper current collector (18 micron copper current collector) at 118 g/m², corresponding to an anode loading density of 4.0 mAh/cm². Four double sided cathodes were prepared, and three double sided anodes and two single sided anodes. These were stacked with Celgard 2500 separator to form small pouch cells, which were then filled with electrolyte and sealed with designed capacity 1 Ah. Four types of cells were made by different combinations of foil materials, and the capacity measured at C/10 and C/5 (that is, 0.1 A and 0.2 A). The cells were formed by charging at 100 mA to 4.2 V, and held at 4.2 V until the current dropped to 10 mA. The fully formed cells were then weighed, and tested for capacity by discharging at C/10, then charging at C/10 and discharging at C/5. These results are shown in Table 5, below.

TABLE 5

| | Sample | | | | |
|---|---|---|---|---|---|
| | Cathode Current Collector | Anode Current Collector | Cell Weight | C/10 Capacity | C/5 Capacity |
| | | | Units | | |
| | | | Grams | mAh | mAh |
| Comparative Example 8 | Al Foil | Cu Foil | 27 | 924 | 615 |
| Example 17 | Example 15 | Cu Foil | 26.8 | 1049 | 751 |
| Example 18 | Al Foil | Example 16 | 24.7 | 1096 | 853 |
| Example 19 | Example 15 | Example 16 | 24.7 | 1057 | 848 |

Thus, it has been shown that the Examples provided above exhibit the desirable thickness, metal coating, and conductivity results needed to prevent thermal runaway within an electrolyte-containing battery, thereby providing not only a much safer and more reliable type, but one that requires far less internal weight components than ever before, without sacrificing safety, but, in fact, improving thereupon.

Tabless Structures

As noted above, the general manner of providing energy storage devices, let alone batteries (and lithium rechargeable types, in particular) involves an internal electrode structure (or structures) with tab connections to transfer electrical charge from the internal portion externally (for connection capability with external devices). It has been realized, however, that such tabbed energy generating/storage devices exhibit certain deficiencies, or at least limitations, with regards to maximum power transfer, at least. It has now been realized that tabless structures are not just possible but result in surprisingly effective high-power outputs with low impedance simultaneously. Such tabless configurations basically involve the utilization of internal battery (or energy storage devices) components with thin film current collectors that are provided in extended format beyond the edges of anodes and cathodes (and separators, as well). Such extended current collectors may then be "crushed" (manipulated, in other words) in a random fashion upon manufacture of the target battery (or other type) device. In such a process, the extended current collector is provided in alignment (whether in a stacked or jelly roll formation) with the other components (anode, separator, cathode, and more than one may be present, of course) and then the cell confines (endplate and cover, at least) are introduced and the battery components are forced therein with the endplate(s) in contact with the extended current collector(s) in order to provide a surface for such a "crushing" action to commence. Importantly, there is a "crush space" within the confines of the battery (energy storage device) to allow the current collector(s) to be properly "crushed" to provide a random pattern of manipulated sides of the current collector(s) such that opposing extended edges may be in contact with another subsequent to such a crushing result. Importantly, as well, is the prevention of any anode and cathode contacting one another subsequent to such battery formation (and current collector "crushing"). As well, with a flammable organic liquid electrolyte present (any as provided above within this disclosure), the resultant "crushed" end(s) of the battery must allow for such liquid electrolyte to flow easily and thoroughly through the entirety thereof. Such a "crushing" result is thus present solely at the end(s) of the battery (energy storage device) in contact with an endplate(s), thereby allowing the remaining components to retain substantially the same shape and configuration thereafter and during utilization. FIGS. 12 and 13 provide embodiments of views of possible randomized crushed conductive current collector thin films as examples. Noticeable in FIG. 12 are the different sides of the extended current collector film in a jelly roll formation and the resultant contact capability of such sides (A and B) in terms of exposed surfaces thereof. FIG. 13 shows a different "crush" result embodiment with the A and B sides exposed adjacently to one another for layer-to-layer contact capability. Such "crushed" structures thus allow for a more complete conductivity throughout the entirety of the cell as opposed to standard tabbed jelly roll formations. In other words, as alluded to above, a standard jelly roll configuration will require electrical charge to follow the entirety of the rolled path from one end of the electrode to the other before transferring through a tab structure; this limits the overall transfer capability, at least in terms of rate of conductivity as the charge must follow the path in such a manner. It has been realized that the "crushed" configuration (without any tab present) allows for electrical charge to migrate throughout the jelly roll formation steadily from one top edge (endplate) to the other without the need to flow through the entire jelly roll pathway. The endplate(s) thus may act as a conductor for the generated electrical charges as well for greater surface area, potentially, than a single tab structure (which, being a larger structure than a tab, may be more reliable in terms of stability and resiliency over time and utilization as well). This "crushing" result further allows for low impedance (as opposed to the Tesla disclosures wherein high readings are required for such batteries to function at all).

FIG. 14 provides a partial isometric view of a jelly roll formation of an extended thin film current collector with an electrode coating applied thereto to show the extension configuration. As noted, and in relation to the "crushed" configurations of FIGS. 12 and 13, and A side and a B side for the wound (jelly roll) current collector is shown with a certain extension distance also exhibited to allow for the "crushing" result to occur upon introduction within a cell and upon contact with a target endplate. FIG. 15 shows a full jelly roll battery component side view with the bottom edge (current collector extension) associated with an anode and the top edge (current collector extension) associated with a cathode. With this structure, then, two opposing endplates would be introduced while the coated internal electrode structure(s) is placed within a cylindrical battery case; the two endplates thus "crush" the opposing edges to form structures as in FIGS. 12 and/or 13 without any need for a tab or tabs for external electrical charge access.

FIG. 16 provides a better view of the introduction of the jelly roll formation within the confines of a battery case (external cell can) leading downward, in this specific non-limiting presentation, to a conductive surface (endplate) for crushing of the extended (exposed) current collector.

FIG. 20 provides an isometric view of one possible embodiment of a smooth edged endplate 100 for a cylindrical battery (energy storage device). The endplate 100 includes a bottom edge 110 that allows for contact in conductive fashion with an external device (not shown). A top surface 130 provides the "crushing" surface for the extended current collector. Such a surface 130 includes a perpendicular peripheral edge 140 that allows for placement of the battery can (case) edges to reside and connect while a peripheral surface 120 provides the bottom edge of such a battery can (case) to be placed. Such a smooth edged endplate 100 thus provides one type of embodiment in this manner for a random "crushing" result of the extended current collector(s).

FIG. 21 provides an isometric view of another possible embodiment of a spiral grooved endplate 200 for a different type of randomized "crushing" of an extended current collector(s). such an endplate 200 includes a bottom edge 210 for contact with an external device (for conduction, as above). A groove 230 is provided that spirals from an internally disposed starting point 250 a number of times while constantly extending outwardly therefrom to a final ending location 260. Such a spiral groove 230 allows for a top surface 220, 290 with internal vertical edges 240 that permit alignment, possibly, with the extended current collector(s) for "crushing" in a different manner than a smooth edge (100 of FIG. 20). Likewise, the spiral endplate 200 includes an outer edge 280 for placement of a the edges of a cylindrical battery can (case) to be placed and connected, and vertical edges 270 for a snug fit at such battery case edges, as well. It should be understood, of course, that although a spiral groove endplate 200 is shown, such is simply one potential embodiment within the scope of this disclosure. Other endplate structures of any shape and grooved layout and/or configuration may be utilized and/or followed and/or introduced with any degree of conductivity exhibited thereby, as well.

Figure 17:
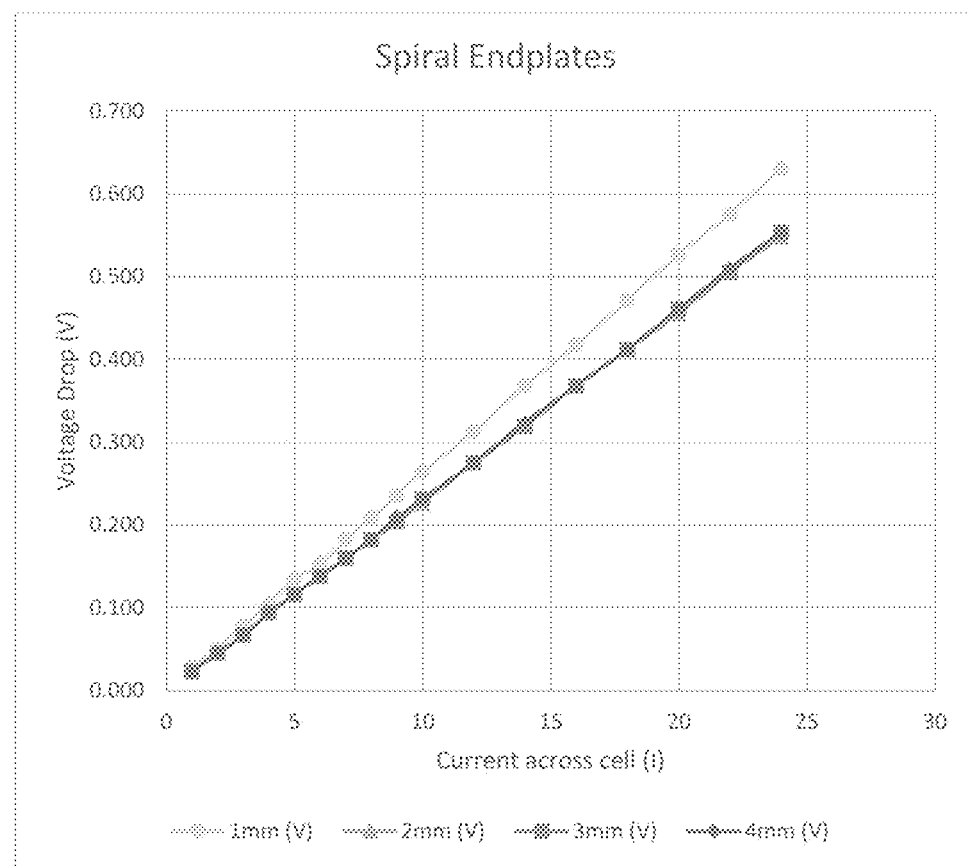
FIG. 17 is a graphical representation of the electrical conductance capability of a series of battery cells with different current collector configurations with spiral endplates for crushing purposes.

As alluded to above, the viability of such "crushed" end thin film metallized current collector electrodes in rechargeable lithium ion batteries requires effectiveness in terms of maximum voltage delivery, thus low voltage drop, and thus correlated low internal cell resistance levels (and further low impedance results). Such measurements would indicate electrical charge generation and transfer without the need for tabs, with consequential low resistance that allows for higher voltage delivery and low temperature generation as well (due to low resistance, basically). Such cylindrical cells as shown in FIGS. 12-16 were measured for such voltage drop properties. The "crush space" within the cells were standardized for these devices at 0.5 mm with different current collector extension measurements of 1, 2, 3, and 4 mm. With such "crushed" current collector results, the cells exhibited certain voltage levels from the anode to the cathode thereby providing the aforementioned charge generation and transfer capabilities with the further benefits of the thin film metallized current collector(s) in terms of light weight and, perhaps more importantly, more reliable safety levels (again as described above in greater detail). Table 6 provides measurements in relation to the spiral endplate (as in FIG. 21, for example) with the measurements of the "crush space" within the cell and the extended thin film metallized current collector(s) present therein as well. Within such a table (and others below), the term "I" indicates impedance (in amps), the measurements of 1, 2, 3, and 4 mm indicate the length of current collector extensions within the "crush space" of the target cell, and V indicates the voltage drop measured for each cell with such characteristics. Such measurements in Table 6 are further shown in graphical representation within FIG. 17.

TABLE 6

Voltage Drop Measurements
Spiral Endplate Cylindrical Cells with Randomized
Crush Results with 0.5 mm "Crush Space"

| | Spiral Endplates, .5 mm crush space | | | |
|---|---|---|---|---|
| I (Amps) | 1 mm (V) | 2 mm (V) | 3 mm (V) | 4 mm (V) |
| 1 | 0.029 | 0.023 | 0.023 | 0.023 |
| 2 | 0.050 | 0.045 | 0.045 | 0.045 |
| 3 | 0.078 | 0.067 | 0.067 | 0.067 |
| 4 | 0.105 | 0.094 | 0.094 | 0.094 |
| 5 | 0.133 | 0.116 | 0.116 | 0.116 |
| 6 | 0.154 | 0.138 | 0.138 | 0.138 |
| 7 | 0.182 | 0.160 | 0.160 | 0.160 |
| 8 | 0.209 | 0.182 | 0.182 | 0.182 |
| 9 | 0.236 | 0.204 | 0.204 | 0.209 |
| 10 | 0.264 | 0.226 | 0.231 | 0.231 |
| 12 | 0.313 | 0.275 | 0.275 | 0.275 |
| 14 | 0.368 | 0.319 | 0.319 | 0.324 |
| 16 | 0.417 | 0.368 | 0.368 | 0.368 |
| 18 | 0.472 | 0.412 | 0.412 | 0.412 |
| 20 | 0.527 | 0.455 | 0.461 | 0.461 |
| 22 | 0.576 | 0.505 | 0.505 | 0.510 |
| 24 | 0.631 | 0.548 | 0.554 | 0.554 |

Such results indicate effective battery cell capabilities without any need for tabs to deliver charge from the cell to an external device.

Figure 18:
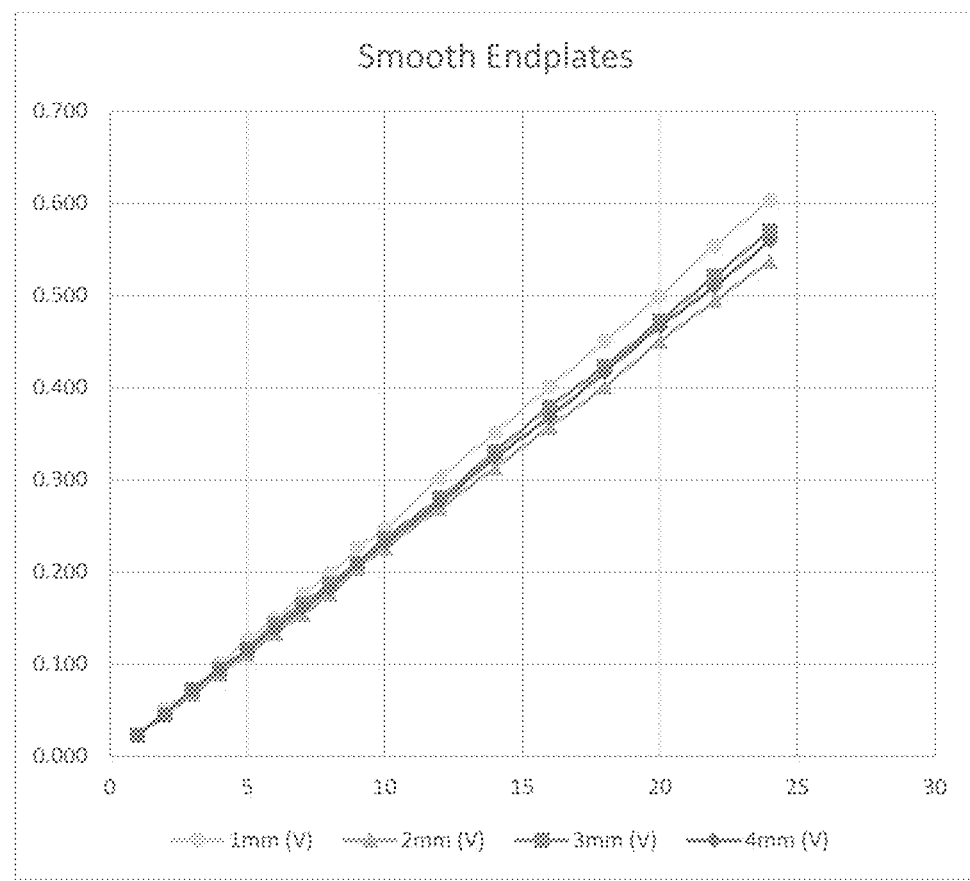
FIG. 18 is a graphical representation of the electrical conductance capability of a series of battery cells with different current collector configurations with smooth endplates for crushing purposes.

Table 7 pertains to the smooth endplate (FIG. 19) with the same current collector extensions and "crush space" measurements as for Table 6. The results are graphically presented in FIG. 18.

TABLE 7

Voltage Drop Measurements
Smooth Endplate Cylindrical Cells with Randomized
Crush Results with 0.5 mm "Crush Space"

| | Smooth Endplates, 0.5 mm crush space | | | |
|---|---|---|---|---|
| I (Amps) | 1 mm (V) | 2 mm (V) | 3 mm (V) | 4 mm (V) |
| 1 | 0.023 | 0.023 | 0.023 | 0.023 |
| 2 | 0.050 | 0.045 | 0.045 | 0.045 |
| 3 | 0.072 | 0.067 | 0.072 | 0.072 |
| 4 | 0.100 | 0.089 | 0.094 | 0.094 |
| 5 | 0.127 | 0.111 | 0.116 | 0.116 |
| 6 | 0.149 | 0.133 | 0.143 | 0.138 |
| 7 | 0.176 | 0.154 | 0.165 | 0.160 |
| 8 | 0.198 | 0.176 | 0.187 | 0.182 |
| 9 | 0.226 | 0.204 | 0.209 | 0.209 |
| 10 | 0.247 | 0.226 | 0.236 | 0.231 |
| 12 | 0.302 | 0.269 | 0.280 | 0.275 |
| 14 | 0.351 | 0.313 | 0.330 | 0.324 |
| 16 | 0.401 | 0.357 | 0.379 | 0.368 |
| 18 | 0.450 | 0.401 | 0.423 | 0.417 |
| 20 | 0.499 | 0.45 | 0.472 | 0.466 |
| 22 | 0.554 | 0.494 | 0.521 | 0.510 |
| 24 | 0.603 | 0.537 | 0.570 | 0.559 |

Such measurements thus show the viability of such current collector "crushed" cylindrical cells as above.

Table 8 shows measurements for different endplate structures in terms of resistance across the "crushed" current collector cells. The term "CC" means current collector below, and R is resistance.

TABLE 8

Resistance Measurements
Different Endplate Cylindrical Cells with Randomized
Crush Results with 0.6 mm "Crush Space"

| CC extension length, each side (mm) | End plate design | R, measured with DMM (mOhms) |
|---|---|---|
| 1 | Spiral | 10 |
| 2 | Spiral | 12 |
| 3 | Spiral | 15 |
| 4 | Spiral | 16 |
| 0 | | |
| 1 | Smooth | 10 |
| 2 | Smooth | 13 |
| 3 | Smooth | 7 |
| 4 | Smooth | 4 |

Such resistance measurements indicate excellent energy transfer results.

FIG. 21 shows a view of a different possible embodiment and thus type of jelly roll electrode structure 300 for a tabless device. The roll structure is not cylindrical in this possible embodiment, thereby indicating such rolled configurations may be of any type and shape. In this structure, shown is an electrode coating 310 surrounding a rolled anode 320 and a separator 330 with an extended current collector 340. FIG. 22 shows the same jelly roll electrode 300 introduced within a battery case 410 and having a smooth endplate 420 with a top surface 430 for contact with the anode and separator and "crushing" of the current collector 340. Peripheral edges 440 and vertical sidewalls 450 are present for contact with the battery case edges. The bottom edge 420 provides conductivity external to the finished battery.

FIG. 23 shows a battery formation 400 having the same basic jelly roll electrode 300 and battery case 410 of FIG. 22 but with a grooved endplate 460. Such an endplate 460 provides the conductive capability with an external device as before but with a top surface 470 with intermittent parallel grooves 480 for a different "crush" result/A horizontal peripheral edge surface 495 with associated vertical sidewalls 490 provide battery case/can contact as above.

FIG. 24 shows a different electrode structure (stacked cell electrodes) 500 as the internal battery component. Such a stacked configuration has multiple repeated aligned components of a current collector 520 (here each such current collector is extended as above), a coating 510, an anode 530, and a separator 540. FIG. 25, like the figures above, show the formation of a full battery device 600 through introduction of the electrode structure 500 within a battery case 610 and sealing with a smooth endplate 620 having a top "crushing" surface 630 and peripheral horizontal edges 640 and vertical sidewalls 650 for battery case contact and connection. As above, the bottom edge of the endplate 620 provides external conductivity.

As in FIG. 23, provided in FIG. 26 is the formation of a battery 700 with a stacked cell electrode 500 within a battery case 610 but with a grooved endplate 710 with top surfaces 720 and parallel grooves 730, as well as horizontal peripheral edges 740 and vertical sidewalls 750 for battery case connection. This grooved endplate 710 thus provides a different random "crushing" result of the extended current collector(s) and also allows for external conductivity.

In additional to the jelly roll and stacked cell electrode structures noted above, there may be, again, any number of different possible electrode configurations within the scope of this disclosure. Another possible embodiment is shown within FIGS. 33 and 34 wherein an electrode 800 is shown in an offset configuration. In FIG. 33, for example, an anode 820 (having an external coating 810) and cathode 880 are not only separated by a separator 890, but the anode 850 and cathode 880 are offset in alignment with the lateral and longitudinal edges of the cathode(s) 880 (in this situation) extending beyond the both types of edges of the anode 820 (a lateral distance indicated by 850), the lateral and longitudinal edges 830, 840 of the separator 890 extending beyond both edges of the anode, the separator 890 longitudinal edges of the separator 890 extending beyond the longitudinal edges of the cathode 880, and the lateral edges of the cathode 880 extending beyond the lateral edges of the separator 890. The current collector 840 extends beyond all of the other components (anode 850, cathode 880, and separator 890) with all of its edges (the distance from the cathode indicated as 860). The offset alignment allows for greater reliability in preventing any contact between anode and cathode subsequent to crushing of the current collector, with the extensions thereof in each of the lateral and longitudinal directions allowing for four directions of such manipulations of the current collector within such a stacked cell offset electrode structure as well. Such a structural capability allows for the full benefit of the safety of the thin film current collector as discussed throughout this disclosure with the further benefit of the removal of any tabs for external conductivity capability and more complete electrical charge transfer throughout the electrode without any fear of anode/cathode interaction during utilization thereof after "crushing" for such battery formation.

FIG. 34 shows a different type of representation of a stacked cell offset configuration 1000 as crushed within a cell package. Offset anodes 1040 and cathodes 1050 with separators 1060 and current collectors 1020 are shown with a crush space 1030 present to allow for sufficient area for such current collector manipulation to occur. The cathode 1050 is offset a certain distance 1010 from the anode 1040 to ensure that even with manipulation at the ends of such components, there will be no contact between anode 1040 and cathode 1050. The crush space 1030 for the current collector 1020 is thus quite important to allow for such sufficient area for the current collector 1020 to be manipulated to the extent discussed throughout this disclosure. As noted above, distances for such crush space will be less than the actual extension of the current collector(s) to ensure the current collector(s) will fill such space and remain in contact with the conductive endplate as well as the electrode components for electrical charge transfer to occur as needed.

FIG. 35 shows a photograph of a crushed stacked cell current collector end in randomized fashion (such as in contact with a smooth endplate). FIG. 36 shows a non-randomized crushed stacked cell current collector for comparison. Either is viable within the scope of this disclosure.

Such stacked cell batteries were tested for viability measurements as for the cylindrical types, above. Table 9 provides the stacked cell with a smooth endplate (as in FIG. 24) with voltage drop (impedance) measurements. The graphical representations thereof are provided in FIG. 27. Table 10 pertains to a "crush space" within the stacked cell (with a smooth endplate) of 1.1 mm. The results are graphically represented in FIG. 28. Tables 11 and 12 pertain to grooved endplates within stacked cells with 0.6 mm and 1.1 mm "crush space" measurements, respectively. Those tables are presented in graphical format as FIGS. 29 and 30, respectively. Such results show the viability of such stacked cells with these "crushed" thin film metallized film current collectors.

TABLE 9

Voltage Drop Measurements
Smooth Endplate Stacked Cells with Randomized
Crush Results with 0.6 mm "Crush Space"

| I (Amps) | 1 mm (V) | R (ohms) | 2 mm (V) | R (ohms) | 3 mm (V) | R (ohms) |
|---|---|---|---|---|---|---|
| 1 | 0.029 | 0.029 | 0.023 | 0.023 | 0.034 | 0.034 |
| 2 | 0.061 | 0.031 | 0.050 | 0.025 | 0.072 | 0.036 |
| 3 | 0.094 | 0.031 | 0.072 | 0.024 | 0.111 | 0.037 |
| 4 | 0.122 | 0.031 | 0.094 | 0.024 | 0.143 | 0.036 |
| 5 | 0.154 | 0.031 | 0.122 | 0.024 | 0.182 | 0.036 |
| 6 | 0.182 | 0.030 | 0.143 | 0.024 | 0.220 | 0.037 |
| 7 | 0.215 | 0.031 | 0.165 | 0.024 | 0.253 | 0.036 |
| 8 | 0.247 | 0.031 | 0.193 | 0.024 | 0.291 | 0.036 |
| 9 | 0.275 | 0.031 | 0.215 | 0.024 | 0.324 | 0.036 |
| 10 | 0.308 | 0.031 | 0.236 | 0.024 | 0.357 | 0.036 |
| 12 | 0.368 | 0.031 | 0.286 | 0.024 | 0.428 | 0.036 |
| 14 | 0.428 | 0.031 | 0.335 | 0.024 | 0.494 | 0.035 |
| 16 | 0.488 | 0.031 | 0.384 | 0.024 | 0.570 | 0.036 |
| 18 | 0.548 | 0.030 | 0.428 | 0.024 | 0.636 | 0.035 |
| 20 | 0.609 | 0.030 | 0.477 | 0.024 | 0.702 | 0.035 |
| 22 | 0.663 | 0.030 | 0.527 | 0.024 | 0.773 | 0.035 |
| 24 | 0.713 | 0.030 | 0.576 | 0.024 | 0.833 | 0.035 |

TABLE 10

Voltage Drop Measurements
Smooth Endplate Stacked Cells with Randomized
Crush Results with 1.1 mm "Crush Space"

| | Smooth Endplate (1.1 mm) | | | | | |
|---|---|---|---|---|---|---|
| I (Amps) | 1 mm (V) | R (ohms) | 2 mm (V) | R (ohms) | 3 mm (V) | R (ohms) |
| 1 | | | 0.029 | 0.029 | 0.056 | 0.056 |
| 2 | | | 0.056 | 0.028 | 0.111 | 0.056 |
| 3 | | | 0.089 | 0.030 | 0.165 | 0.055 |
| 4 | | | 0.116 | 0.029 | 0.220 | 0.055 |
| 5 | | | 0.143 | 0.029 | 0.275 | 0.055 |
| 6 | | | 0.171 | 0.029 | 0.330 | 0.055 |
| 7 | | | 0.204 | 0.029 | 0.384 | 0.055 |
| 8 | | | 0.231 | 0.029 | 0.439 | 0.055 |
| 9 | | | 0.258 | 0.029 | 0.494 | 0.055 |
| 10 | | | 0.286 | 0.029 | 0.548 | 0.055 |
| 12 | | | 0.346 | 0.029 | 0.647 | 0.054 |
| 14 | | | 0.406 | 0.029 | 0.745 | 0.053 |
| 16 | | | 0.461 | 0.029 | 0.838 | 0.052 |
| 18 | | | 0.516 | 0.029 | 0.948 | 0.053 |
| 20 | | | 0.576 | 0.029 | 1.107 | 0.055 |
| 22 | | | 0.631 | 0.029 | 1.228 | 0.056 |
| 24 | | | 0.691 | 0.029 | 1.315 | 0.055 |

TABLE 11

Voltage Drop Measurements
Grooved Endplate Stacked Cells with Randomized
Crush Results with 0.5 mm "Crush Space"

| | Grooved Endplate (0.5 mm crush) | | | | | |
|---|---|---|---|---|---|---|
| I (Amps) | 1 mm (V) | R (ohms) | 2 mm (V) | R (ohms) | 3 mm (V) | R (ohms) |
| 1 | 0.029 | 0.029 | 0.023 | 0.023 | 0.029 | 0.029 |
| 2 | 0.056 | 0.028 | 0.050 | 0.025 | 0.056 | 0.028 |
| 3 | 0.083 | 0.028 | 0.072 | 0.024 | 0.089 | 0.030 |
| 4 | 0.111 | 0.028 | 0.100 | 0.025 | 0.116 | 0.029 |
| 5 | 0.138 | 0.028 | 0.122 | 0.024 | 0.149 | 0.030 |
| 6 | 0.165 | 0.028 | 0.143 | 0.024 | 0.176 | 0.029 |
| 7 | 0.193 | 0.028 | 0.171 | 0.024 | 0.204 | 0.029 |
| 8 | 0.220 | 0.028 | 0.193 | 0.024 | 0.236 | 0.030 |
| 9 | 0.247 | 0.027 | 0.220 | 0.024 | 0.264 | 0.029 |
| 10 | 0.275 | 0.028 | 0.242 | 0.024 | 0.297 | 0.030 |
| 12 | 0.330 | 0.028 | 0.291 | 0.024 | 0.357 | 0.030 |
| 14 | 0.384 | 0.027 | 0.340 | 0.024 | 0.412 | 0.029 |
| 16 | 0.444 | 0.028 | 0.390 | 0.024 | 0.472 | 0.030 |
| 18 | 0.499 | 0.028 | 0.439 | 0.024 | 0.532 | 0.030 |
| 20 | 0.554 | 0.028 | 0.488 | 0.024 | 0.592 | 0.030 |
| 22 | 0.609 | 0.028 | 0.537 | 0.024 | 0.652 | 0.030 |
| 24 | 0.663 | 0.028 | 0.587 | 0.024 | 0.707 | 0.029 |

TABLE 12

Voltage Drop Measurements
Grooved Endplate Stacked Cells with Randomized
Crush Results with 1.1 mm "Crush Space"

| | Grooved Endplate (1.1 mm crush) | | | | | |
|---|---|---|---|---|---|---|
| I (Amps) | 1 mm (V) | R (ohms) | 2 mm G(V) | R (ohms) | 3 mm G(V) | R (ohms) |
| 1 | | | 0.045 | 0.045 | 0.034 | 0.034 |
| 2 | | | 0.083 | 0.042 | 0.061 | 0.031 |
| 3 | | | 0.127 | 0.042 | 0.094 | 0.031 |
| 4 | | | 0.165 | 0.041 | 0.127 | 0.032 |
| 5 | | | 0.209 | 0.042 | 0.160 | 0.032 |
| 6 | | | 0.247 | 0.041 | 0.193 | 0.032 |
| 7 | | | 0.291 | 0.042 | 0.226 | 0.032 |
| 8 | | | 0.330 | 0.041 | 0.258 | 0.032 |
| 9 | | | 0.362 | 0.040 | 0.291 | 0.032 |
| 10 | | | 0.401 | 0.040 | 0.319 | 0.032 |
| 12 | | | 0.472 | 0.039 | 0.384 | 0.032 |
| 14 | | | 0.543 | 0.039 | 0.450 | 0.032 |
| 16 | | | 0.625 | 0.039 | 0.488 | 0.031 |
| 18 | | | 0.702 | 0.039 | 0.587 | 0.033 |
| 20 | | | 0.751 | 0.038 | 0.658 | 0.033 |
| 22 | | | 0.828 | 0.038 | 0.724 | 0.033 |
| 24 | | | 0.899 | 0.037 | 0.795 | 0.033 |

Further measurements were undertaken to determine impedance in relation to the actual endplate structure within stacked cells. Table 13 provides such results in relation to a 0.5 mm "crush space" and different current collector extension lengths. FIG. 31 provides a graphical view of such results, as well. Table 14 provides such results in relation to a 1.1 mm "crush space" with different endplate structures and FIG. 32 provides the graphical results thereof.

TABLE 13

| | 0.5 mm crush space | | |
|---|---|---|---|
| | 1 mm | 2 mm | 3 mm |
| Smooth | 0.030 | 0.024 | 0.036 |
| Grooved | 0.028 | 0.024 | 0.029 |

TABLE 14

| | 1.1 mm Crush space | |
|---|---|---|
| | 2 | 3 |
| Smooth | 0.029 | 0.055 |
| Grooved | 0.040 | 0.032 |

Again, such measured results indicate effective and reliable battery cells with "crushed" thin metallized film current collectors present. With such unique and heretofore unexplored electrode structures with thin film current collectors with randomized crushed extensions thereof, providing, as examples, different collector sides in possible contact with one another within the target cell or energy storage device, as well as offset component configurations to avoid anode/cathode contacts subsequent to current collector manipulation during formation, a reliable, safer, and more thorough conducting device is provided. Any type of electrolyte may likewise be present as long as the extended and "crushed" thin film current collector(s) are present, including, flammable liquid organic electrolytes, gelling electrolytes, and possible solid electrolytes (though no equivalency between such electrolytes is intended with such a disclosure; liquid flammable electrolytes are potentially preferred). There is thus provided a novel approach to utilizing thin metallized film current collectors within lithium ion (and like) batteries, capacitors, power cells, etc., for effective power transfer and reduced thermal runaway potential.

Having described the invention in detail it is obvious that one skilled in the art will be able to make variations and modifications thereto without departing from the scope of the present invention. Accordingly, the scope of the present invention should be determined only by the claims appended hereto.

What is claimed is:

1. A lithium-ion battery comprising a housing having a positive pole and a negative pole, said housing further including therein:
   i) an anode current collector,
   ii) an anode,
   iii) a cathode current collector,
   iv) a cathode,
   v) a separator, and
   vi) electrolytes:
   wherein said anode is present on said anode current collector,
   wherein said cathode is present on said cathode current collector,
   wherein said separator is interposed between and contacts with both of said anode and said cathode,
   wherein said anode current collector is electrically connected to said negative pole of said housing,
   wherein said cathode current collector is electrically connected to said positive pole of said housing,
   wherein at least one of said anode and cathode current collectors comprises a metallized film comprising a polymer layer that is coated on both sides by a conductive layer and exhibits a length such that at least a portion of said anode and cathode current collectors is exposed for contact with one of said negative and positive poles of said housing,
   wherein said anode, said anode current collector, said cathode, said cathode current collector, said separator, and said electrolytes are sealed in said housing case, with said positive pole and said negative pole each connecting electrically to the outside of said housing,
   wherein said metallized film connects to either of said positive or negative poles through at least one fold present therein due to crushing of said exposed metallized film current collectors, and
   wherein said metallized film is not connected to either negative or positive poles through a welded connection.

2. The lithium ion battery of claim 1 wherein each side of said metallized film of either anode or cathode or both current collectors makes direct contact with either of the poles of the housing.

3. The lithium ion battery of claim 1 wherein said metallized films exhibits metallization on both sides of said current collector.

4. The lithium ion battery of claim 1 wherein said metallized films are exposed in a manner that allows for folds or crushed portions to create connections in a randomized pattern with sufficient spaces/voids for liquid electrolyte movement throughout said battery housing.

5. The lithium ion battery of claim 1 where such exposures of metallized films are extensions or protrusions from the internal composite of anode, cathode, separator, and current collectors within the battery housing such that the exposed length of metallized film is present to contact with said housing or pole upon contact and sealing is between 1 and 3 millimeters in at least one section of the exposed metallized film current collector.

6. The lithium ion battery of claim 5 where the space available for such folding/crushing between said housing or pole and said metallized film is from 0.5 to 2.5 millimeters, wherein the length of said metallized film extensions or protrusions exceeds said folding/crushing space available.

7. The lithium ion battery of claim 5 wherein said housing or pole in contact with said metallized film extension or protrusion is of a texture to allow for any number of random contacts to be created with such a crushing/folding operation.

8. The lithium ion battery of claim 7 wherein said texture is a smooth, spiral, lattice, or grid configuration.

9. A lithium-ion cell comprising a housing having a positive pole and a negative pole, said housing further including therein:
   i) an anode current collector,
   ii) an anode,
   iii) a cathode current collector,
   iv) a cathode,
   v) a separator, and
   vi) electrolytes:
   wherein said anode is present on said anode current collector,
   wherein said cathode is present on said cathode current collector,
   wherein said separator is interposed between and contacts with both of said anode and said cathode,
   wherein said anode current collector is electrically connected to said negative pole of said housing,
   wherein said cathode current collector is electrically connected to said positive pole of said housing,
   wherein at least one of said anode and cathode current collectors comprises a metallized film comprising a polymer layer that is coated on both sides by a conductive layer and exhibits a length such that at least a portion of said at least one of said anode and cathode current collectors is exposed for contact with one of said negative and positive poles of said housing,
   wherein at least one of said anode and cathode current collectors includes a first exposed side and a second opposite exposed side,
   wherein said anode, said anode current collector, said cathode, said cathode current collector, said separator, and said liquid electrolytes are sealed in said housing case, with said positive pole and said negative pole each connecting electrically to the outside of said housing,
   wherein said metallized film connects to either of said positive or negative poles through at least one fold present therein due to crushing of said exposed metallized film current collectors,
   wherein said exposed metallized film of said at least one current collector is in contact with said pole or housing portion through at least one fold with a first side thereof said at least one current collector and simultaneously through at least one fold with a second side thereof said current collector with the same said pole or housing portion. and
   wherein said metallized film is not connected to either negative or positive poles through a welded connection.

10. The lithium ion battery of claim 9 wherein said pole or housing portion is conductive in nature.

11. The lithium ion battery of claim 9 wherein any of said folds of said current collector exposed portion is folded in a randomized pattern against said housing portion or pole.

12. The lithium ion battery of claim 9 wherein said current collector includes a plurality of layers thereof in contact with one another and wherein at least one fold thereof said current collection is in contact with the housing portion or pole.

13. A lithium-ion cell comprising a housing having a positive pole and a negative pole, said housing further including therein:

i) an anode current collector,
ii) an anode,
iii) a cathode current collector,
iv) a cathode,
v) a separator, and
vi) electrolytes:
wherein said anode is present as a coating on said anode current collector,
wherein said cathode is present as a coating on said cathode current collector,
wherein said separator is interposed between and contacts with both of said anode and said cathode,
wherein said anode current collector is electrically connected to said negative pole of said housing,
wherein said cathode current collector is electrically connected to said positive pole of said housing,
wherein at least one of said anode and cathode current collectors comprises a metallized film comprising a polymer layer that is coated on both sides by a conductive layer and exhibits a length that at least a portion of said at least one of said anode and cathode current collectors is exposed for contact with one of said negative and positive poles of said housing,
wherein at least one of said anode and cathode current collectors includes a first exposed side and a second opposite exposed side,
wherein said anode, said anode current collector, said cathode, said cathode current collector, said separator, and said liquid electrolytes are sealed in said housing case, with said positive pole and said negative pole each connecting electrically to the outside of said housing,
wherein said metallized film connects to either of said positive or negative poles through at least one fold present therein due to crushing of said exposed metallized film current collectors,
wherein said exposed metallized film of said at least one current collector is in contact with said pole or housing portion through at least one fold with a first side thereof said at least one current collector and simultaneously through at least one fold with a second side thereof said current collector with the same said pole or housing portion,
wherein said exposed metallized film current collector exhibits pathways or voids therein when in contact with said pole or housing portion for liquid electrolyte flow through therein, and
wherein said metallized film is not connected to either negative or positive poles through a welded connection.

* * * * *